(12) United States Patent
Ichimura

(10) Patent No.: US 6,188,831 B1
(45) Date of Patent: *Feb. 13, 2001

(54) DATA STORAGE/PLAYBACK DEVICE AND METHOD

(75) Inventor: Satoshi Ichimura, Nakai-machi (JP)

(73) Assignee: Fuji Xerox Co., Ltd., Tokyo (JP)

( * ) Notice: Under 35 U.S.C. 154(b), the term of this patent shall be extended for 0 days.

This patent is subject to a terminal disclaimer.

(21) Appl. No.: 09/014,163

(22) Filed: Jan. 27, 1998

(30) Foreign Application Priority Data

Jan. 29, 1997 (JP) .................................................. 9-029545

(51) Int. Cl.⁷ .................................................... H04N 5/91
(52) U.S. Cl. .......................... 386/69; 386/112; 386/124; 360/72.1
(58) Field of Search .................................. 386/6, 33, 68, 386/69, 70, 109, 111, 112, 124; 360/72.1, 72.2, 72.3

(56) References Cited

U.S. PATENT DOCUMENTS 5,613,032 * 3/1997 Cruz et al. .............................. 386/69
5,926,605 * 7/1999 Ichimura ................................ 386/69

FOREIGN PATENT DOCUMENTS

| | | |
|---|---|---|
| 2-305053 | 12/1990 | (JP) . |
| 3-90968 | 4/1991 | (JP) . |
| 5-64144 | 3/1993 | (JP) . |
| 5-134907 | 6/1993 | (JP) . |
| 6-149902 | 5/1994 | (JP) . |
| 6-176171 | 6/1994 | (JP) . |
| 6-205151 | 7/1994 | (JP) . |
| 6-276478 | 9/1994 | (JP) . |
| 6-343146 | 12/1994 | (JP) . |
| 7-15519 | 1/1995 | (JP) . |
| 7-129187 | 5/1995 | (JP) . |
| 7-182365 | 7/1995 | (JP) . |

OTHER PUBLICATIONS

Video for Windows—Microsoft Video for Windows 1.0 User's Guide, Jan. 20, 1994, pp. 57–59, pp. 102–108.

"Marquee: A Tool for Real–Time Video Logging", Human Factors in Computing Systems, Boston, Mass., Apr. 24, 1994—Apr. 28, 1994, pp. 58–64.

Video for Windows—Microsoft Video for Windows 1.0 User's Guide, pp. 57–59, pp. 102–108.

* cited by examiner

*Primary Examiner*—Wendy Garber
*Assistant Examiner*—Christopher Onuaku
(74) *Attorney, Agent, or Firm*—Oliff & Berridge, PLC

(57) ABSTRACT

The invention provides a data storage/playback device and method. The data storage/playback device includes at least one time-series data pickup device, a time-series data storage, at least one user input detector and a controller. The controller acts to control the storage and playback of time-series data. The controller further includes a correspondence-relationship storing section, a compression section, a condition-matching section and a playback section. The controller determines important intervals of time-series data and intervals of less important time-series data. Based on this determination, the compression section of the controller compresses the important interval time-series data using a different compression process from that of the less important time-series data. Thus, the important interval time-series data is maintained with high quality and storage space is conserved.

70 Claims, 43 Drawing Sheets

MEMORY OF CORRESPONDENCE RELATIONSHIP STORING SECTION 5
(1 MIN. PEN TRACE)

| ID | FILE NAME | STORAGE START TIME ||||||
|---|---|---|---|---|---|---|---|
| | | YEAR | MONTH | DAY | HOUR | MINUTE | SECOND |
| ⋮ | ⋮ | ⋮ | ⋮ | ⋮ | ⋮ | ⋮ | ⋮ |
| 10 | file10 | 1996 | 4 | 25 | 13 | 30 | 00 |
| 11 | file11 | 1996 | 4 | 27 | 10 | 00 | 00 |
| ⋮ | ⋮ | ⋮ | ⋮ | ⋮ | ⋮ | ⋮ | ⋮ |

STORAGE COMPOSITION OF TIME DATA STORING SECTION 7

| ID | FILE NAME | STORAGE START TIME | | | | | | TIME UNTIL START OF COMPRESSION PROCESSING |
|---|---|---|---|---|---|---|---|---|
| | | YEAR | MONTH | DAY | HOUR | MINUTE | SECOND | |
| | | | | | | | | |
| 10 | file10 | 1996 | 4 | 25 | 13 | 30 | 00 | ONE MONTH |
| 11 | file11 | 1996 | 4 | 27 | 10 | 00 | 00 | TWO MONTHS |
| | | | | | | | | |

STORAGE COMPOSITION OF TIME DATA STORING SECTION 7

|  | STORAGE MEMORY | DELETION PERIOD |
|---|---|---|
| IMPORTANT INTERVAL | HIGH FREQUENCY | IN ONE MONTH |
|  | MIDDLE FREQUENCY | HALF YEAR |
|  | LOW FREQUENCY | NO DELETION |
| INTERVALS OTHER THAN IMPORTANT | HIGH FREQUENCY | ONE WEEK |
|  | MIDDLE FREQUENCY | ONE MONTH |
|  | LOW FREQUENCY | HALF YEAR |

COMPRESSION TIME MANAGEMENT TABLE RECORDED IN TIME DATA STORAGE UNIT

Fig. 27

| IDENTIFICATION DATA | RECORDED CHARACTER STRING KEY WORD | KEY WORD VALID TERM (MINUTES) |
|---|---|---|
| 1 | SUMMARY | 4 |
| 2 | CONCLUSION | 4 |
| 3 | IMPORTANCE | 2 |
| 4 | HOMEWORK | 4 |
| ⋮ | ⋮ | ⋮ |

Fig. 31

| IDENTIFICATION DATA | RECORDED PATTERN | | PATTERN VALID TERM (MINUTES) |
|---|---|---|---|
| | PATTERN NAME | | |
| 1 | NOISE | A | 2 |
| 2 | LAUGHING | B | 2 |
| 3 | APPLAUD | C | 3 |
| 4 | ACTIVE CONVERSATION | D | 2 |
| ⋮ | ⋮ | ⋮ | ⋮ |

DETERMINED RESULTS OF PATTERN IDENTIFIER

Fig. 32

| IDENTIFICATION DATA | CONFERENCE ROOM NAME | LEVEL OF IMPORTANCE |
|---|---|---|
| 1 | EXECUTIVE CONFERENCE ROOM | 10 |
| 2 | RECEPTION CONFERENCE ROOM | 7 |
| 3 | REGULAR CONFERENCE ROOM | 3 |
| 4 | LOBBY | 1 |
| ⋮ | ⋮ | ⋮ |

| INTERVAL | REFERENCE FREQUENCY |
|---|---|
| T1 | 0 |
| T2 | 1 |
| T3 | 0 |
| T4 | 0 |
| T5 | 2 |
| T6 | 5 |
| T7 | 0 |

REFERENCE CONDITION STORAGE UNIT

Fig. 36

| REFERENCE FREQUENCY | IMAGE COMPRESSION RATE (%) | |
|---|---|---|
| | IMPORTANT INTERVAL | INTERVAL OTHER THAN IMPORTANT INTERVAL |
| 0 TIMES | 80 | 90 |
| 1 TIME | 50 | 70 |
| 2 TIMES → 4 TIMES | 30 | 50 |
| 5 TIMES → 9 TIMES | 10 | 20 |
| OVER 10 TIMES | 0 | 0 |

COMPRESSION RATE SETTING TABLE

Fig. 37

DATA STORAGE/PLAYBACK DEVICE AND METHOD

RELATED APPLICATION

The disclosure of commonly-owned co-pending application Ser. No. 08/847,338, which is directed to related subject matter, is incorporated herein by reference.

BACKGROUND OF THE INVENTION

1. Field of Invention

The present invention relates to a data storing apparatus, such as a conference minutes recording system or a news gathering recording system, for storing data such as conversation audio from minutes and news gathering, and the images of conference and news gathering scenes and conference memos and news gathering memos related to these.

2. Description of Related Art

An apparatus is known for recording and playing back the record of conferences, lectures, news gathering, interviews, and conversations using telephones or television telephones, television videos, surveillance camera videos and the like using digital disks, digital still cameras, video tape and semiconductor memory and the like. If data is stored using these apparatuses, it is possible to record the data without losing any of the sound and images that comprise the input data.

Apparatuses of this kind include apparatuses that record digital signals transmitted via a computer network onto storage media, apparatuses that record without change analog input signals from video cameras or microphones onto storage media, and apparatuses that encode the input and convert it into a digital signal for recording.

However, a problem arises in that it is impossible to instantaneously search for the desired portion of the recorded sounds and images. Concerning this problem, tape recorders and VCRs have been proposed which make it easy for a person doing the recording to search for the important portions by attaching check marks to the important portions in the input audio signal and video signal by pressing a designated button with an arbitrary timing.

However, the check marks in this case simply designate the location of the important portions, and the problem then arises that the contents must be verified by playing back all of the checked partial audio signal and partial video signal because it is impossible to indicate to what interval portion of the audio signal or video signal these check marks correspond. Furthermore, it is necessary to perform the unnatural task of pressing buttons while listening to speech, creating the problem that it is impossible to concentrate on the speech.

Consequently, apparatuses have been proposed for storing, recording and playing back data by successively correlating input audio signals or video signals and user input data that is input at an arbitrary timing using a pen or keyboard. Using this kind of apparatus, the person doing the recording performs input using a pen or keyboard just like taking a memo and the audio signal or video signal is recorded. Afterwards, it is possible to play back the data easily by selecting the location of the desired audio signal or video signal with reference to the input memos.

For example, in Japanese Laid-Open Patent Publications 7-182365, 6-176171 and 6-343146 and ACM CHI '94 Proceedings, pg. 58–pg. 64 ("Marquee: A Tool For Real-Time Video Logging"), descriptions are given of apparatuses such that the recorded audio signal or video signal and the user input data are correlated on the basis of a time stamp. During playback, one of the user input data items displayed on a screen is designated and the audio signal or video signal recorded at the time the designated user input data was recorded is played back.

Furthermore, in Japanese Laid-Open Patent Publication 6-276478, an apparatus is described which accomplishes playback by correlating the successively input audio signals or video signals and stationary video designated by the operator on the basis of a time imprint.

In addition, in Japanese Laid-Open Patent Publication 6-205151, an apparatus is described wherein an index is appended to the input audio signal or input video signal which detects that the user input has been interrupted for a set time. During playback, one of the specific user-input data items displayed on the screen is designated and the audio signal or video signal starting from the index portion corresponding to the designated user-input data is played back.

However, the data storage apparatuses described above have a construction that records all of the input audio signal or video signal without compression and consequently, it is difficult to record a lengthy input audio signal or input video signal with a limited recording capacity. In general, when recording time-series data, such as successively input audio signals or video signals over a long period of time, the required storage capacity becomes enormous.

A method has been proposed wherein the audio signal or video signal is always stored on the storage medium while being compressed. In general, all of the input audio signals or video signals are stored using the same compression ratio. With this method, it is impossible to conserve storage capacity by recording only the important portions with high audio quality and high image quality. Thus, even the data having a small likelihood of being referenced later is recorded in a large volume. It is therefore, impossible to record audio and video signals taking into account the amount of available storage capacity and the importance of the data being recorded.

For example, assume that when recording the scenery of an interview over a lengthy time using Video for Windows ("Microsoft Video for Windows 1.0 User's Guide, pp. 57–59, pp. 102–108), the thinning compression ratio is set so that only one frame for every five seconds of the video signal is stored with the aim of conserving storage capacity. Here, the problem is created that even if the person doing the recording wants to play back portions that were felt to be important during recording, it is only possible to play back the video signal at one frame every five seconds. It is thus, impossible to reproduce the actions (gestures and the like), the manner of speech and the subtle nuances of the person speaking in the stored video. Conversely, when all of the input video signal are recorded at 30 frames per second, the storage capacity needed to store a lengthy interview becomes enormous.

Hence, in Japanese Laid-Open Patent Publications 2-305053 and 7-15519, an audio data storage apparatus is discussed which, when it is confirmed that the empty capacity of the storage medium is less than a certain amount, secures the empty areas of the storage medium by recompressing the audio data that has already been stored.

However, the apparatuses described in Japanese Laid-Open Patent Publication 2-305053 and Japanese Laid-Open Patent Publication 7-15519 are apparatuses for recompressing the audio signal stored using the same compression ratio for the entire signal. This creates the problem of not being able to record the important areas with a lower compression ratio and higher audio quality.

In addition, in Japanese Laid-Open Patent Publications 5-64144 and 5-134907, data storage apparatuses are discussed which, when the usage volume (data storage volume) of the image storage medium exceeds a predetermined amount, conserve the storage capacity by successively compressing the image data already stored starting with the old frames and by thinning out frames. These comprise apparatuses that conserve storage capacity by overwriting previously stored data with newly input data and by increasing the compression ratio of data that was stored first.

In addition, in data storage apparatuses for storing conferences, lectures, news gathering and interviews, when the apparatus is structured so as to simply retain the new recording as important data and erase the old recording as unnecessary data, such as is described in Japanese Laid-Open Patent Publications 5-64144 or 5-134907, the problem arises that recordings of important conferences or important news gathering or the like are overwritten by newly input data simply because those recordings were made first. In general, it is not possible to determine the level of importance of conference contents or news gathering contents merely on the basis of the date and time that the conference or news gathering was conducted.

In addition, the motion image recording apparatus mentioned in Japanese Laid-Open Patent Publication 6-144902 is an apparatus which accomplishes automatic scene change detection. When creating a digest, the apparatus extracts the data in order, starting with the scenes that have high importance so that the data reaches the time length designated by the user. Scenes are deemed to be more important the longer they are. With the apparatus described in this disclosure, it is possible to conserve storage capacity without losing important data if the apparatus retains only the scenes contained in the digest and deletes scenes not contained in the digest.

On the other hand, in Japanese Laid-Open Patent Publications 3-90968 and 6-149902, apparatuses are proposed which automatically create a video digest so as to reach the time length designated by the user. The apparatus described in Japanese Laid-Open Patent Publication 3-90968 is such that the user inputs the importance of each scene beforehand using an editor and, when a digest is created, the apparatus extracts the scenes starting with those having the highest importance so that the data reaches the time length designated by the user. In the case of this apparatus also, it is possible to conserve storage capacity without losing important data if the apparatus retains only scenes contained in the digest.

In addition, with the apparatus described in Japanese Laid-Open Patent Publication 6-149902, it is extremely difficult to partition the scenes by cut changes and scene changes when a conference or lecture is photographed using an unmanned camera. This creates the problem of not being able to detect the scene length. Additionally, when a conference or lecture is photographed, there are times when important statements are included even in short scenes. Consequently, the problem arises that it is not possible to determine the level of importance of conference contents or news gathering contents on the basis of the scene length alone.

Furthermore, with the apparatus described in Japanese Laid-Open Patent Publication 3-90968, the problem arises that it is extremely difficult to partition the scenes by cut changes and scene changes when a conference or lecture is photographed using an unmanned camera. Additionally, the work of inputting the level of importance using an editor after photography has been completed is extremely troublesome, so that the problem arises that this is not suitable for applications such as recording conferences or lectures.

However, there have been proposed apparatuses in which recorded data are either selected or rejected during recording, and apparatuses in which only data verified as important are recorded. For example, in Japanese Laid-Open Patent Publication 7-129187, an apparatus is described which records only a set time interval worth of the audio signal around when an audio integration key is pressed. In addition, in Japanese Laid-Open Patent Publication 6-343146, a method is described wherein video signals are recorded only for a set time interval with the timing input by the user. Furthermore, among commercially available tape recorders, there are models which have a silent period detection function so that audio is not stored during periods of silence.

However, these apparatuses do not have a means for recompressing data after the data has once been recorded. Consequently, it is impossible to change the compression ratio stepwise depending on the length of the storage period of the data or to change the compression ratio dynamically in accordance with changes in the empty storage capacity of the storage medium. Thus, the problem arises that the compression efficiency is extremely poor in comparison with methods for recompressing the image or audio data that has been stored.

In addition, as described in Japanese Laid-Open Patent Publications 7-129187 and 6-343146, in order to record time-series data slightly prior to detection of the trigger, a recording-use buffer memory for temporarily recording the input time-series data is necessary, creating the problem that the apparatus becomes more complex and more expensive.

Furthermore, with these apparatuses, the data that can be played back is strictly limited to recorded signals within a set time interval. Consequently, the problem arises that it is completely impossible to play back motion images other than the portion input with the user input timing. In addition, these apparatuses have the problems of the impossibility of recording what is spoken by the speaker from the starting portion and of having the recording terminate before the speaker has finished speaking.

Additionally, apparatuses that select and record only data recognized to be important are known. For example, Japanese Laid-Open Patent Publications 7-129187 and 6-343146 disclose an apparatus which records sounds for a certain amount of time before and after pressing of a sound incorporation key and a method in which video is recorded for a certain amount of time designated by a user, respectively.

However, in the method used in the apparatus of Japanese Laid Open Publications 7-129187 and 6-343146, it is not possible to specify a person who expresses opinions most frequently during a conference and store only the audio data or the image data of the specified person with high quality. It is also not possible to create a digest by extracting scenes in order of importance to fill the length of time designated by the user. In other words, these methods have the problem that compression of the audio or image data may not be executed using data which is obtained immediately after completion of recording of the audio data or image data.

SUMMARY OF THE INVENTION

In consideration of the foregoing, it is an object of the present invention to make it possible to detect the audio signal or video signal of important periods out of the input audio signals and/or input video signals. It is a further object to store a large number of these important periods of the audio signal or video signal in a limited storage medium. It is another object to store, for long periods of time, audio and/or video signals other than the important periods with small data volume. It is another object to accomplish playback accurately from the start to the end of the important portion.

In order to achieve these objects, the data storage apparatus of the present invention includes a user input device for receiving input data from a user, a user-input data detector for detecting user-input data input from the user input device, a time-series data input device for inputing time-series data containing at least either audio data or image data, and a time-series data storing device for storing time-series data input from the time-series data input device, The data storage apparatus further includes a correspondence relationship storing device for storing the correspondence relationship between an interval which is determined by the user-input data being detected by the user-input data detector and the position in the time-series data storing device where the time-series data corresponding to the interval is stored.

Additionally, the data storage apparatus includes a compression device for reading and compressing the time-series data which is stored in the time-series data storing means. The time-series data corresponding to the interval determined by the user-input data, and the time-series data in other intervals are compressed by a different compression rate or a compression system based on the correspondence-relationship which is stored in the correspondence relationship storing device.

In the above-described structure, intervals which are set by the user-input data detected by the user-input data detector are compressed, for example, as important data intervals using a compression method or compression ratio that differs from other intervals. In this case, the cases of "compresses" and "does not compress" are included in the differing compression ratios or compression methods.

Using the present invention, the audio data and/or image data of the important intervals are stored with high quality. In contrast the other intervals are stored with a high compression ratio. Accordingly, the data of the important intervals is stored while maintaining high quality while it is possible to reduce the used capacity of the time-series data storing device.

In particular, it is preferable to designate the time around when the user-input data was detected as an important interval and to store this with a higher quality than that of other intervals.

In addition, the correspondence relationship between the interval data indicating an interval fixed by the user-input data and the storage position of the audio data or image data in the time-series data storing device corresponding to said interval data, is stored by the correspondence relationship storing device. Consequently, when undertaking compression using the compression device, it is easy to associate, for example, the interval data that is to be maintained at high quality and the audio data or image data of the interval in accordance with the stored contents of the correspondence relationship storing device. The image data of intervals fixed by the user-input data is maintained at high quality and consequently, during playback at a later time, it is possible to play back the image data of the important intervals with high quality.

Furthermore, the present invention detects intervals matching the conditions established for the audio data or image data beforehand using a condition-matching interval detection device. In addition, out of these condition-matching intervals, intervals with the audio data or image data of intervals fixed by the user-input data detected by the user-input data detector are deemed to be an important interval and are compressed with a compression ratio or compression method differing from other intervals.

In addition, the present invention detects intervals matching the preset conditions established for sensor data using the condition-matching interval detection device. Out of these condition-matching intervals, intervals with the audio data or image data of intervals fixed by the user-input data detected by the user-input data detector are deemed to be important intervals and are compressed with a compression ratio or compression method differing from other intervals.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 27 is a compression time management table which manages the time to execute gradual compression in the third embodiment;

FIG. 31 is a diagram describing an example of a table which controls the keyword effective period when appearance of the previously registered keyword is detected in the audio signals in the fourth embodiment;

FIG. 32 is a diagram describing an example of a table which controls the pattern effective period when appearance of the previously registered audio signal pattern is detected in the audio signals in the fourth embodiment;

FIG. 36 is a diagram describing an example of a table which controls the storing status of the access status storing section in the eighth embodiment;

FIG. 37 is a diagram describing an example of a table which controls the storing status of the compression rate setting table in the eighth embodiment;

DETAILED DESCRIPTION OF PREFERRED EMBODIMENTS

In general, the necessity of referring to a conference that took place one month ago is much lower than referring back to a conference that occurred several days ago. Keeping conference data, such as video data, to which there is a small possibility of referring in the high quality form in which such data was stored, is extremely inefficient in terms of conserving storage capacity. It is preferable to reduce the volume of this data through deletion or thinning compression with a suitable timing.

However, there is still a requirement to reproduce the actions (gestures and the like) of the speaker as well as the manner of speech and subtle nuances for important scenes even for old conference recordings. Accordingly, there is a requirement to maintain the audio signal or video signal of important periods during which this kind of characteristic event occurred at the same high quality.

In the first embodiment, the present invention performs a compression process that retains the high quality of only the video of the important portions in the recorded conference video and compressing the remaining portions with a high compression ratio when one month has elapsed from when the audio data and video data of a conference were recorded.

With this first embodiment when the important portions of video are played back, as described below, high quality images with smooth actions are played back. When the other portions are played back, images in which the action is stiff results because of so-called frame dropping. However, because it is possible to compress the portions other than the important scenes with a high compression ratio, the data volume to be stored is greatly reduced.

In this example, it is assumed that times when a conference participant takes a memo or times when conversation among conference participants is active are the important scenes in the conference. By taking these important scenes and storing only the data in the neighborhood when a conference participant takes a memo or times when conversation among conference participants is active in high quality forms and compressing the other portions with a high compression ratio, it is possible to greatly reduce the data volume needed to store the conference video.

Figure 2:
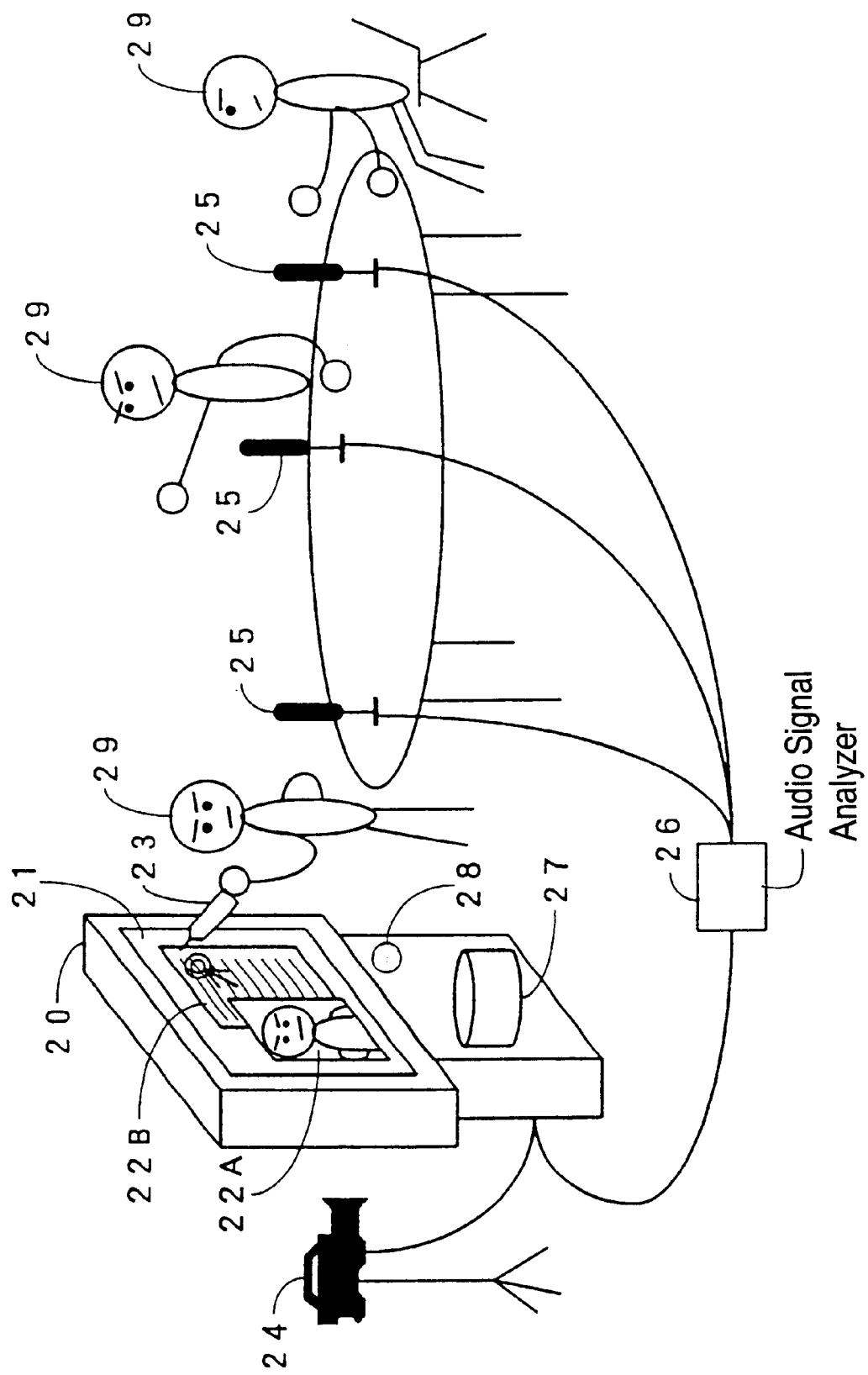
FIG. 2 is a schematic diagram of an exemplary system for which the present invention is applied.

FIG. 2 shows the conference scenery in the case of this embodiment. The apparatus according to this embodiment includes an electronic conference apparatus 20 configured so as to compress only the video data stored in the storage medium 27 and to not compress the audio data stored in the storage medium 27.

This electronic conference apparatus 20 gives the same feeling as writing on a white board with a marker. It is possible to write freely using an electronic pen 23 on the projector screen and it is also possible to store the progress of the discussion and the conclusions as an electronic file. To this end, the electronic conference apparatus 20 has a built-in personal computer (not shown).

The electronic conference apparatus 20 is connected to a network by an ISDN, for example, via the personal computer. Using this configuration, it is possible to realize an environment such that the audio data and video data of the progress of the conference are shared simultaneously over long distances as though the conference was being conducted in the same room.

Furthermore, this electronic conference apparatus 20 is provided with a display screen 21. The method of displaying images on this display screen 21 is the so-called projection method of display by projection images onto the back surface of the screen. Furthermore, this electronic conference apparatus 20 is provided with a function for detecting the contact input coordinate position of the electronic pen 23 on the display screen 21. The detected contact input coordinate position is input into the personal computer as user input data and stored in the storage medium 27.

In addition, the electronic conference apparatus 20 is provided with an audio input terminal and an image input terminal for inputting time-series data, such as audio data and image data. during the conference. In this embodiment, the audio signals of the remarks of a plurality of conference participants 29 collected by microphones 25 distributed among the conference participants, are input into an audio signal analyzer 26. The output of the audio signal analyzer 26 is input into the audio input terminal of the electronic conference apparatus 20.

The audio signal analyzer 26 analyzes the audio signal input from the plurality of microphones 25, identifies from which microphone the input audio signal was input, and outputs the identification results along with the audio signal to the electronic conference apparatus 20. In addition, the image signal of the conference scenery and paper documents photographed by a video camera 24 is input into the image input terminal of the electronic conference apparatus 20.

The time-series data that is successively input may comprise analog signals input from video cameras, microphones, video decks, tape recorders, sensors or the like, or may be encoded digital signals. Furthermore, they may be digital signals input via a computer network or computer bus. In other words, the data that is successively input as time passes entirely corresponds to the time-series data referred to in this invention.

On the display screen 21 of the electronic conference apparatus 20, the image created by the image data from the video camera 24 connected to the image input terminal of said electronic conference apparatus 20 and the image of the electronic documents input via the personal computer 20 of this electronic conference apparatus 20 are displayed as separate window images 22A and 22B, as shown in FIG. 2. The image data displayed on this display screen 21 is also stored in conjunction with the user-input data and audio data.

In addition, the personal computer housed in this electronic conference apparatus 20 is internally equipped with a data compression and storage apparatus. In the storage medium 27, the data compression and storage apparatus stores the user-input data, the image data from the video camera 24 photographing the conference scenery, and the audio data from the microphones 25. The data compression and storage apparatus is able to compress, as described hereafter, the audio or image data stored in the storage medium 27.

Furthermore, the image data stored in the storage medium 27 is displayed on the display screen 21 in accordance with a playback request from the user. Likewise, the audio data stored in the storage medium 27 is played back from speakers 28. The electronic conference apparatus 20 is provided with a playback section for this purpose. When the user designates an arbitrary user-input data item from among the user-input data items displayed on the display screen 21, the playback section reads from the storage medium 27 and plays back the audio data and/or image data recorded at the time the designated user-input data is input.

When the user designates an arbitrary user-input data item, the image displayed on the display screen 21 at the time this designated user-input data was input is also read from the storage medium 27, played back and displayed on the display screen 21.

Figure 1:
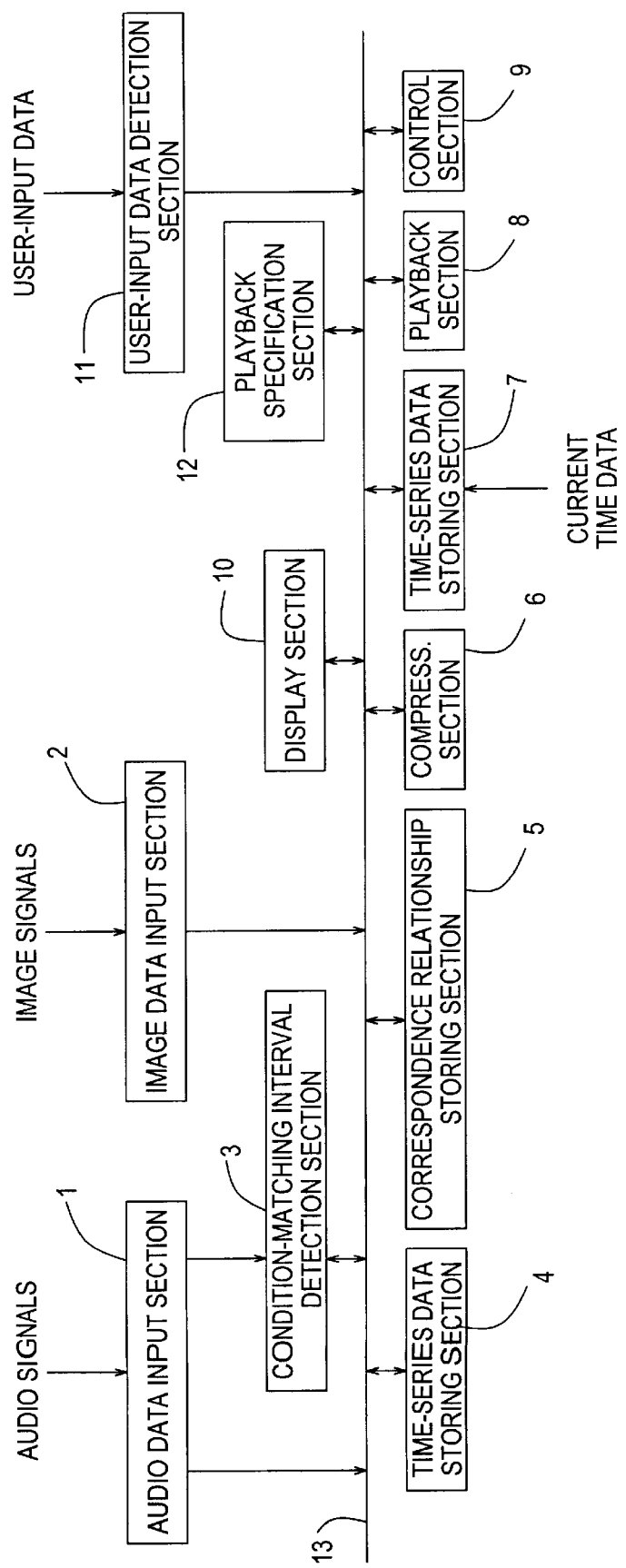
FIG. 1 is a functional block diagram describing a first embodiment of the present invention.

FIG. 1 is a block diagram showing the data storage apparatus of an embodiment of the present invention. The data storage apparatus of this embodiment is composed of an audio data input section 1, an image data input section 2, a condition-matching interval detection section 3, a time-series data storing section 4, a correspondence relationship storing section 5, a compression section 6, a time-series data storing section 7, a playback section 8, a control section 9, a display section 10, a user-input data detection section 11, and a playback specification section 12, each connected to a system bus 13. In this embodiment, the output terminal of the audio data input section 1 is also connected to the condition-matching interval detection section 3.

Each section in FIG. 1 may be comprised as a separate block or the structure may be such that a single block includes several sections. In addition, a single section may also be partitioned among several blocks.

The audio data input section 1 receives the audio signals from the microphones 25, converts these into digital audio signals, and transmits the results to the system bus 13 and condition-matching interval detection section 3.

The image data input section 2 receives the image signal from the video camera 24. If the image signal from the video camera 24 is digital, it is received and then transmitted to the system bus 13. If the input image signal is not a digital signal, the image data input section 2 converts the input image signal into a digital image signal and then outputs it to the system bus 13.

The condition-matching interval detection section 3 monitors the digital audio signal from the audio data input section 1 and detects audio intervals that coincide with conditions established beforehand. In this example, a condition-matching interval is detected using an audio signal input above a predetermined level and the detection of an active conversation pattern from this input audio signal as conditions. In this way, the intervals when the conference participants are engaging in active discussion are detected as condition-matching intervals. The audio signal analyzer 26 and a portion of the electronic conference apparatus 20 fulfill the role of this condition-matching interval detection section 3.

As a method for detecting the absence or presence of an audio signal above a predetermined level, the condition-matching interval detection section 3 has a detection function that recognizes the starting point of the speaker's remarks by detecting that the input audio level is above the predetermined level. The condition-matching interval section 3, likewise, recognizes the end point of the speaker's remarks by detecting when the audio level falls below a predetermined threshold value, as shown in FIG. 3.

Figure 3:
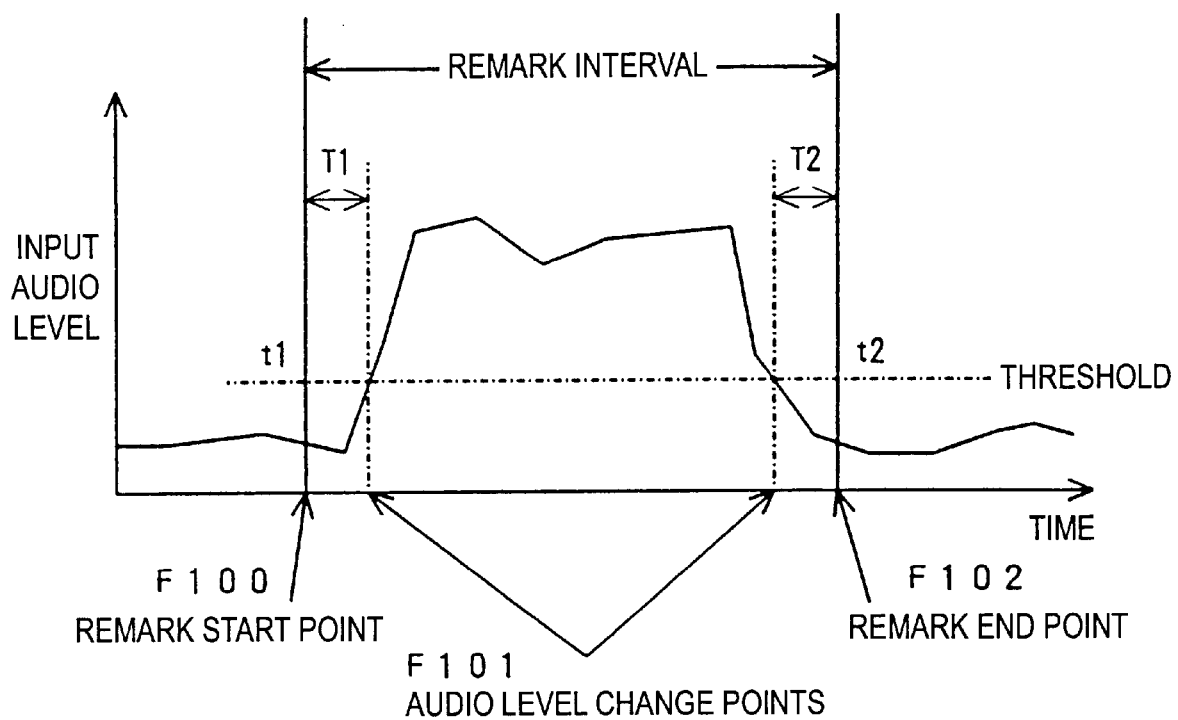
FIG. 3 is a diagram describing an audio level detection operation of the condition-matching interval detection section of a first embodiment of the present invention.

However, as shown in FIG. 3 when the audio level change point F101 itself, where the audio level intersects the threshold level, is taken to be the start point or end point of the remarks, the initial portion and the final portion of the remarks are not included in the condition-matching interval. Consequently, the remark start point is taken to be the point in time F100 a fixed time T1 earlier than the change point F101 when the audio level changes from a small level to a large level. In addition, the remark end point is taken to be the point in time F102 a fixed time T2 later than the change point F101 when the audio signal level changes from a large level to a small level.

In this embodiment configuration, the audio level at a given time is the value that smooths the audio level around that time and, for example, is the average value of the instantaneous audio levels of two seconds before and after a certain time.

With this embodiment configuration, the microphones 25 are arranged for each speaker, as shown in FIG. 2, and by comparing the audio input levels from the microphones of each speaker using the audio signal analyzer 11, the audio signal analyzer 11 specifies the speaker that produced the input audio signal.

As a method for specifying the speaker, it would also be appropriate to specify the speaker from the characteristics (voice patterns and the like) of the audio signal or to specify the speaker from the movement of the face and mouth in the image data. In those cases, it is not necessary to provide a plurality of microphones for all of the conference participants, but rather, to provide one microphone or fewer microphones than the number of conference participants. In addition, it is also possible to arrange a plurality of microphones, to detect the position of the source of the sound by analyzing the phase difference in the audio signals input from these microphones, and through this, to specify the speaker.

The condition-matching interval detection section 3 determines that active conversation is being conducted, the shorter the time interval is from when one speaker finishes speaking to when another speaker starts speaking. In addition, it is also determined that active conversation is being conducted when one speaker starts speaking before another speaker has finished speaking.

Figure 4:
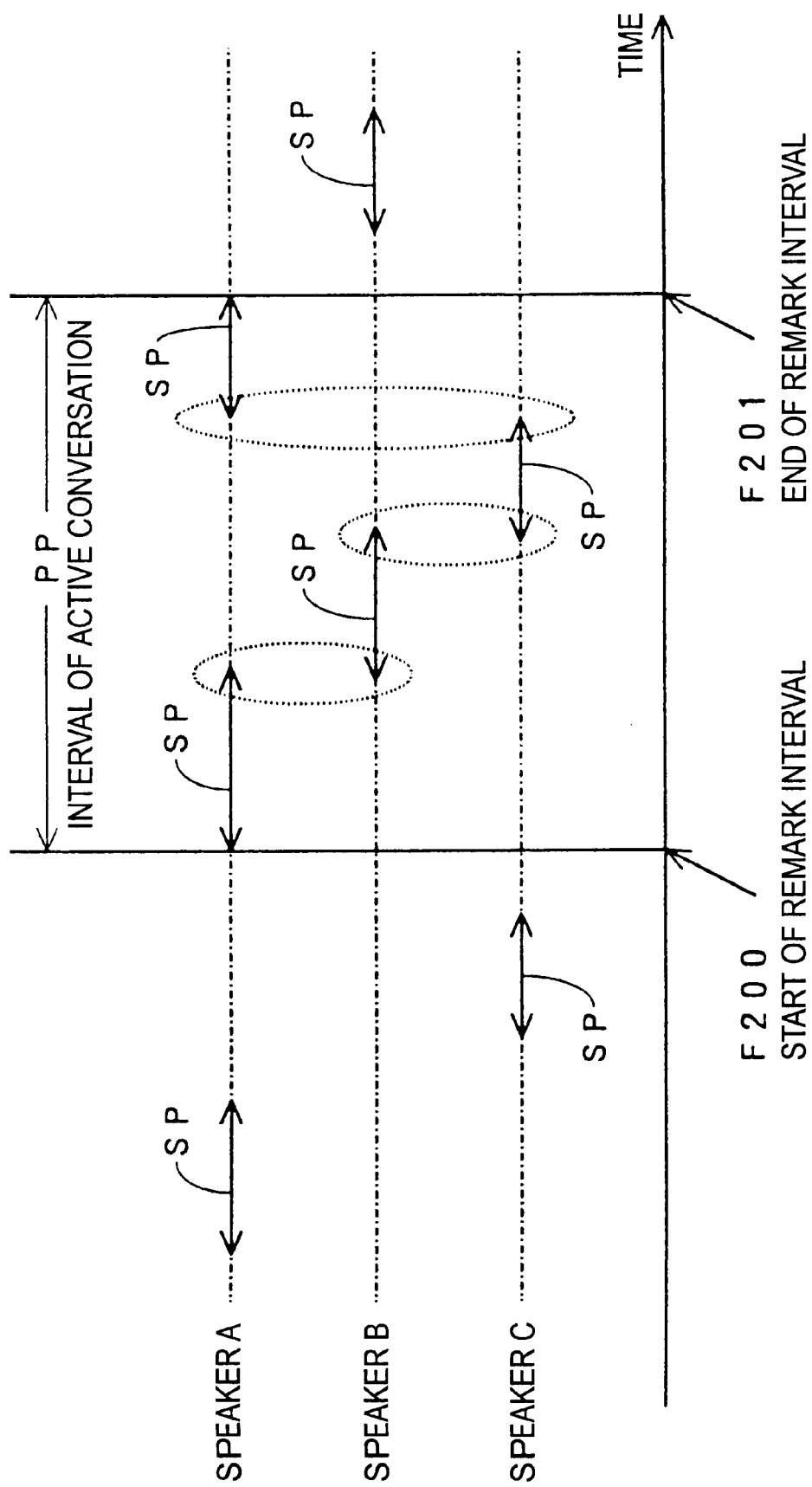
FIG. 4 is a diagram describing the operation of detecting an active conversation interval in the condition-matching interval detection section of the first embodiment.

FIG. 4 shows the process by which the condition-matching interval detection section 3 recognizes an interval where conversation is active. This figure shows the case where it is determined that active conversation is being conducted, the shorter the time interval is from when one speaker finishes speaking to when another speaker starts speaking. The audio signal from each speaker above a predetermined level is recognized as the remark interval SP of said speaker, and a pattern wherein this remark interval SP switches in a short time among the plurality of speakers so as to be contained in the circle made with dashed lines in FIG. 4 is detected as an active conversation pattern.

The condition-matching interval detection section 3 detects whether or not the speaker switches within a set time determined beforehand after one speaker has finished speaking, in order to detect a pattern of speakers alternating within a short time. For example, assume that this set time is 0.5 seconds. This set time may also be changeable by the user.

In addition, in this embodiment configuration a pattern in which the remark interval SP partially overlaps because one speaker has started speaking before another speaker has finished speaking, is also detected as an early speaker switch pattern.

Furthermore, with the condition-matching interval detection section 3, an interval of active conversation is also recognized depending on whether or not the early speaker switch pattern continues for a set number of times, for example three times. For example, in the example shown in FIG. 4, the early speaker switch pattern continues for four times in the interval PP, and hence this interval PP is detected as an interval of active conversation. In other words, the start F200 of the remark interval containing this fact speaker switch pattern that continues for four times is taken to be the start point of the interval of active conversation. The end F201 of the remark interval containing the early speaker switch pattern is taken to be the end point of the interval of active conversation.

The correspondence relationship storing section 5 creates a correspondence between and stores the user-input data input by the user, for example, using the electronic pen 23, data (e.g., the relative coordinates and absolute coordinates on the X-Y coordinate axes and the like) specifying the display position of this user-input data on the screen, and the storage address in the time-series data storing section 4 of the image data or audio data input in an important interval, such as an interval determined by this user input data and the condition-matching interval detected by the above-described condition-matching interval detection section 3.

With this embodiment configuration, as the data of the important interval, the start address and end address of the condition-matching interval containing the point in time at which the user-input data was input are stored in the correspondence relationship storing section 5. In other words, the correspondence relationship storing section 5 creates an association between and stores the data specifying the respective user-input data and the storage address in the above-described time-series data storing section 4 of the audio data or image data in an important interval. The important interval is taken to be an interval specified by the respective user-input data and the detection results from the condition-matching interval detection section 3. This correspondence relationship storing section 5 may be composed, for example, of a disk storage medium, a semiconductor memory, or the like.

The compression section 6 in this embodiment configuration accomplishes data compression on the image data stored in the above-described time-series data storing section 4. In this case, the compression section 6 is composed so that the data compression ratio or data compression method can be dynamically varied on the basis of the data of the interval specified by the user-input data from the correspondence relationship storing section 5 and the detection results of the condition-matching interval detection section 3.

In addition, in this embodiment configuration the compression section 6 assumes motion image data and treats a predetermined time length or a predetermined number of frames of this motion image data as a single processing unit. For example, the compression process is accomplished treating an image string of a continuous 10 frames as a single unit partial image string. For image data of intervals other than intervals specified by the above-described user-input data and the detection results of the condition-matching interval detection section 3, a compression process is accomplished wherein only the lead one frame in the 10 frames is retained and the data of the remaining frames is eliminated. On the other hand, for intervals specified by the above-described user-input data and the detection results of the condition-matching interval detection section 3, the above-described thinning process is not performed on the image data, and all of the 10 frames are stored.

Accordingly, when the image data of intervals other than intervals specified by the above-described user-input data and the detection results of the condition-matching interval detection section 3 is played back, the result is so-called frame dropping and a motion image in which the action is stiff, but the data volume is greatly reduced. On the other hand, when the image data of intervals specified by the above-described user-input data and the detection results of the condition-matching interval detection section 3 is played back, a high quality motion image with smooth action is played back.

The time data storing section 7 stores the time when recording of the input audio signal and image signal to the time-series data memory 4 was started. This time data storage section 7 is composed of, for example, a disk storage medium, a semiconductor memory, or the like.

Furthermore, the time data storing section 7 has a function for measuring the elapsed time from the recording start time. For this reason, the current time data is supplied to this time data storing section 7 from an unrepresented clock circuit. Furthermore, in this embodiment configuration, when the elapsed time from the recording start time has reached a predetermined set time the time data storing section 7 outputs a compression trigger timing signal that is the impetus for starting the above-described compression of the image data of the time-series data storing section 4 by the compression section 6.

The playback section 8 is a functional section for playing back the audio signal or image signal stored in the time-series data storing section 4, as described above. The control section 9 controls all of the process actions of the electronic conference apparatus 20 of this example.

The display section 10 is a projection-type display apparatus portion provided with the above-described display screen 21. Furthermore, in this example this section also functions as a pen/tablet integrated input-output apparatus. It is also possible to compose this display section 10 using, for example, a CRT monitor, a liquid crystal monitor, or the like.

The user-input data detection section 11 is composed of, for example, a tablet attached to the display screen 21. This section detects the user input from the electronic pen 23 and outputs the pen trace data as user-input data. At this time, the pen trace corresponding to the pen trace data is displayed on the display screen 21 of the display section 10.

Besides the writing or diagrams (objects such as lines, quadrilaterals and circles) from the pen (or a mouse, trackball, touch panel or the like), code data from character recognition of the writing data and code data from a keyboard are also appropriate as user-input data In addition, data with properties that the user-input data does not display, such as editing data including moving, copying and deleting the displayed user-input data, data indicating that a page change has occurred, data indicating that the shutter of a still camera has been pressed, or data indicating that a hypothetical eraser has been used, are also appropriate. In this case, a specific mark indicating the existence of that user-input data is displayed on the display section 3. In other words, inputs by the user to an apparatus having computation processing capabilities while time-series data (e.g., the audio signal or image signal) to be input exists are all considered to be user-input data in the present invention.

The playback specification section 12 is used in playing back the user-input data, audio data and image data stored in memory by specifying the user-input data. This playback specification section 12 detects the specified portion as the playback portion from among the user-input data displayed on the display screen 21 when the user makes specification via the tablet, as will be described hereafter.

Figure 5:
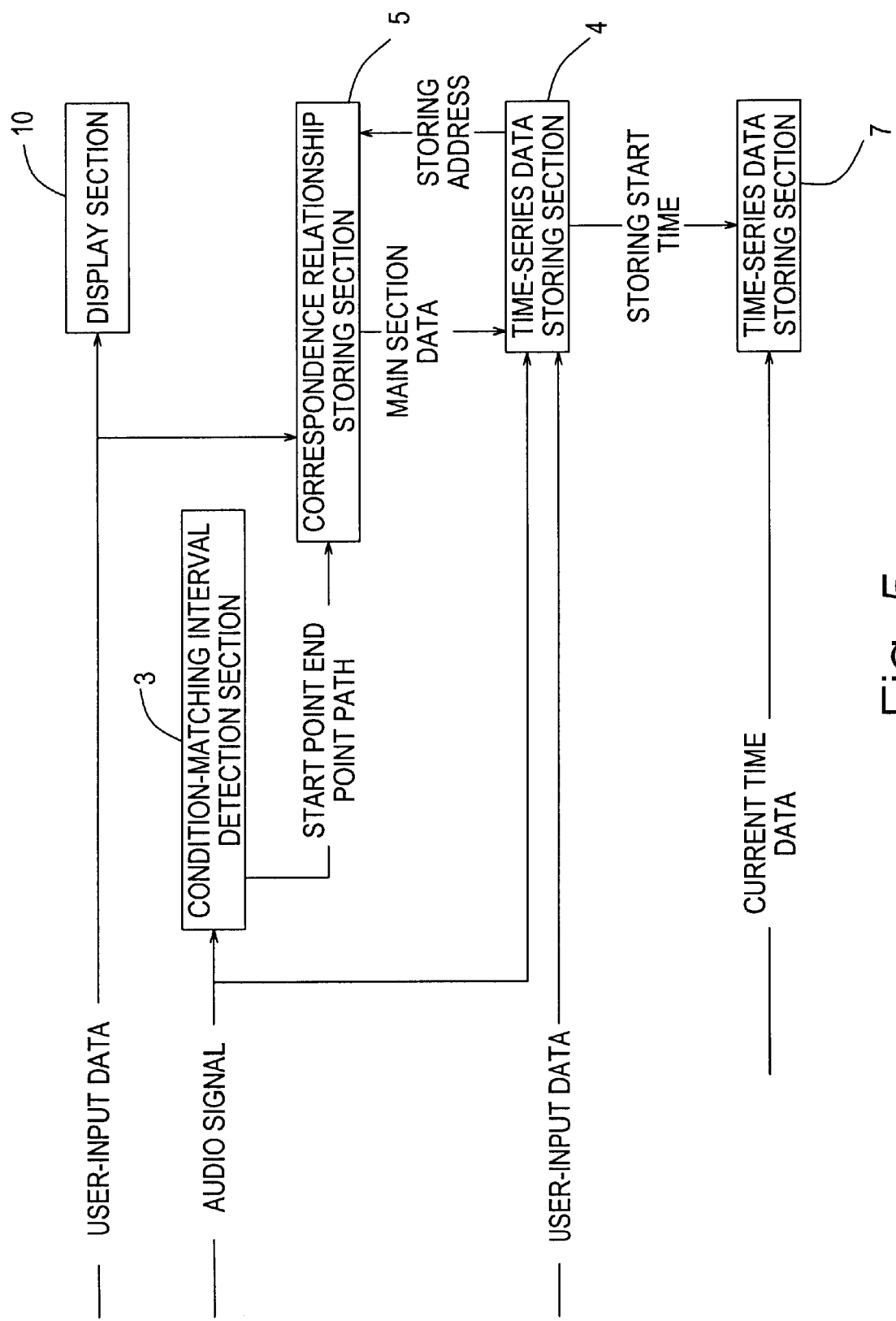
FIG. 5 is a diagram describing a flow of the operation during data recording in the first embodiment.

Next, the actions during recording in the electronic conference apparatus 20 as an example of a data storage apparatus with the above-described composition will be described. FIG. 5 is a drawing that explains the actions during recording in this embodiment configuration along with the flow of each type of data and the flow of the outputs of each section.

When the conference is started and an audio signal from the microphones 25 and the image signal from the camera 24 are supplied to the electronic conference apparatus 20, the audio signal and the image signal are successively stored in the time-series data storing section 4. In addition, the audio signal is also input into the condition-matching interval detection section 3.

The condition-matching interval detection section 3 compares the audio level of the audio data from the microphones 25 with a preset threshold level, as described above, and detects the remark start point and remark end point for the conference participants. The condition-matching interval detection section 3 also sets the interval between these as the speaker remark interval SP. Furthermore, this section 3 detects short time switching and partial overlapping between the plurality of conference participants in this remark interval SP and detects intervals with active conversation as condition-matching intervals. Furthermore, the data of the start point and end point of the detect condition-matching interval are supplied to the correspondence relationship storing section 5.

Figure 6:
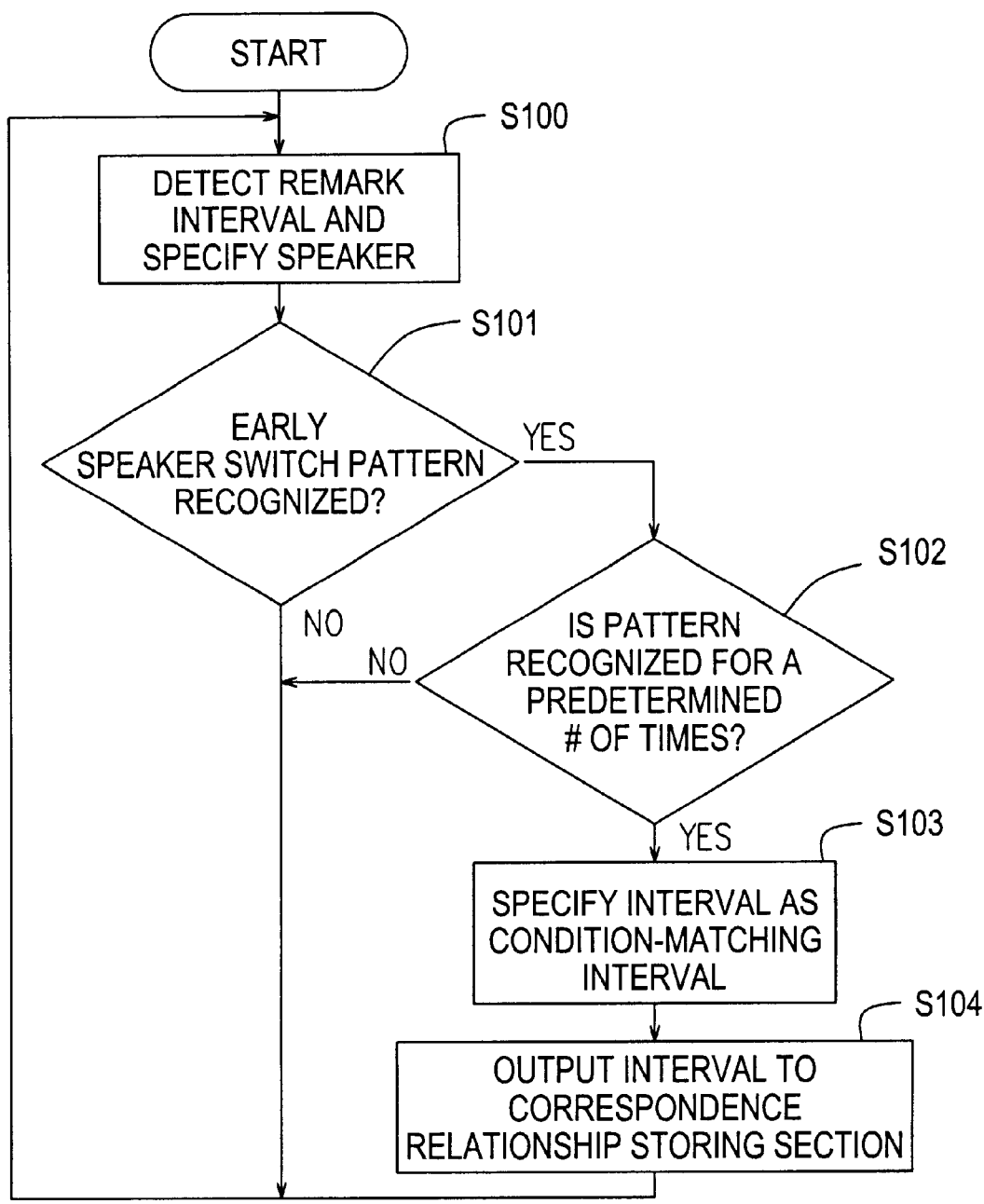
FIG. 6 is a flow chart describing an example of the process routine of the condition-matching interval detection section in the first embodiment.

FIG. 6 is a flowchart describing the actions of the condition-matching interval detection section 3. When the audio signal from the audio data input section 1 is supplied as a digital signal to the condition-matching interval detection section 3, in step S100 the detection of the above-described remark interval SP and the specification of the speaker are accomplished. As the method of speaker specification, the audio input level from the microphones 25 arranged for each speaker is compared using the audio signal analyzer 26, as described above.

Following step S100, in step S101 patterns in which the speakers alternate in a short time including partial overlapping is recognized and, when an early speaker switch pattern is detected, the flowchart moves to step S102. In step S102, a determination is made as to whether or not this pattern is continued for a preset number of times. As described above, when conditions are established beforehand to the effect that when an early speaker switch pattern is detected three or more times continuously, the remark interval containing that pattern is recognized as an interval in which active conversation is conducted, the interval PP is detected as an interval with active conversation in the above-described example in FIG. 4, and the flowchart then moves to step S103.

In step S103, the interval detected as an interval with active conversation is specified as a condition-matching interval. In other words, for example in the example of FIG. 4 the interval PP is specified as an interval with active conversation (a condition-matching interval) with the start of the interval with active conversation as the start F200 of the interval PP and the ending of the interval with active conversation as the end F201 of the interval PP. As data for specifying the condition-matching intervals, it would also be appropriate to use data concerning either the start or end of said interval along with data on the length of the interval.

In the next step S104, the condition-matching interval specified in step S103 is output to the correspondence relationship storing section 5, and the flowchart then returns to step S100 and detection of a new condition-matching interval is started. In addition, in step S102 the flowchart also returns to step S100 and detection of a new condition-matching interval is started when it is recognized in step S102 that an early speaker switch pattern is not present at least a preset number of times.

On the other hand, when the user-input data detection section 11 detects the input of pen trace data (user-input data), the detected pen trace data is displayed on the display section 10 and is also stored in the correspondence relationship storing section 5.

Figure 7:
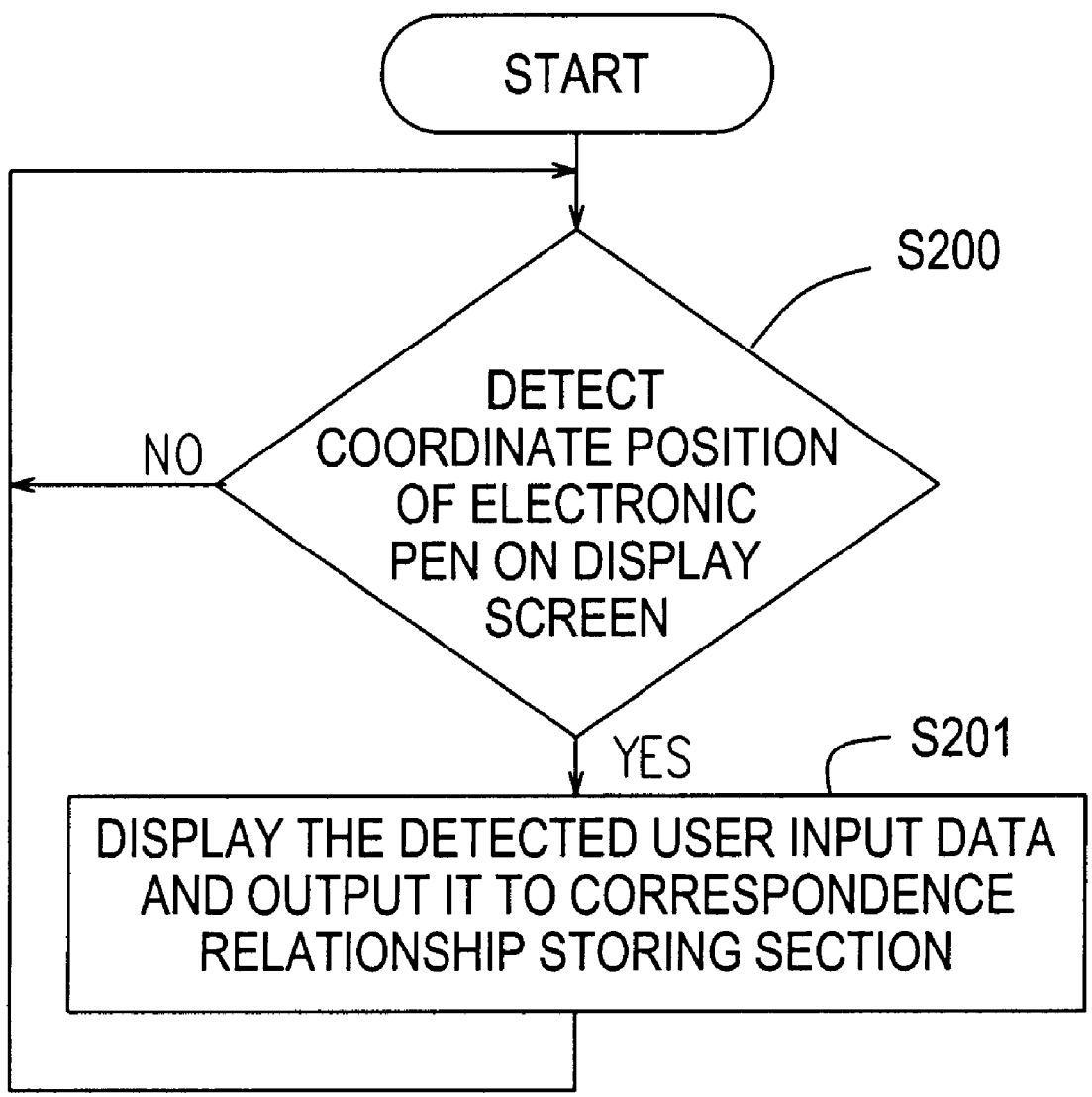
FIG. 7 is a flow chart describing an example of the process routine of the user-input data detection section in the first embodiment.

FIG. 7 is a flowchart explaining the actions of the user-input data detection section 11. In step S200, the user-input data detection section 11 detects the coordinate position where the electronic pen 23 touches the display screen 21 as user-input data. In step S201, the user input detection section 11 displays the detected user-input data by successively outputting this to the display section 10 along with storing the user-input data by outputting such to the correspondence relationship storing section 5.

Figure 8:
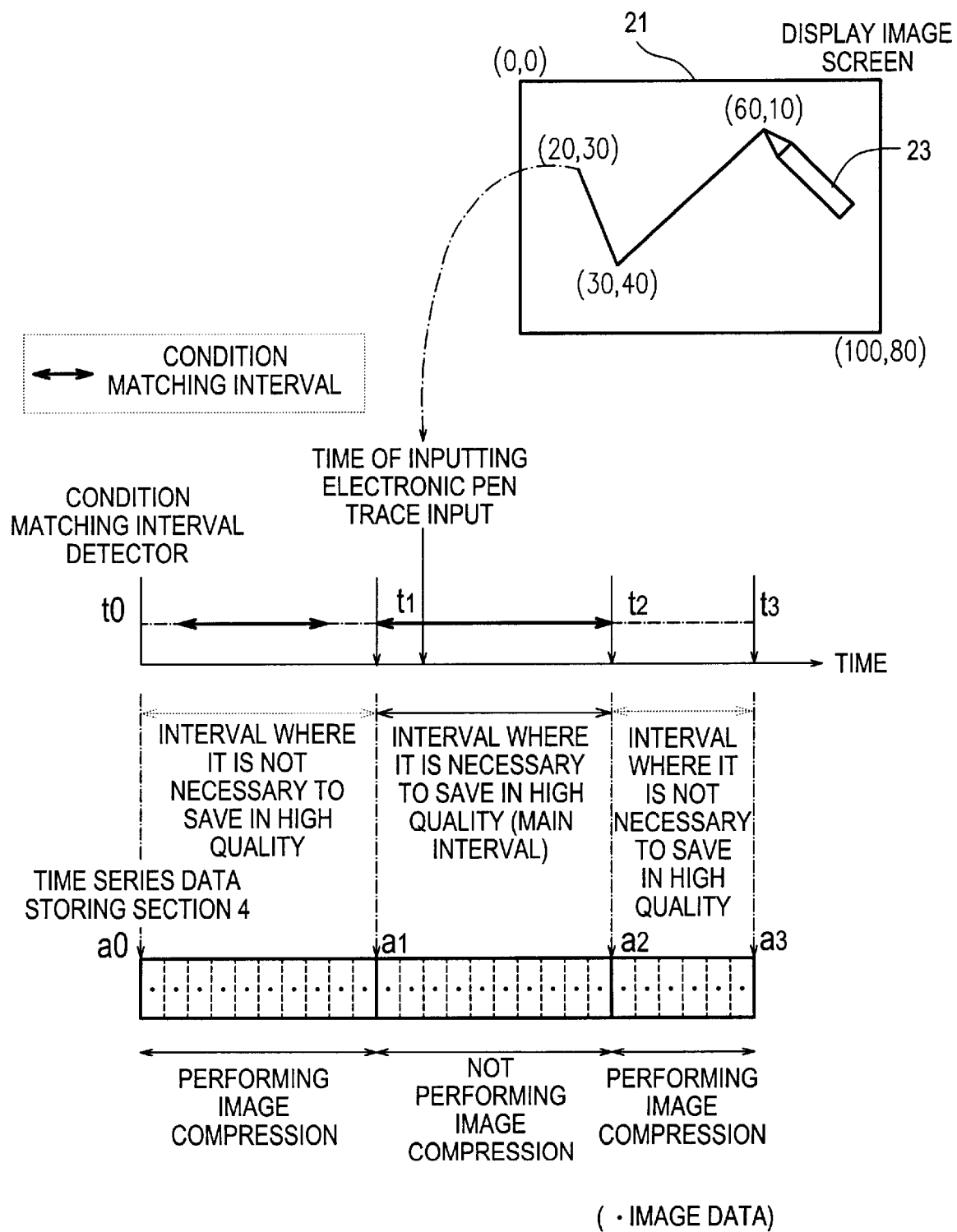
FIG. 8 is a diagram describing the pen trace input data, condition-matching interval and the storing status of the time series storing section in the first embodiment.

FIG. 8 is a drawing that describes the creation of a correspondence between the pen writing input data that is the detection result of the user-input data detection section 11, the condition-matching interval that is the detection result of the condition-matching interval detection section 3, and the storage status (the status prior to the implementation of the compression process) of the time-series data storing section 4 where the image data is stored. The correspondence relationship data of this data is stored in the correspondence relationship storing section 5 as described above.

The correspondence relationship storing section 5 stores the condition-matching interval containing the point in time when the user-input data was input as an important interval for the input audio data or image data. In other words, even with a condition-matching interval, that condition-matching interval is not recognized as an important interval when the user-input data is not detected in that condition-matching interval. For example, in FIG. 8 user-input data is not detected in the condition-matching interval from time t0 to time t1, and consequently this condition-matching interval is not recognized as an important interval, while the condition-matching interval from time t1 to time t2 containing the input time of the pen writing as user-input data is specified as an important interval. Furthermore, the image data (the image data from address a1 to address a2) stored in the time-series data storing section 4 from time t1 to time t2 is the data of the important interval among the input image data, and consequently, this is kept at high quality even when the below-described compression process is implemented.

Figure 9:
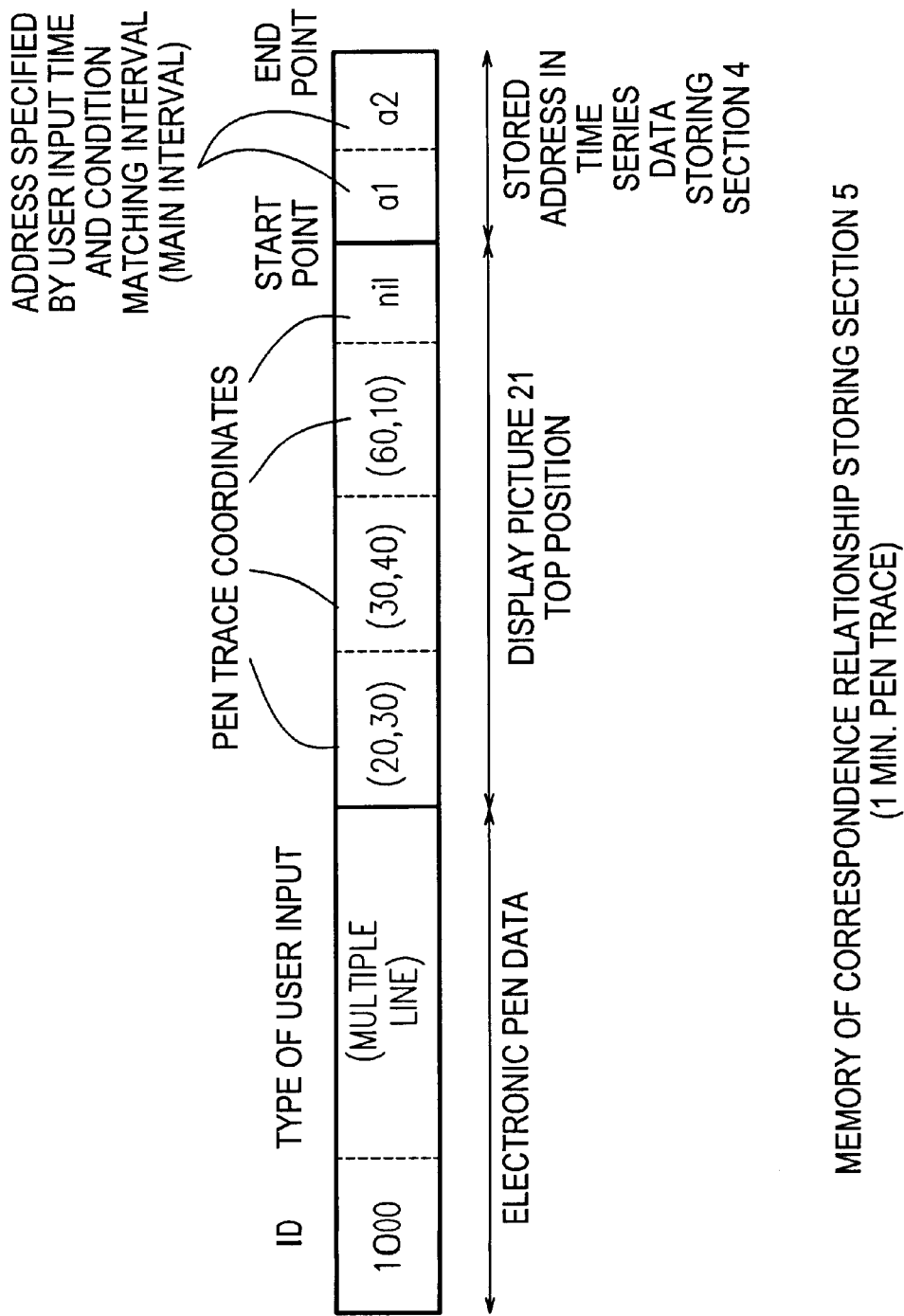
FIG. 9 is a diagram describing the storing status of the correspondence relationship data to be stored in the correspondence relationship storing section in the first embodiment equivalent to one pen trace.

FIG. 9 is an example of the correspondence relationship data stored in the correspondence relationship storing section 5. As shown in FIG. 9, an identifier for uniformly stipulating the user-input data and data stipulating the type of user-input data are stored as the pen trace data the user input and three X-Y coordinates (20,30), (30,40) and (60,10) and "nil" indicating the termination of the coordinate data are stored as the display position on the display screen 21. In addition, the address a1 (starting point address) and the address a2 (ending point address) stipulated by the condition-matching interval and the user-input data are stored as the storage addresses in the time-series data storing section 4.

Naturally, what is stored in the correspondence relationship storing section 5 need not be the pen trace data, the display coordinates and the storage addresses themselves, but may be specific data specifying these. Similarly, and the data storage structure of the correspondence relationship storing section 5 need not be a table format but may be a storage structure such as a list structure or the like.

In addition, as in this example, if compiled coordinate point strings expressing multiple lines are stored as one pen trace data, it is possible during playback to stipulate one of these from the coordinate point string and to specify the pen trace data corresponding to this coordinate point string, so that it is possible to play back the audio and images from the same storage address.

Figure 10:
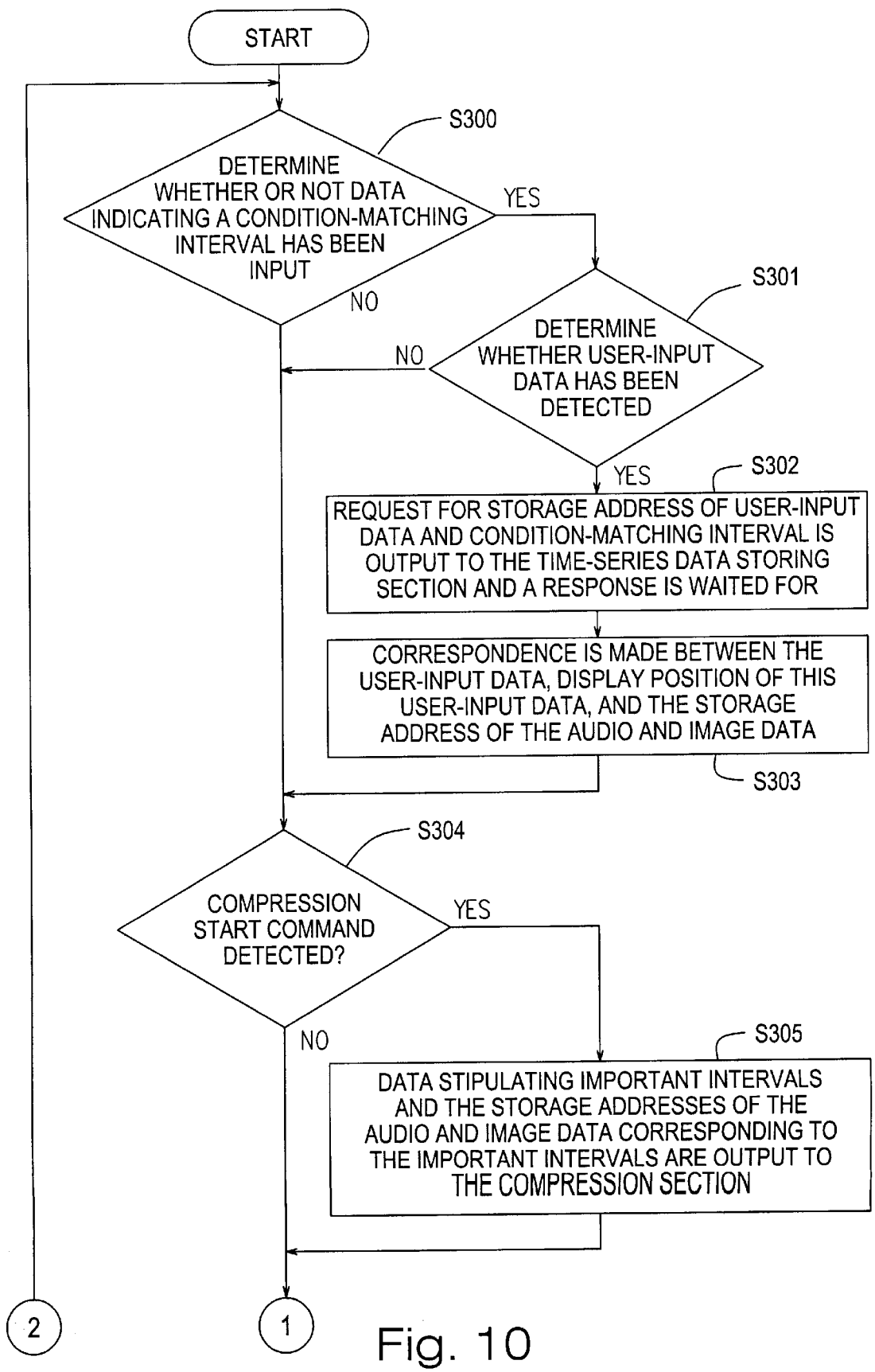
FIG. 10 is a flow chart describing a first portion of an example of a process routine of the correspondence relationship storing section in the first embodiment.
Figure 11:
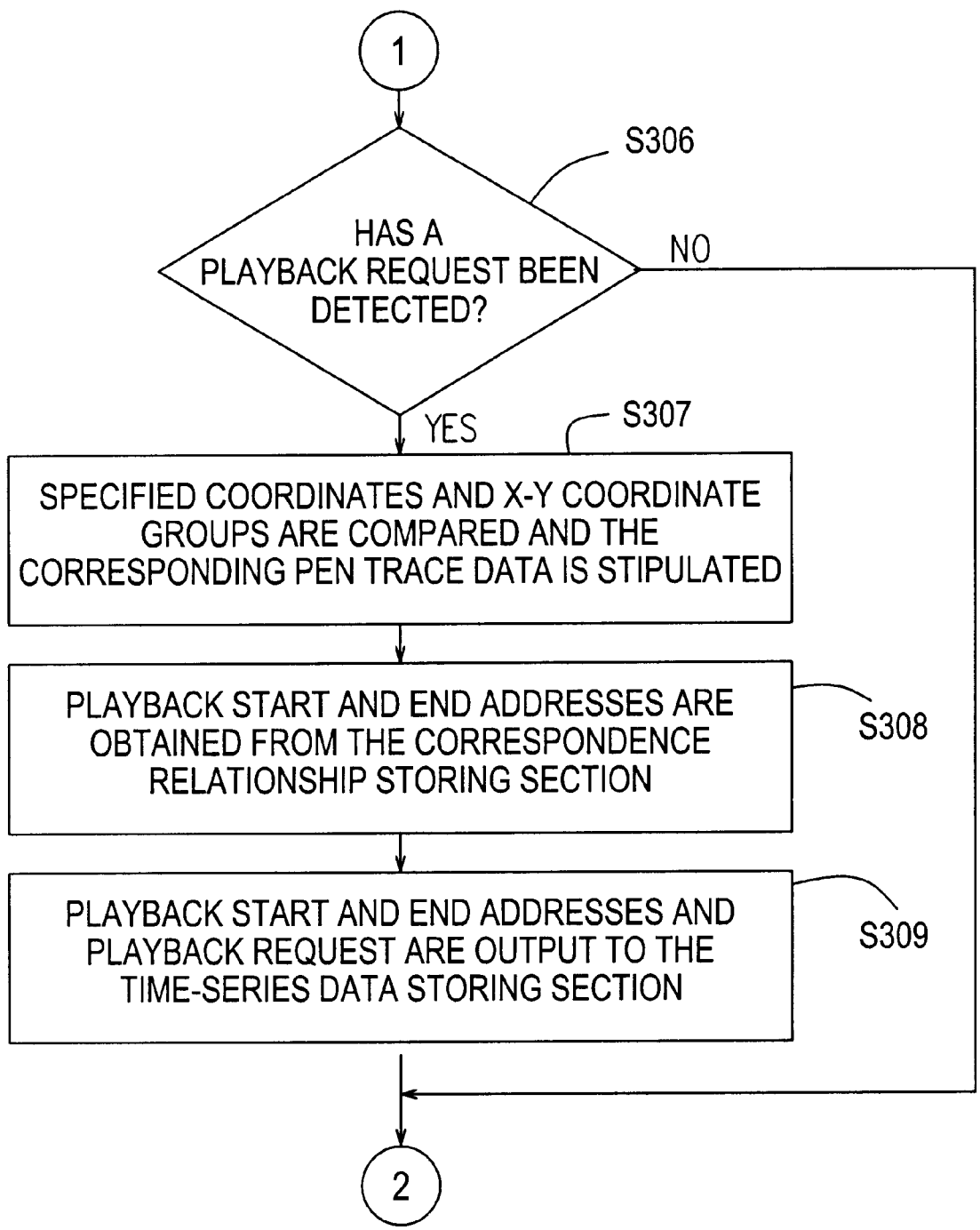
FIG. 11 is a flow chart describing a second portion of an example of a process routine of the correspondence relationship storing section in the first embodiment.

FIG. 10 and FIG. 11 are flowcharts explaining the actions of the correspondence relationship storing section 5.

At the time of recording, detection is made in step S300 to determine whether or not data indicating a condition-matching interval has been input from the condition-matching interval detection section 3. When the input of a condition-matching interval is not detected, the flowchart returns to step S300 via step S304 and step S306, and detection of the absence or presence of the input of data indicating a condition-matching interval is accomplished.

When the input of a condition-matching interval from the condition-matching interval detection section 3 is detected in step S300, the flowchart moves to step S301. In step S301, a determination is made as to whether or not user-input data has been detected in said condition-matching interval. When it is determined that user-input data has been detected in said condition-matching interval, the flowchart moves to step S302.

In step S302, a request for the storage address and data indicating the user-input data and the condition-matching interval is output to the time-series data storing section 4 and a response is waited for in order to acquire the storage address of the audio data or image data stored in the time-series data storing section 4 in correspondence with the important interval (the condition-matching interval containing the point in time at which the user-input data was input).

When the response is received from the time-series data storing section 4, the flowchart moves to step S303 where a correspondence is made between the user-input data, the display position of this user-input data on the display section 10, and the storage address in the time-series data storing section 4 of the audio data and image data stored in the time-series data storing section 4.

Following step S303, the flowchart returns to step S300 via step S304 and step S306, and detection of the absence or presence of the input of data indicating the next condition-matching interval is accomplished.

Next, the actions of the time-series data storing section 4 corresponding to this time will be described with reference to the flowchart in FIG. 12. Steps S400 through S404 in this process routine are the steps containing the actions during recording, while steps S405 and S406 describe the actions during playback.

Figure 12:
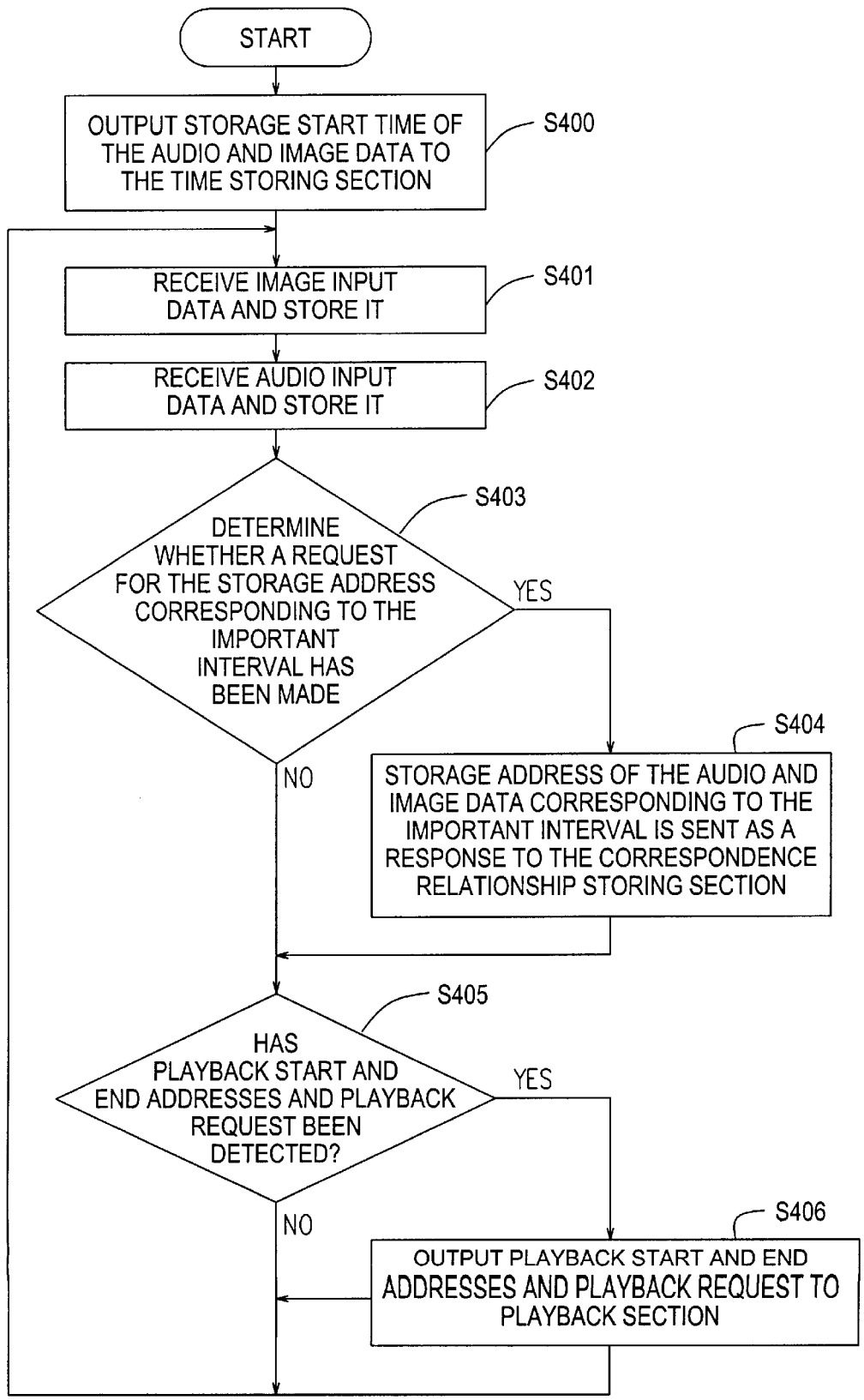
FIG. 12 is a flow chart describing an example of a process routine of the time-series data storing section in the first embodiment.

In other words, to describe the actions of the time-series data storing section 4 during recording in FIG. 12, first when this recording action is started, the time-series data storing section 4, in step S400, outputs the storage start time of the audio data and image data to the time data storing section 7 and causes this to be recorded. Next, the flowchart moves successively to step S401 and step S402, where the input of the input image data and audio data is received and these are successively stored.

Then, in the ensuing step S403, a determination is made as to whether or not a request for the storage address corresponding to the aforementioned important interval (the condition-matching interval containing the point in time when the user-input data was input) has arrived from the correspondence relationship storing section 5. When it has been detected that said request has arrived, the flowchart moves to step S404. In this step S404, the storage address of the audio data and image data corresponding to the important interval is sent as a response to the correspondence relationship storing section 5.

After it has been determined in step S403 that a request for the storage address corresponding to the important interval has not arrived, and following step S404, the flowchart returns to step S401 via step S405, and the storing of the image data and audio data is continued.

Figures 13, 14:
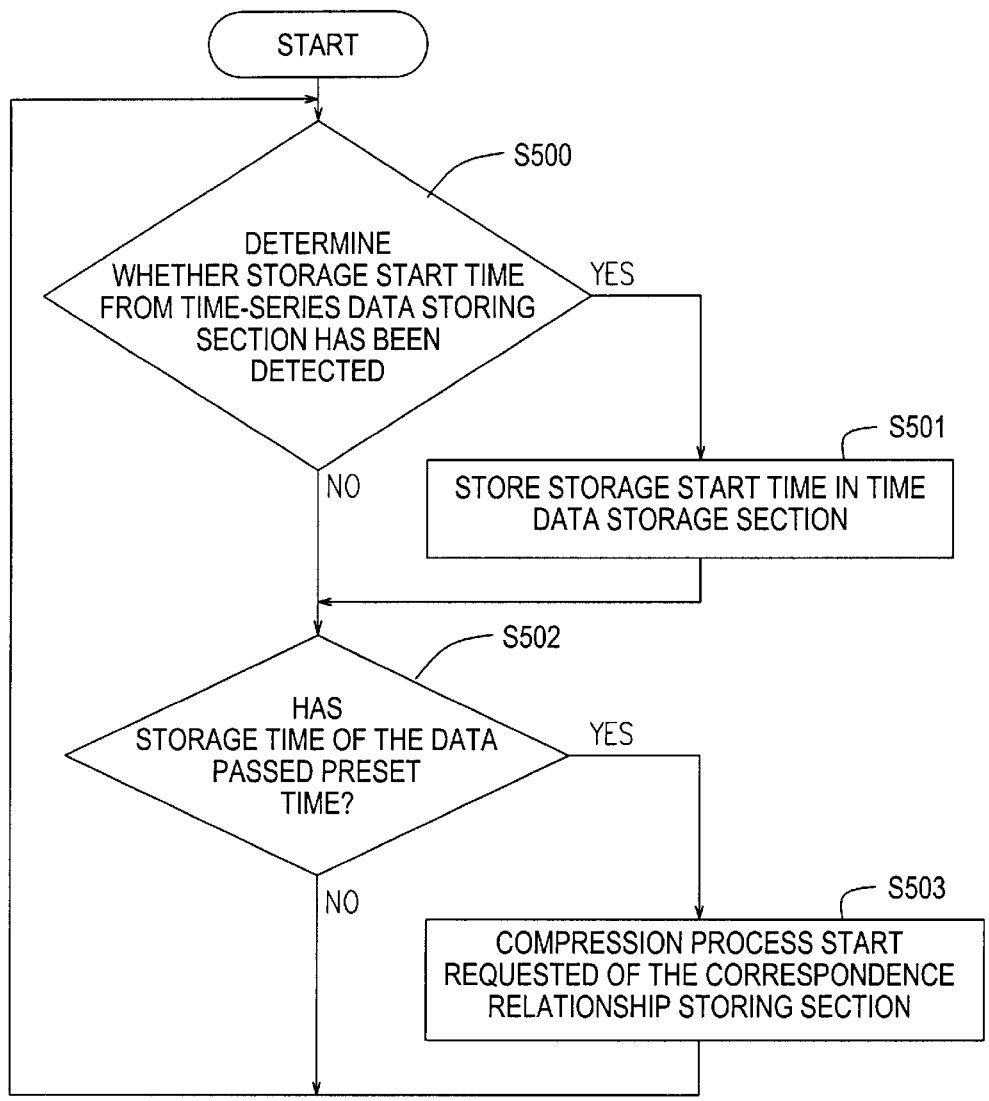
FIG. 13 is a flow chart describing an example of a process routine of the time-series data storing section in the first embodiment.
FIG. 14 is a diagram describing an example of a memory structure of the time-series data storing section in the first embodiment.

The time data storing section 7 receives the data of the storage start time through the process of the time-series data storing section 4 in step S400, and stores said storage start time. FIG. 13 is a flowchart describing the actions of the time data storing section 7, and FIG. 14 is a diagram used to explain the storage structure of the time data storing section 7. In FIG. 13, step S500 and step S501 are processes during recording, with the storage start time of the audio data and image data supplied from the time-series data storing section 4 detected in step S500 and this storage start time stored in the time data storing section 7 in step S501.

As described below, the time data storing section 7 outputs the compression process start command to the correspondence relationship storing section 5 when the elapsed time (in other words the data storage time) after the audio data and image data have been recorded in the time-series data storing section 4 has reached a preset time. Step S502 and step S503 in FIG. 13 are the steps of this process, and this compression start command process is described hereafter.

The time data storing section 7 manages the relationship between the storage start time and the name of the file housing the audio data and the image data using a table such as the one shown in FIG. 14. In this example, the record of one conference is recorded in one file. The file name is the file name attached to each conference record, and the ID in FIG. 14 is an identifier (a number in this example) for identifying each conference record file.

The storage format of this storage start time is not limited to a table format, for this may also have a list structure or a stack structure. Furthermore, it would also be appropriate to have a structure such that data specifying the storage start time is stored in the file name or the file housing the audio data and the image data.

Figures 15, 16:
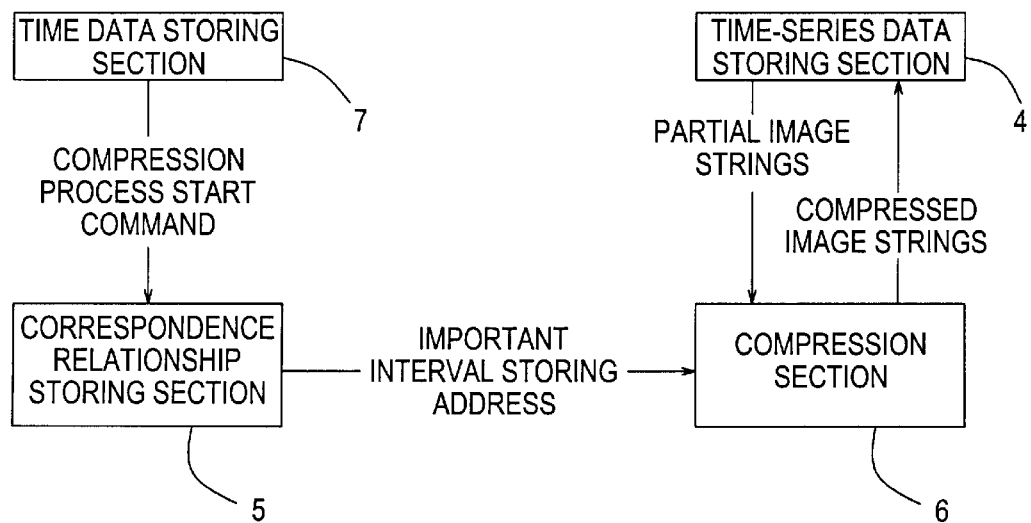
FIG. 15 is a diagram describing another example of a memory structure of the time-series data storing section in the first embodiment.
FIG. 16 is a diagram describing a flow of operation during data compression in the first embodiment.

For example, when the file size exceeds 5 M bytes, the time until the compression process starts is set to one month, and when the file size is less than 5 M bytes, the time until the compression process starts is set to two months, as shown in FIG. 15. In addition, when the file extension is a .AVI file, the time until the compression process starts is set to one month, and when the file extension is a .mpg file, the time until the compression process starts is set to two months. In these cases, it is not necessary to stipulate the time until the compression process starts for each file name. The result is that the amount of effort on the part of the user is reduced.

In this manner, in the present embodiment configuration when the conference is started and the conference record is started, the time at that start time is stored in the time data storing section 7 and the image data and audio data from the conference start time (corresponding to the storage start time) are stored in the time-series data storing section 4.

Furthermore, when user-input data is detected by the user-input data detection section 11 during the course of the conference, it is stored successively in the correspondence relationship storing section 5 along with the position data on the display screen 21. Furthermore, for the audio data during the course of the conference, when a condition-matching interval is detected as an interval with active conversation by the condition-matching interval detection section 3 and the user-input data in the condition-matching interval is detected by the detection section 11, that condition-matching interval containing the user input is recognized as an important interval. The data specifying that important interval and the corresponding storage address of the time-series data storing section are associated with each other and stored in the correspondence relationship storing section 5.

Next, the actions during compression will be described. In this first embodiment configuration, the image data and/or audio data stored in the time-series data storing section 4 are compressed when the level of importance is low (such as when a preset time has elapsed since the data was stored), so as to form empty capacity in the memory of the time-series data storing section 4. However, condition-matching intervals in which user-input data has been detected in that interval are deemed to be important intervals and those intervals are not compressed or the compression ratio is reduced so that high quality is maintained.

FIG. 16 is a drawing explaining the actions during data compression in this embodiment configuration along with the flow of each type of data and the flow of the output of each section during his time.

The time data storing section 7 outputs a compression process start command to the correspondence relationship storing section 5 when the elapsed time from when the audio data and image data were stored in the time-series data storing section 4 has reached a preset time.

In other words, in step S502 of the process routine of the time data storing section 7 in FIG. 13, the current time supplied from an unrepresented clock circuit and the storage start time stored in the time data storing section 7 are compared and a determination is made as to whether or not the storage time of the data has passed a preset time. When it is determined that this preset time has elapsed, the flowchart moves to step S503 and a compression process start is requested of the correspondence relationship storing section 5.

Furthermore, when this request has been sent, or when it is determined in step S502 that the preset time has not elapsed, the flowchart returns to step S500.

For example, when the above-described preset time is set to one month, the compression process start request is generated one month after the storage start time. The data newly stored in the time-series data storing section 4 undergoes a compression process one month later. For example, the audio data and image data of the file name "file10" recorded at 13:30 on Apr. 25, 1996 shown in FIG. 12 undergoes the above-described compression process at 13:30 on May 25, 1996.

The time up until this compression process is executed is, in this example, fixed for the time data storing section 7. However, it is also possible to make this time changeable by the user. In addition, the timing of the start of this compression process may be when the set time is approached. The compression process can also be accomplished by waiting until the system is in an idling state. In addition, the time up until compression may also be set differently for each file. It would also be appropriate to store the data stipulating the storage start time in the file name or the file housing the audio data and the image data.

When the compression start command is input from the time data storing section 7, the correspondence relationship storing section 5 detects this input in step S304 of FIG. 10. When the compression start command is detected, the flowchart moves to step S305. In step S305, the respective data stipulating the important intervals and the storage addresses of the audio data and the image data stored in the time-series data storing section 4 in correspondence with these important intervals, are output to the compression section 6. In other words, all of the data of each user-input data shown in FIG. 9 for one conference is output in one bundle to the compression section 6.

Naturally, the groups of data stipulating each important interval and storage addresses corresponding to the important intervals may be output one group at a time in succession to the compression section 6. In addition, it would also be appropriate to store the respective data stipulating the important intervals in files of the time-series data storing section 4 housing the audio data and the image data and the storage address in said files of the audio data and image data stored in the file in correspondence with each important interval.

The compression section 6, having received input from the correspondence relationship storing section 5, accomplishes data compression on the image data stored in the time-series data storing section 4. In this case, the compression section 6 executes the compression while dynamically varying the data compression ratio or data compression method on the basis of the data indicating a condition-matching interval from the correspondence relationship storing section 5.

In the case of the present embodiment configuration, data compression is not performed for data in the important intervals in order to maintain high quality. Data compression is accomplished for image data in intervals other than important intervals. Consequently, the compression section 6 acquires the partial image string of intervals other than important intervals from the time-series data storing section 4, implements data compression on the partial image string, and writes the post-compression compressed image string to the time-series data storing section 4, as shown in FIG. 16.

Figure 17:
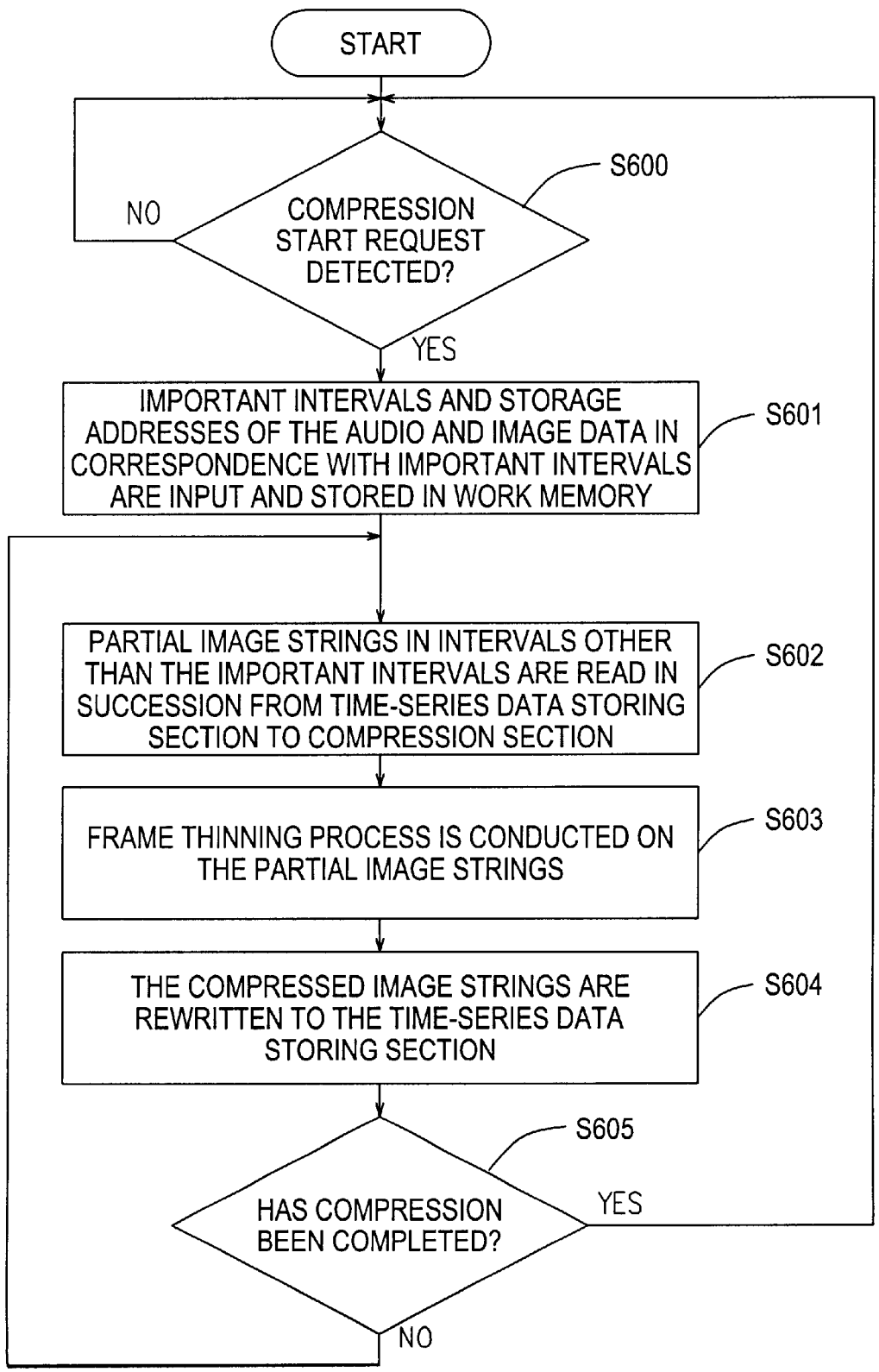
FIG. 17 is a flow chart describing an example of a process routine of the compression section in the first embodiment.

FIG. 17 is a flowchart describing the actions of this compression section 6. A detailed description of the compression action is provided hereafter, with reference to the flowchart and the explanatory drawings.

In step S503, the time data storing section 7 outputs the compression process start command to the correspondence relationship storing section 5 when the elapsed time (the data storage time) from when the audio data and the image data was recorded in the time-series data storing section 4 has reached a preset time.

When the compression start command is input from the time data storing section 7, the correspondence relationship storing section 5 detects this input in step S304 of FIG. 10. When a compression start command has been detected, the flowchart moves to step S305 where the respective data shown in FIG. 9 of the important intervals and the storage addresses of the audio data and the image data stored in the time-series data storing section 4 in correspondence with these important intervals are output to the compression section 6.

The compression section 6, upon receiving the compression start request from the correspondence relationship storing section 5, detects this in step S600. Then, in step S601, the respective important intervals and the storage addresses of the audio data and the image data stored in the time-series data storing section 4 in correspondence with these important intervals, input from the correspondence relationship storing section 5, are input and are stored in an unrepresented work memory of the compression section 6. The work memory uses, for example a semiconductor memory as a storage medium.

The groups consisting of an important interval and the storage addresses corresponding to said important interval may be output to the compression section 6 one group at a time in succession. In addition, it would also be appropriate to store the respective important intervals in files housing the audio data and the image data, and the storage addresses in said files of the audio data and image data stored in the files in correspondence with each important interval.

The compression section 6 refers to the plurality of groups of important intervals and storage addresses stored in the work memory and accomplishes compression of the image data stored in the time-series data storing section 4.

In step S602, the partial image strings in intervals other than the important intervals are read in succession from the time-series data storing section 4 to the compression section 6 with a partial image string of 10 frames as one partial image string unit. In this embodiment configuration, the image data corresponding to important intervals is not compressed, and consequently, only the image data of other than important intervals are read and compressed. Naturally, when the image data of important intervals is also compressed, it is necessary for the reading and compression to include the image data of the important intervals.

Figure 18:
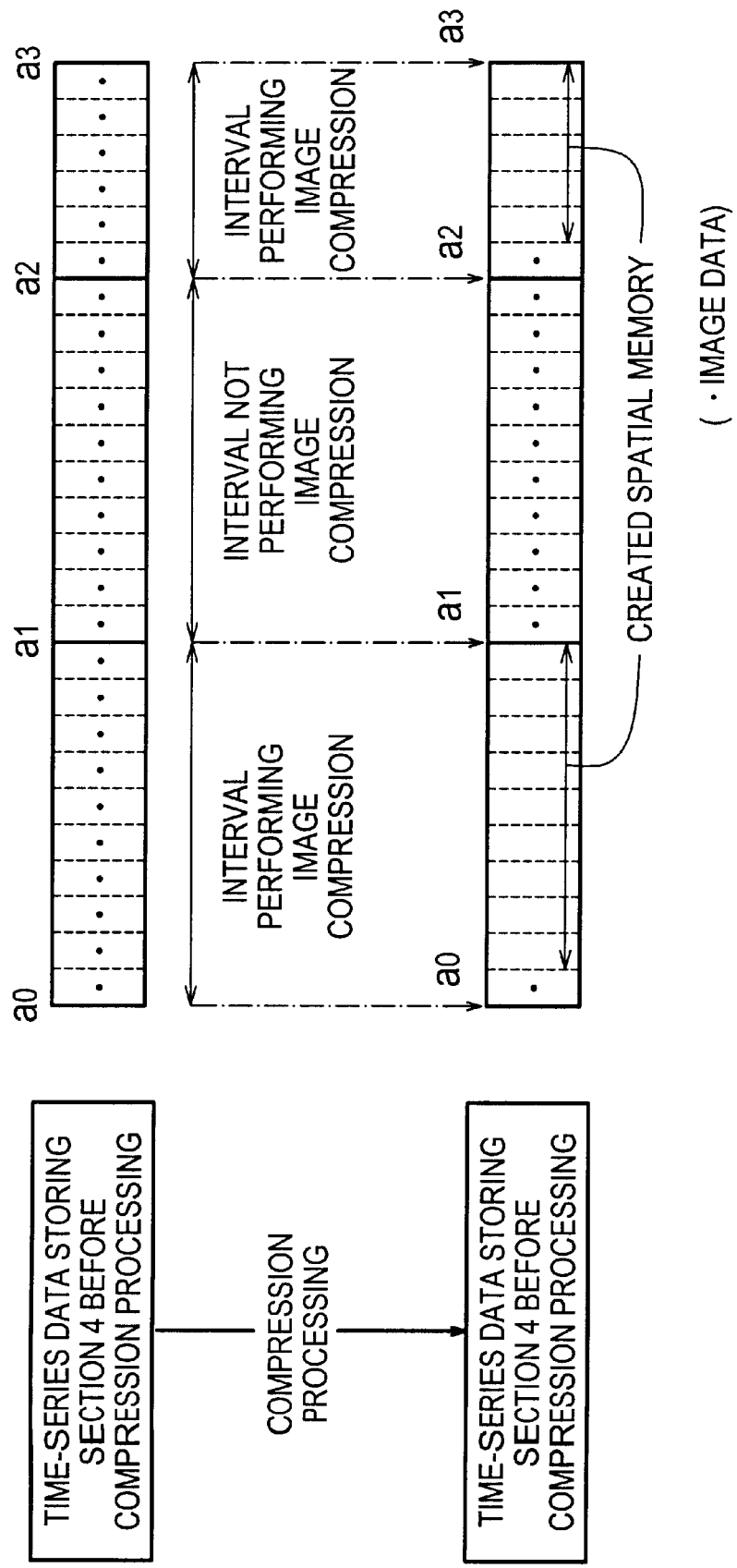
FIG. 18 is a diagram comparing the storing status before compression and after compression of the image data stored in the time-series data storing section in the first embodiment.

FIG. 18 is a drawing showing an example when image data (address a1 and address a2), recognized as important intervals is maintained at high quality and intervals other than this are compressed with a high compression ratio. In this example, the image data of intervals that are not important undergoes a thinning compression process wherein only the leading one frame out of a continuous 10 frames is retained and the data of the other frames is eliminated. On the other hand the image data of the important intervals does not undergo the above-described thinning process and all 10 continuous frames are stored.

In step S603, the frame thinning process is conducted on the partial image strings of 10 frames with, in this example, only the leading frame being retained and the other nine frames being deleted. Then, in step S604, the compressed image strings following this frame thinning are rewritten to the time-series data storing section 4.

Then, in step S605, a determination is made as to whether or not the compression process has been completed for the files in which the record of the conference is stored. When the compression process for all files has been completed, the flowchart returns to step S600 and waits for the next compression start command. When there are more portions to be compressed, the flowchart returns to step S602, and the above-described compression process is repeated.

Through this compression process, empty memory such as shown in FIG. 18 is created. In other words, the image data in the memory region between the address a1 and the address a2 does not change because this is data in an important interval. However, the image strings stored from the address a0 to the address a1 and from the address a2 to the address a3 are not in important intervals and hence are the subject of the frame thinning compression. Thus, they are replaced by compressed image strings. Furthermore, because the data volume has decreased, empty memory regions are created in the storage medium of the time-series data storing section 4.

When it is preferable for the time-series data to be continuously stored within the storage medium, it would also be appropriate to eliminate gaps in the memory by closely packing the portions of empty memory that are created using the surrounding time-series data.

Next, the actions during playback will be described.

In this example, the user uses the pen to stipulate (point to) one of the plurality of pen trace data items displayed on the display section 10. Through this, out of the audio signals and image signals stored in the time-series data storing section 4, only the audio signal or image signal input in the neighborhood of the time when that pen trace data was input is partially played back.

In addition, it would also be appropriate to play back the audio signal or image signal going back to the first point of the interval with active conversation when that pen trace data was input. It would also be appropriate to use the input pen as the playback specification section 12.

As the playback specification section, it is also possible to use a mouse, a trackball, a cursor key, a touch panel or the like. In addition, as the method of specifying the pen trace data, specification through pointing, encircling (encircling with a close curved or an ellipse or the like), identifier input and drawing a line under the item displayed are also appropriate.

In addition, when a plurality of pen trace data items are selected as a result of accomplishing specification through encircling or specification by underlining, it is also possible to stipulate one on the basis of some kind of priority order. For example, it is appropriate to automatically choose the pen trace data that is input earliest among those selected or the pen trace data displayed upper leftmost, or to display the candidates in a list and have the user select again.

Furthermore, it would also be appropriate to arrange the stationary images in a stipulated order (for example by time series) and to specify one from the table of contents of images.

The display position on the display screen 21 of the display section 10 can be stipulated by X-Y coordinates. Consequently, when a particular display position is specified by the playback specification section 12 such as a pen, the X-Y coordinates corresponding to that display position are stipulated.

In this manner, when a playback request is made from the playback specification section 12, it is detected in step S306 of the flowchart in FIG. 11 and the flowchart then moves to step S307. In step S307, the specified coordinates obtained from the playback specification section 12 and the X-Y coordinate groups (all of the point coordinate groups comprising the multiple lines that are the terminal points of the pen writing coordinates in FIG. 9) calculated from the X-Y coordinates stored in the correspondence relationship storing section 5 are compared and the corresponding pen trace data is stipulated.

Next, in step S308 the playback start address and playback end address of the audio signal or image signal corresponding to this pen trace data is obtained from the correspondence relationship storing section 5. Then in step S309 this playback start address and playback end address are output along with a playback request to the time-series data storing section 4.

Following this, the time-series data storing section 4 which has received the playback start and end addresses and the playback request, detects these inputs in step S405 of FIG. 12. Then in step S406, these are output to the playback section 8.

The playback section 8 starts the playback of the audio data or image data from the playback start address to the playback end address of the time-series data storing section 4 found through the above actions. For example, when the multiple line of ID 1000 in FIG. 9 is specified, the audio data or image data from the storage address a1 to the storage address a2 corresponding to this line is played back.

During the above-described coordinate comparison, it is possible to acquire the desired storage address even if a slightly shifted coordinate point is specified during specification, if matching is also accomplished for slightly shifted coordinates. In addition, even when the user-input data is of a characteristic that cannot be displayed, a preset mark indicating the existence of that user-input data is displayed on the display section 10. Consequently, it is possible to acquire the desired storage address through the same method. In addition, if a plurality of coordinate point strings input continuously within a preset time interval are stored as a single pen trace data item, it is possible, for example, to view a one line character string as a single pen trace data time. Consequently if any of the coordinate point strings comprising the character string are specified, the audio or image can be played back from the same storage address.

There are frequently times when it is desired during playback to change the playback speed, to rewind, or to slowly play back the data. It would, therefore, be appropriate to provide a fast forward function, a rewind function, a slow playback function and a pause function in the playback section 8. It would also be appropriate to provide a slide bar on the time axis and to display on the slide bar a pointer indicating the time currently being played back. This makes it possible to specify the playback position by sliding the bar.

In addition, with regard to the speed of reproduction, it is not necessarily required to reproduce the data like the recorded time data, for it would be appropriate to reproduce the data by raising the speed obeying only the recorded sequential relationship. It would also be appropriate to thin out and play back only the interval in which the remarks of the speaker are recorded. For example, it is possible to play back at double speed the intervals from time t0 to time t1 and from time t2 to time t3 in FIG. 8 and to playback the interval from time t1 to time t2, which is an important interval, at so-called normal speed or the speed at which this interval was recorded.

Furthermore, following the pausing of playback, it would be appropriate to make it possible to again specify playback using the specification section. It would also be appropriate to enable the addition of new user-input data.

In the first embodiment configuration discussed above, when an early speaker switch pattern is detected continuously more than a preset number of times, the two ends of the remark interval containing that pattern are set as the two ends of a condition-matching interval. However, it would also be appropriate to set the point in time a preset time prior to the starting time of a remark interval containing an early speaker switch pattern as the start of the condition-matching interval and to create the condition-matching interval by including the remark interval a preset number prior to the remark interval containing the early speaker switch pattern. In addition, it would be appropriate to set the point in time a preset time after to the end time of a remark interval containing an early speaker switch pattern as the end of the condition-matching interval and to create the condition-matching interval by including the remark interval a preset number after the remark interval containing the early speaker switch pattern.

Furthermore, it is also possible to make it so that a singular audio signal such as "the sound of a gate closing" is detected by the condition-matching interval detection section 3. In this case, the point in time a preset time prior to the point in time when the singular audio signal is detected is used as the starting point of the condition-matching interval. The point in time a preset time after the point in time when said singular audio signal is detected is used as the ending point of the condition-matching interval. In addition, it would be appropriate to have this same structure even in the case wherein a singular trigger signal from an external sensor is detected by the condition-matching interval detection section 3.

In the present embodiment configuration, the case wherein a pattern with active conversation was detected was described. Additionally, the event which the condition-matching interval detection section 3 detects may be, regardless of the absence or presence of audio and switching of speakers, the appearance of a preregistered keyword in the audio signal, the appearance of a preregistered audio pattern in the audio signal, the appearance of a preregistered character string in the audio signal, a change in status in the image signal, a change in the status detected by an external sensor, or particular camera work or a change in camera work.

For example, it is possible to have a composition such that a distinctive audio pattern such as the pattern of laughter or the pattern of applause are registered. These patterns are recognized from the input audio signal. Intervals containing these patterns are detected as condition-matching intervals.

In this case, a pattern recognition section is provided in the condition-matching interval detection section 3 for recognizing patterns using a commonly known pattern recognition technology such as, for example, technology which analyzes the time change in the frequency component or power of the audio signal.

Figure 19:
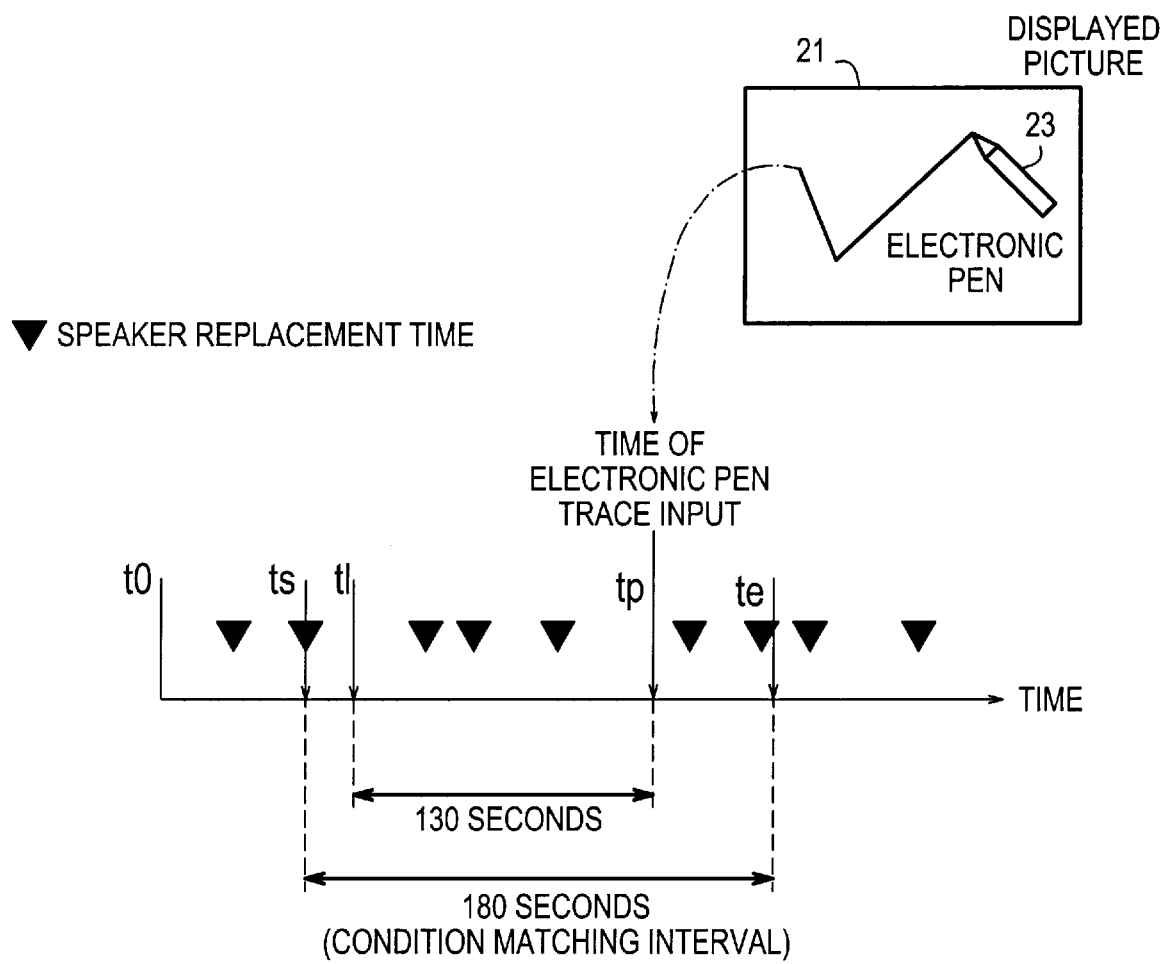
FIG. 19 is a diagram describing another example of the condition-matching interval to be detected in the first embodiment.

In addition, in the case where switching of the speaker is detected by the condition-matching interval detection section 3, the point in time t1 reached by going back to a preset time prior to when the input of the user-input data is detected is specified and the speaker switch time ts nearest this time t1 is set as the start of the condition-matching interval, as shown in FIG. 19. Furthermore, the time te after a preset time has elapsed from this start ts of the condition-matching interval, is set as the end of the condition-matching interval. In the example shown in FIG. 19, the time gap (tp–t1) between the time tp when the inputting of user-input data is detected and the start t1 of the condition-matching interval, is 130 seconds. The length of the condition-matching interval (te–ts) is 180 seconds.

Apparatuses which detect the change in the input time-series data (e.g., the audio data or the image data), or the change in the signal detected by an external sensor during which the input time-series data exists, are all considered to be the condition-matching interval detection section 3 of the present invention. When that change point is set as the detection condition, it is possible to set a predetermined fixed time from that change point as the end point.

In addition, in the present embodiment configuration, the compression section has a structure which accomplishes thing compression of the images, but the apparatus may also be such that during compression of the image data at least one out of the storing time, the compression ratio of intra-frame compression, the compression ratio of inter-frame compression, the time gap of intermittent recording, the color data thinning ratio and the brightness data thinning ratio or the like is dynamically changed.

In particular intra-frame compression methods and inter-frame compression methods may be used to compress motion image data. The intra-frame compression methods may include methods using vector quantization and methods may include using discrete cosine transformation. The inter-frame compression method may include methods which record only the differences in image data from the surrounding frames. In other words, apparatuses which convert the data volume per unit time to a smaller data volume are all considered to be the compression section of the present invention.

In addition, with the present embodiment configuration, the structure is such that even image data of intervals other than important intervals are stored as frame-dropped video with less data volume. Naturally, it would also be appropriate to erase the image data or audio data of intervals other than important intervals from the storage medium.

In addition, it would also be appropriate to store the data of important intervals and the data of intervals other than important intervals on separate storage media. For example, it would be appropriate to have a structure such that during recording of data, the data of important intervals and the data of intervals other than important intervals were stored on the same magnetic disk and, during compression of the data, only the data of the important intervals was left on said magnetic disk. The data of intervals other than important intervals would be moved to a magneto-optical disk, magnetic tape, or the like. In general, magneto-optical disks and magnetic tape have slower access speed to the data compared with magnetic disks, but can store large volumes of data inexpensively. Consequently, these storage media are suitable for storing the data of intervals other than important intervals, the data volume of which has been reduced.

In addition, with this embodiment configuration a case was described wherein the audio data was not compressed. However, it is also possible to compress the audio data in the same manner as the image data In this case, it would be appropriate to have a structure such that, during compression of the audio data, at least one of the storage time, the sampling frequency and the number of encoding bits, is dynamically changed.

In the above-described example, a case was described wherein there was no data displayed on the display section 10 in the initial state. However, the scope of application of this invention is not limited to such an example. This invention may also be applicable to the case wherein several user-input data items are already displayed in the initial state and additions and changes to these are implemented. However, in this case, the user-input data items that can be specified for purposes of playback are only the portions changed from the initial state.

In addition, as an application of the apparatus of the present invention, there is a method of use wherein the user-input data is successively reproduced on the screen when the recorded audio data or image data is played back. The display of the display section 10 returns to the display at the time the pen trace data designated by the specification section was input, and the audio or image data and the pen trace data are synchronously reproduced. As a method of returning the display screen to the display at that point in time, it would be appropriate to repeat an "undo" of the display screen until that point in time. It would also be appropriate to erase the screen once and then successively draw, at high speed, the user-input data stored in the correspondence relationship storing section 5 until that point in time.

A second embodiment of the invention will now be described. In this second embodiment configuration it is assumed that the object of compression is only images in order to simplify the explanation.

In this second embodiment configuration, the input image data is stored separately by frequency range, for example a low frequency range and a high frequency range, in the time-series data storing section 4. When a compression of the image data is accomplished by deleting the high frequency range of the image. This second embodiment configuration makes use of the fact that the high frequency range of an image is the so-called component relating to the details of the image so that, even if this is deleted, there is little effect on understanding the basic image content.

As shown in FIG. 16, in the first embodiment configuration the structure was such that the partial image string of the time-series data storing section 4 was read and, after the compression process had been implemented by the compression section, the data was again written to the time-series data storing section 4. With this second embodiment configuration, the structure is such that when the input image data is stored in the time-series data storing section 4, this data is stored separately by frequency range. When a compression start command is received from the time data storing section 7, the high frequency range of the image is deleted. In this case, the partial image string is read from the time-series data storing section 4 and the image compression process is implemented, but it is not necessary to write to the time-series data storing section 4 again. Consequently, the load on the system during the compression process can be eased.

In addition, in this second embodiment configuration, the structure is such that, the method of separating frequency ranges during storing to the time-series data storing section 4 is changed between important intervals (condition-matching intervals containing points in time when user-input data was input) and intervals other than important intervals. Specifically, only the image data of intervals other than important intervals are stored separately by frequency range while the image data of important intervals is stored using the normal method (not storing separately by frequency range).

Figure 20:
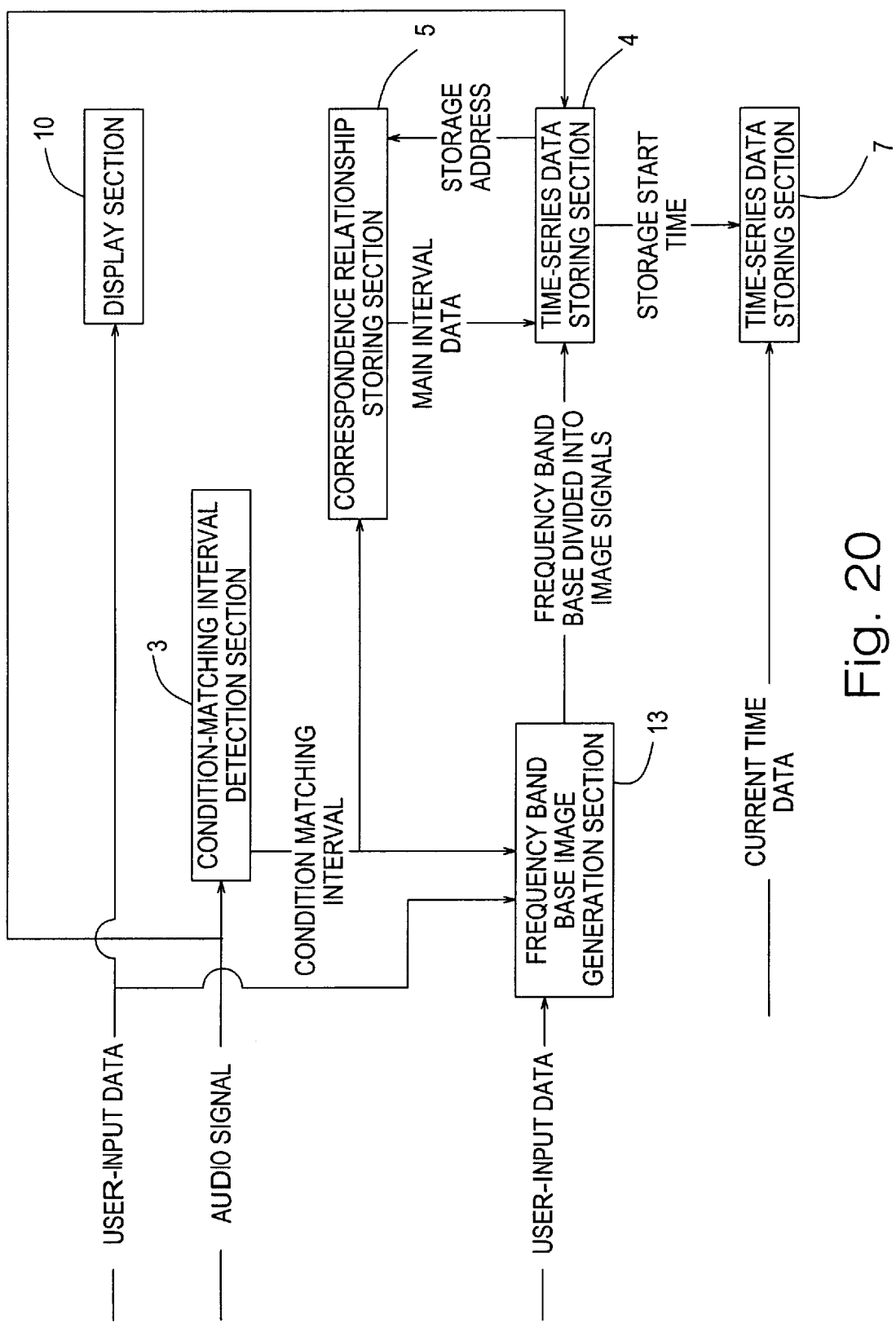
FIG. 20 is a diagram describing a flow of operation during data recording in the second embodiment.

FIG. 20 is a diagram explaining the actions during recording in the second embodiment configuration along with the flow of each type of data and the flow of the output of each section during recording. The structure of this second embodiment configuration differs from that shown in FIG. 1 and FIG. 5 for the first embodiment configuration in that a frequency band base image generation section 13 has been added as a structural component.

This frequency band base image generation section 13, is in this example, structured to contain a high pass filter and a low pass filter. Furthermore, the condition-matching interval detection section 3 detects condition-matching intervals from the input audio data using the same method as in the case of the first embodiment configuration. The data which designates that condition-matching interval is supplied to the correspondence relationship storing section 5 and is also supplied to the frequency band base image generation section 13. In addition, the user-input data detected by the user-input data detection section 11 is supplied to this frequency band base image generation section 13.

The frequency band base image generation section 13 receives the data designating the condition-matching interval from the condition-matching interval detection section 3 and the user-input data from the user-input data detection section 11, and changes the image signal output to the time-series data storing section 4 depending on the important and less important intervals.

Figure 21:
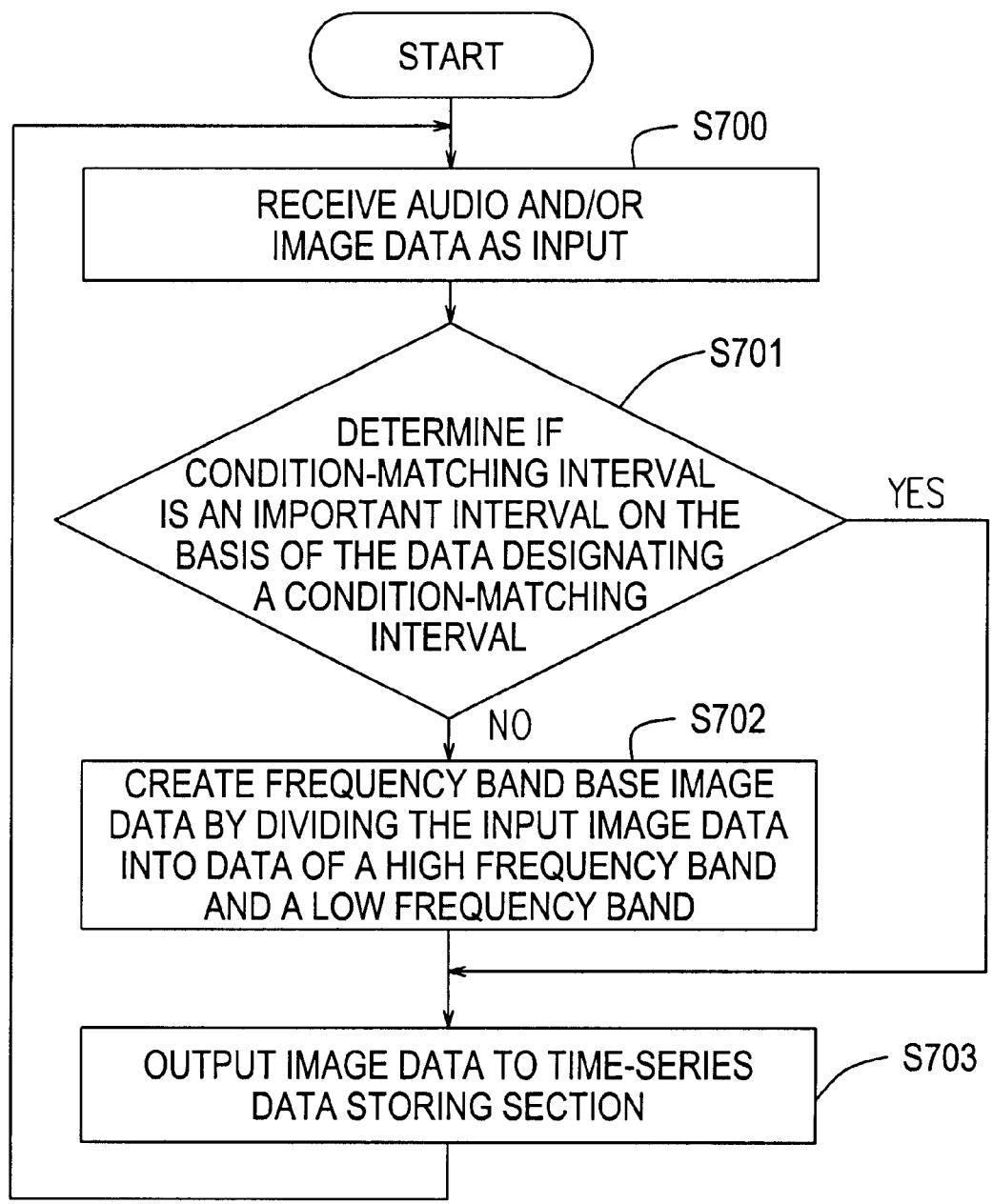
FIG. 21 is a flow chart describing an example of a process routine of the section which generates images of various frequency band ranges in the second embodiment.

FIG. 21 is a flowchart describing the processes in the frequency band base image generation section 13 in this second embodiment configuration. As can be seen in FIG. 21, the frequency band base image generation section 13 receives the input of audio data or image data in step S700. Then, in the ensuing step S701, a determination is made as to whether or not the condition-matching interval is an important interval on the basis of the data designating a condition-matching interval from the condition-matching interval detection section 3, i.e., the data about the point in time at the start and the data about the point in time at the end of the condition-matching interval and the user-input data.

For image data of intervals determined to be important intervals, the flowchart moves from step S701 to step S703, the image data is output to the time-series data storing section 4 without change, and is stored in the time-series data storing section 4 in a normal storing format that does not separate the input image data by frequency band.

On the other hand, when it is determined in step S701 that the interval is one other than an important interval, the flowchart moves to step S702. In step S702, a process is executed to create frequency band base image data by dividing the input image data into the data of the high frequency band and the data of the low frequency band. The created frequency band base image data is output to and stored in the time-series data storing section 4 in step S703. Hereafter, steps S700 through S703 are repeated.

Figure 22:
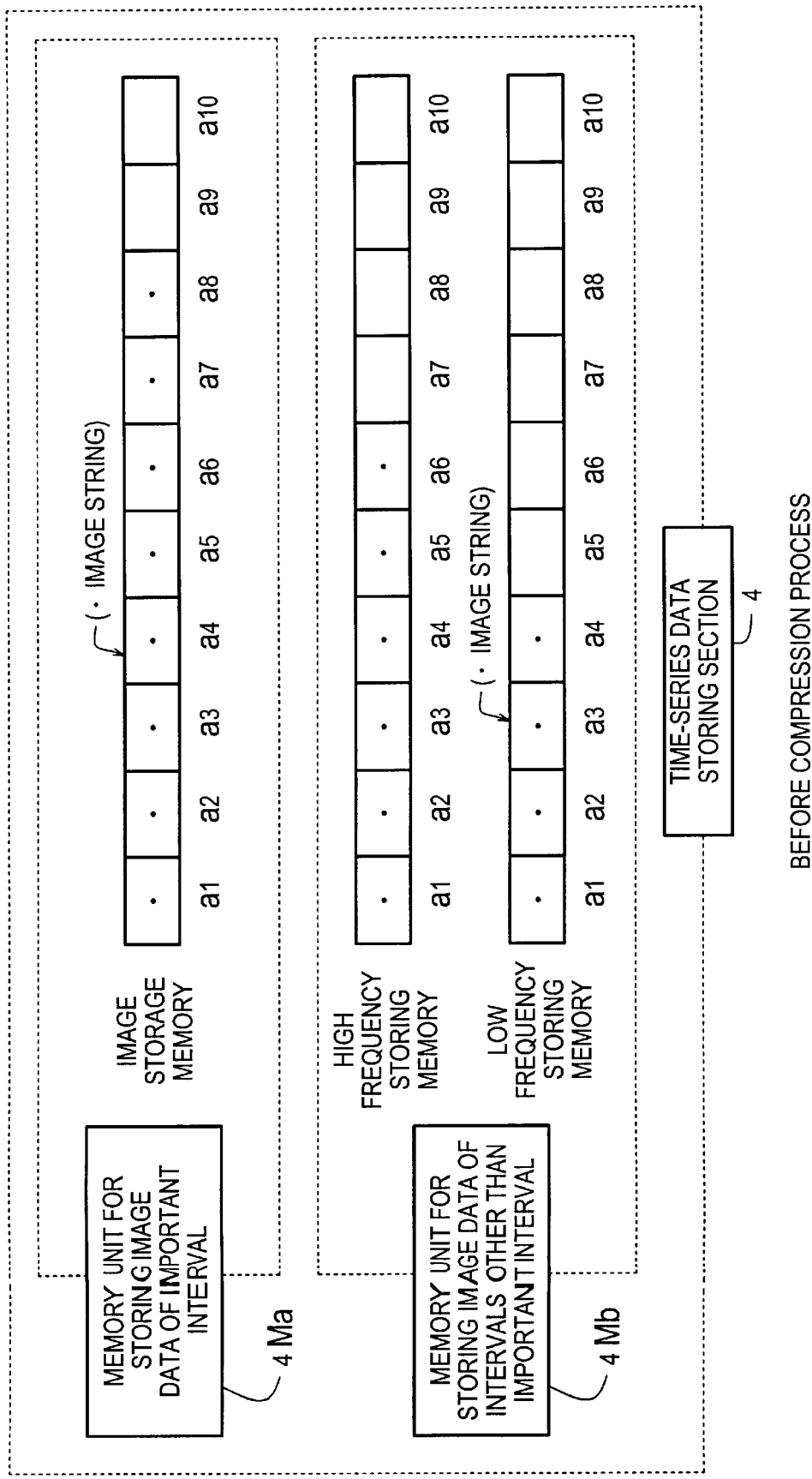
FIG. 22 is a diagram describing a memory storing status before compression process of the time-series data storing section in the second embodiment.

FIG. 22 is a drawing describing the storage status of the time-series data storing section 4 during the image data recording time (prior to image data compression). As is shown in this drawing, the time-series data storing section 4 of this second embodiment configuration is provided with a memory section 4Ma for storing the image data of important intervals and a memory section 4Mb for storing the image data of intervals other than important intervals. These storing sections 4Ma and 4Mb may both be separate storage media or may be comprised by partitioning the memory region of a single storage medium.

In the memory section 4Ma, the image data is stored without being divided by frequency bands. Furthermore, the memory section 4Mb is further partitioned into a high range storing memory and a low range storing memory, where the high frequency band components and the low frequency band components of the image data are respectively stored. In other words, in FIG. 22 the stored contents of the areas a1 to a6 of the high range storing memory and the areas a1 to a4 of the low range storing memory indicate the high frequency components and the low frequency components of the image signal of the same interval. The time-series data storing section 4 also manages the correspondence relationship of these frequency band components.

In FIG. 22, the "x" attached to each memory area a1, a2, . . . indicates that an image string is stored there and memory areas where there is no "x" are empty memory areas.

The storage time of the stored contents of the time-series data storing section 4 is monitored by the time data storing section 7 and, for example, when a preset storage time, such as one month, has elapsed the time data storing section 7 outputs a compression process start command and image data compression is executed.

Figure 23:
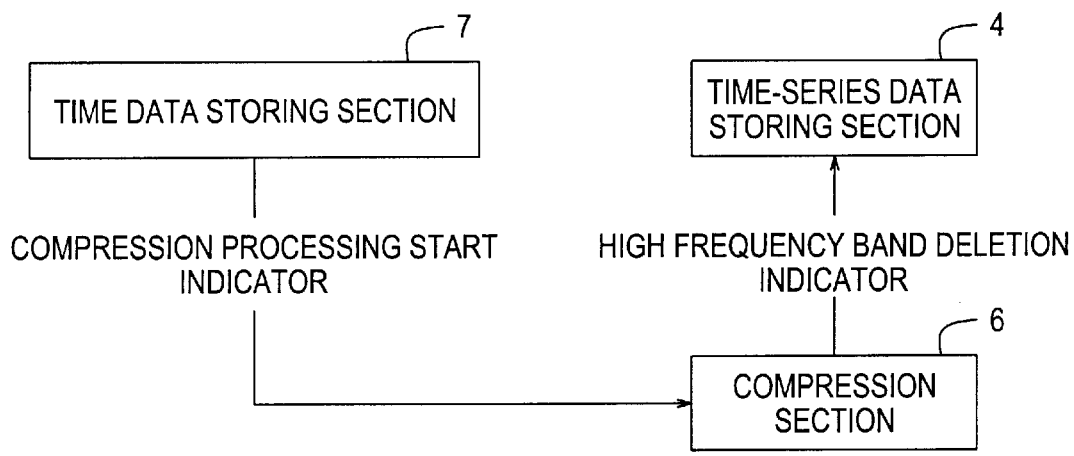
FIG. 23 is a diagram describing a flow of operation during data compression in the second embodiment.
Figure 24:
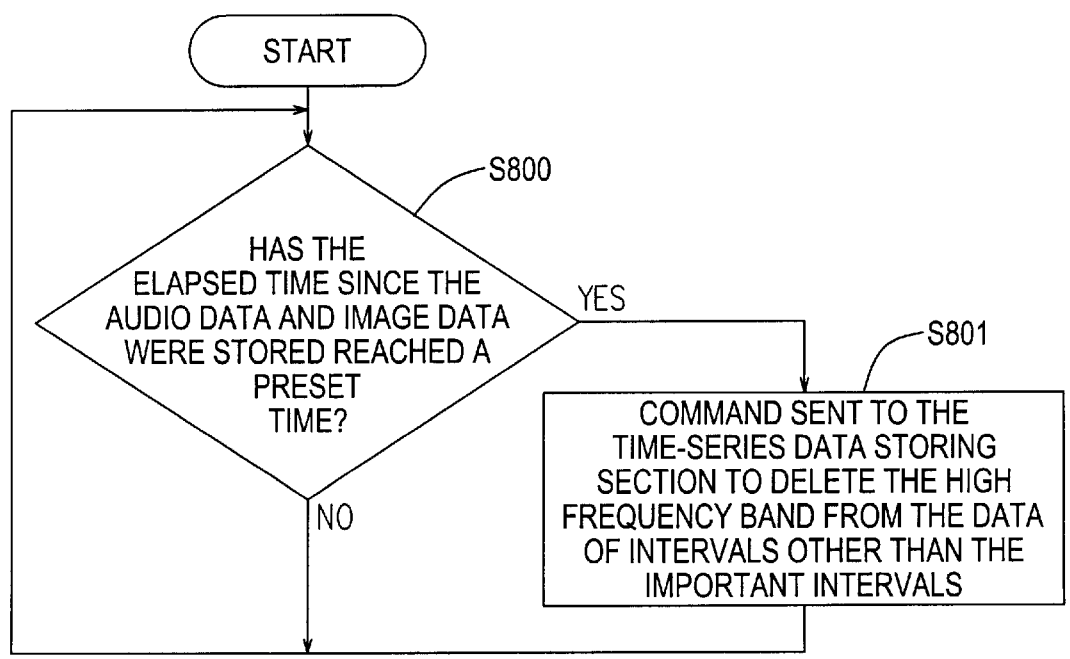
FIG. 24 is a flow chart describing an example of a compression process routine in the second embodiment.

FIG. 23 is a flowchart describing the actions during data compression in this second embodiment configuration along with the flow of each type of data and the flow of the outputs of each section during data compression. In addition, FIG. 24 is a flowchart describing the compression process in this second embodiment configuration.

In the case of the present embodiment configuration, a compression start command from the time data storing section 7 is supplied directly to the compression section 6. Furthermore, as shown in the flowchart in FIG. 24, when a compression start command is received by the compression section 6, and when it is detected in step S800 that the elapsed time since the audio data and image data were stored in the time-series data storing section 4, has reached a preset time, the flowchart moves to step S801. In step S801, a command is sent to the time-series data storing section 4 to accomplish a process for deleting the high frequency band from the memory section 4Mb that stores the intervals other than important intervals.

In this example, the time-series data storing section 4 receives the high frequency component delete command from this compression section 6 and deletes all of the stored contents of the high range storing memory of the memory section 4Mb.

Figure 25:
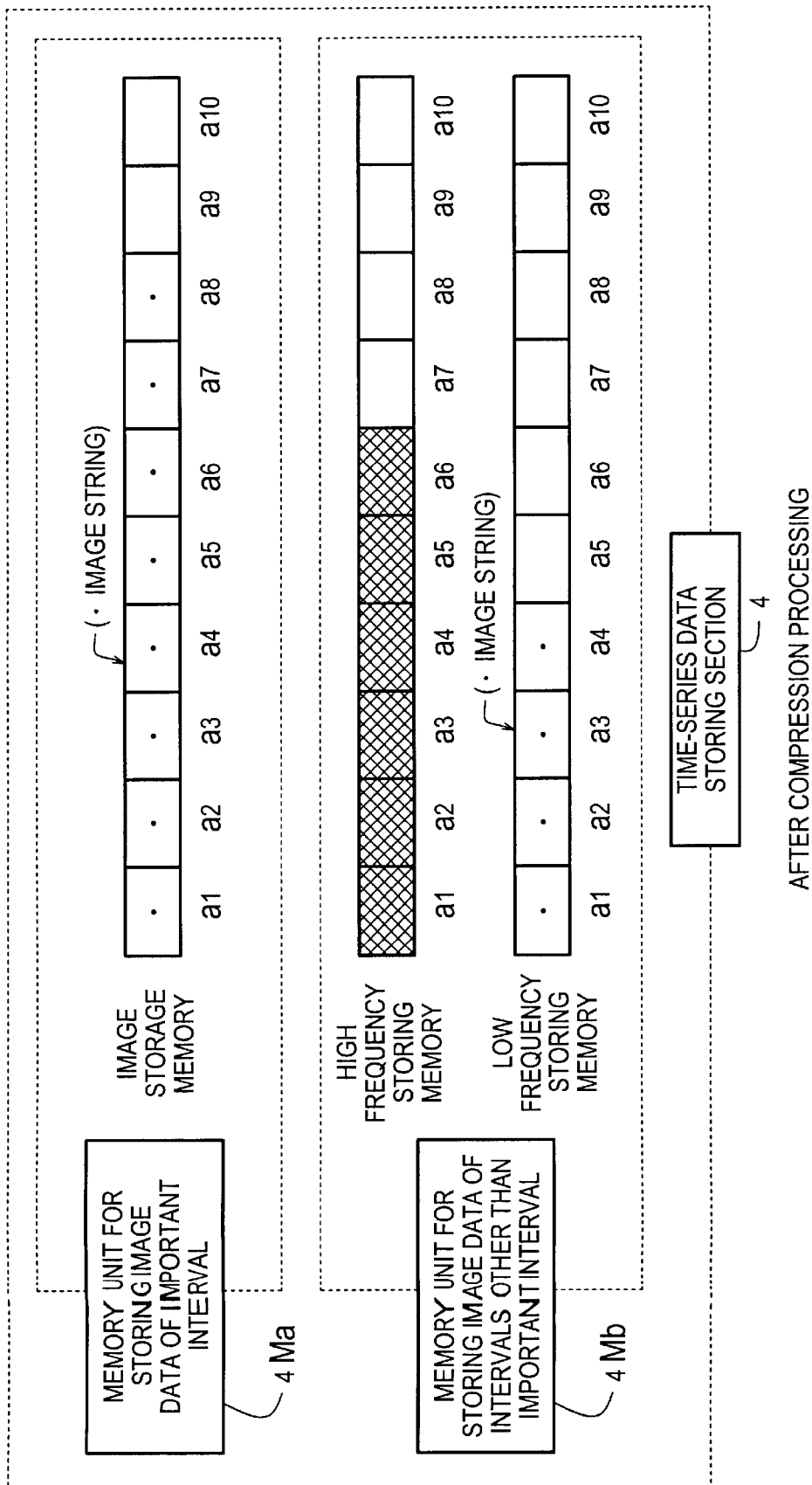
FIG. 25 is a diagram describing a memory storing status after compression process of the time-series data storing section in the second embodiment.

FIG. 25 is a drawing describing the storing status of the time-series data storing section 4 following image data compression. When the storing status prior to the compression process is the status shown in FIG. 22, the time-series data storing section 4, upon receiving a high frequency component delete command from the compression section 6, deletes all of the image data from the areas a1 to a6 of the high range section storing memory of memory section 4Mb that stores the high frequency band image components of intervals other than the important intervals.

As a result, in the time-series data storing section 4, the portion consisting of the areas a1 through a6, indicated by the lattice area in FIG. 25, is created as empty memory area. The created empty memory area may be reused as a storing memory area for storing intervals other than important intervals or may be appropriated as a storing memory area for storing important intervals.

Through the above-described process, after the compression process has been implemented, a high quality motion image with smooth action can be played back when playing back the video of portions near the point in time when the user-input data was detected and when the discussion was active. When playing back other portions, a so-called low image quality video results. However, it is possible to select parts which are not very important and compress these with a high compression ratio. Consequently, the data volume to be stored is greatly reduced.

In the above description of this second embodiment configuration, an explanation was provided for a method of storing the input image data separately by frequency band. However, it would also be appropriate to have a structure such that when the input image data is stored in the time-series data storing section 4, the image signal is partitioned into a bright signal component and a color signal component, such as color difference signals and transport color signals (color subtransport wave signals), and to store these in separate areas. In this way, so that when a compression start command is generated from the time data storing section 7, only the color signal component is deleted. In this case also, it is unnecessary to read and rewrite the partial image string. Consequently, it is possible to increase the speed of the compression process.

In addition, it would also be appropriate to have a structure such that during storing of the input image data by frequency band in the time-series data storing section 4, the image data of the important intervals and the low frequency band components of the image data of intervals other than important intervals are stored in consecutive areas of the storing medium. The high frequency band components of the image data of intervals other than important intervals would be stored in a separate area of the storing medium. In this case, even if the high frequency band components of the image data of intervals other than important intervals are deleted during compression, the post-compression time-series data is continuous in the storing medium, thereby making it possible to prevent drops in playback speed.

Furthermore, in this second embodiment configuration the structure was such that the audio data was not compressed. However, but it is also possible to compress the audio data similarly. For example, it would be appropriate to have a structure such that when the input audio data is stored in the time-series data storing section 4, the data is stored by frequency band, and when the compression section 6 receives a compression start command from the time data storing section 7, the high frequency band of the audio is deleted. In this case also, it would be appropriate to have a structure such that the high frequency band component of the audio data of intervals other than important intervals is deleted with first priority.

In the first and second embodiment configuration, explanation is given for an example wherein compression process is executed only once when the elapsed time after recording of audio data or image data is more than a predetermined time. However, there are cases in which storage space may effectively be conserved by dividing and gradually executing several compression process rather than one compression process. For example, in recording conferences, the probability of referencing a conference which was held a week earlier is larger than the probability of referencing a conference which was held a month earlier. Likewise, the probability of referencing a conference which was held a month earlier is larger than the probability of referencing a conference which was held six months earlier. Hence, by structuring the system in such a manner that less data is stored when the probability of accessing later is smaller, the storage space may be effectively conserved.

The third embodiment configuration relates to a case in which data is compressed gradually by changing the compression rate or compression system based on the elapsed time after recording of image date in the time-series data storing section 4. However, even an old conference recording video may contain important scenes whose image data need to be stored as high quality data. Hence, the video which is near the time when the user-input data is detected and which contains scenes of active exchange of opinions in the recorded conference video will be left unchanged as high quality video. The remaining parts will be compressed with a high compression rate.

In short, in the third embodiment configuration also, the important interval is specified by the user-input detection section 11 and the condition-matching interval detection section 3 based on the user-input data and the input audio data using a similar method as in the first embodiment configuration.

In the third embodiment configuration, input image data is stored in the time-series data storing section 4 by frequency band range, as in the case of the second embodiment configuration. To do this, a frequency band range base image generation section 13 is provided, as in the case of the second embodiment configuration. However, in the third embodiment configuration, the image data are divided into three frequency bands of high frequency band, mid frequency band and the low frequency band and are stored in the time-series data storing section 4. In this case, the frequency band range base image generation section 13 is composed of a high pass filter of high frequency band, a band pass filter for middle frequency band and a low pass filter for low band frequency.

Moreover, in the third embodiment configuration, the image signals are divided into three frequency bands over the intervals, regardless of whether or not it is within an important interval.

Figure 26:
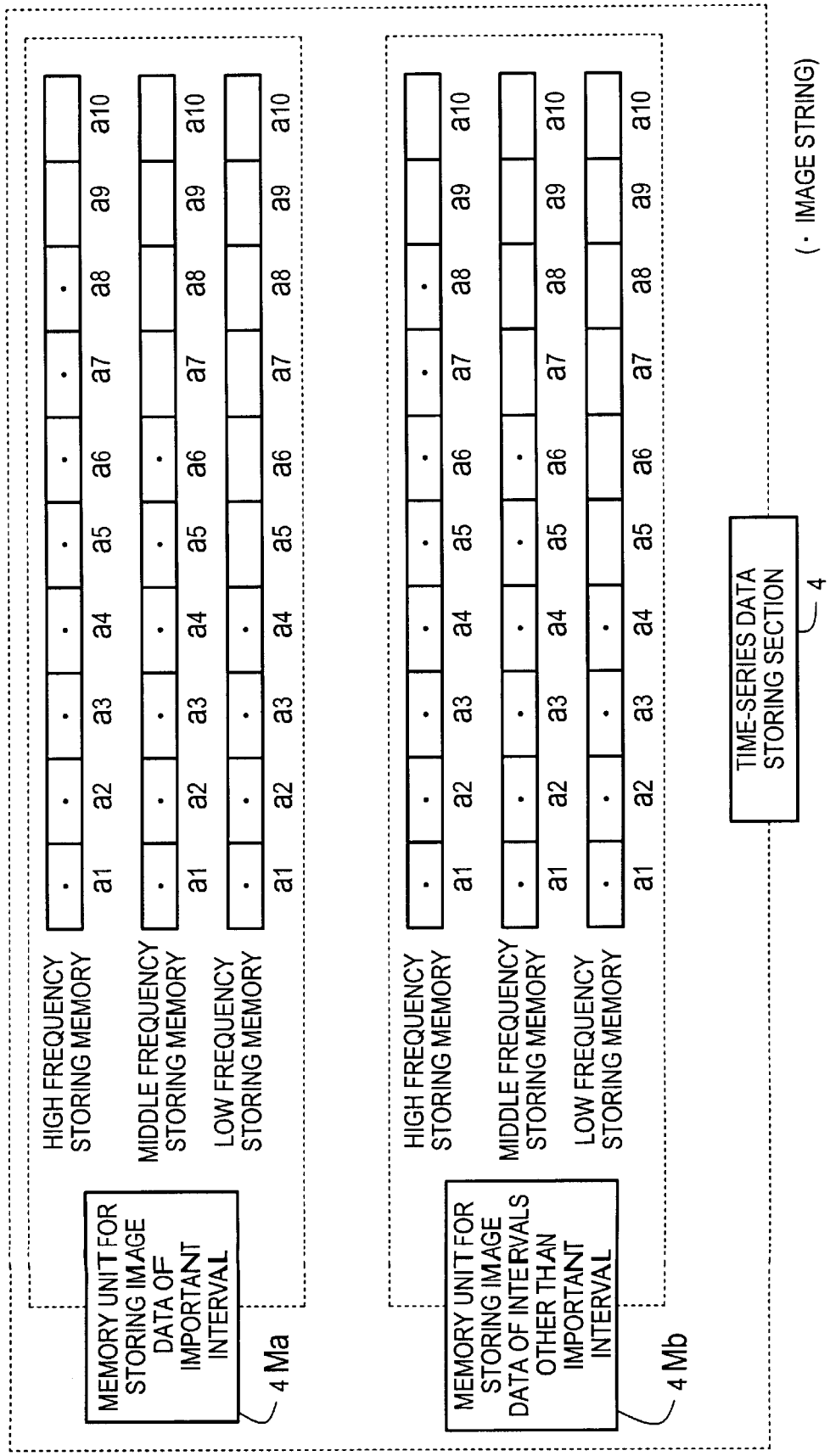
FIG. 26 is a diagram describing a memory storing status at the time of data recording of the time-series data storing section in the third embodiment.

FIG. 26 describes the storage condition of the time-series data storing section 4 during the time of image data recording (before image data compression). In this example, each memory section 4Ma, which stores image data in the important interval, and 4Mb, which stores image data other than in the important interval, in the time-series data storing section 4 includes a high band section storage memory, middle band section storage memory and a low band section storage memory. The high band component, middle band component and low band component of the image data in respective intervals is stored in the respective memory sections.

Moreover, in the third embodiment configuration, the time data storing section 7 is made to monitor the elapsed time since the time of recording. When a predetermined time has elapsed, a compression start instruction is output to the compression section 6. In this embodiment, however, the compression start instruction is made to be output at a plurality of predetermined elapse times, such as a week, a month, or six months. At this time, data indicating which frequency band component to be compressed is attached to each compression start instruction and is provided to the compression section 6.

FIG. 27 describes an example of a compression time management table which is stored in the time data storing section 7. As described in FIG. 27, the image data to be deleted first, for example, is a high frequency band section in an interval outside of an important interval, and is deleted one week after the recording of the data. Moreover, the middle frequency band section of an interval outside of an important interval and the high frequency band section of the important interval are deleted one month after the recording. Furthermore, the low frequency band section of an interval outside of important interval and the middle frequency band section of an important interval are deleted six month after the recording. However, the low frequency band section of an important interval is not deleted automatically without clear deletion indication by the user.

The compression section 6, upon receiving said compression start instruction from the time data storing section 7, analyzes the content of the instruction. Based on this analysis the compression section 6 sends compression instructions to the time-series data storing section 4 indicating which contents of the storage memory are to be deleted. The time-series data storing section 4 executes gradual compression process of the image data based on the compression instruction. To be more specific, the time-series data storing section 4 executes deletion of contents of each storage memory according to the deletion time table in said FIG. 27.

Figure 28:
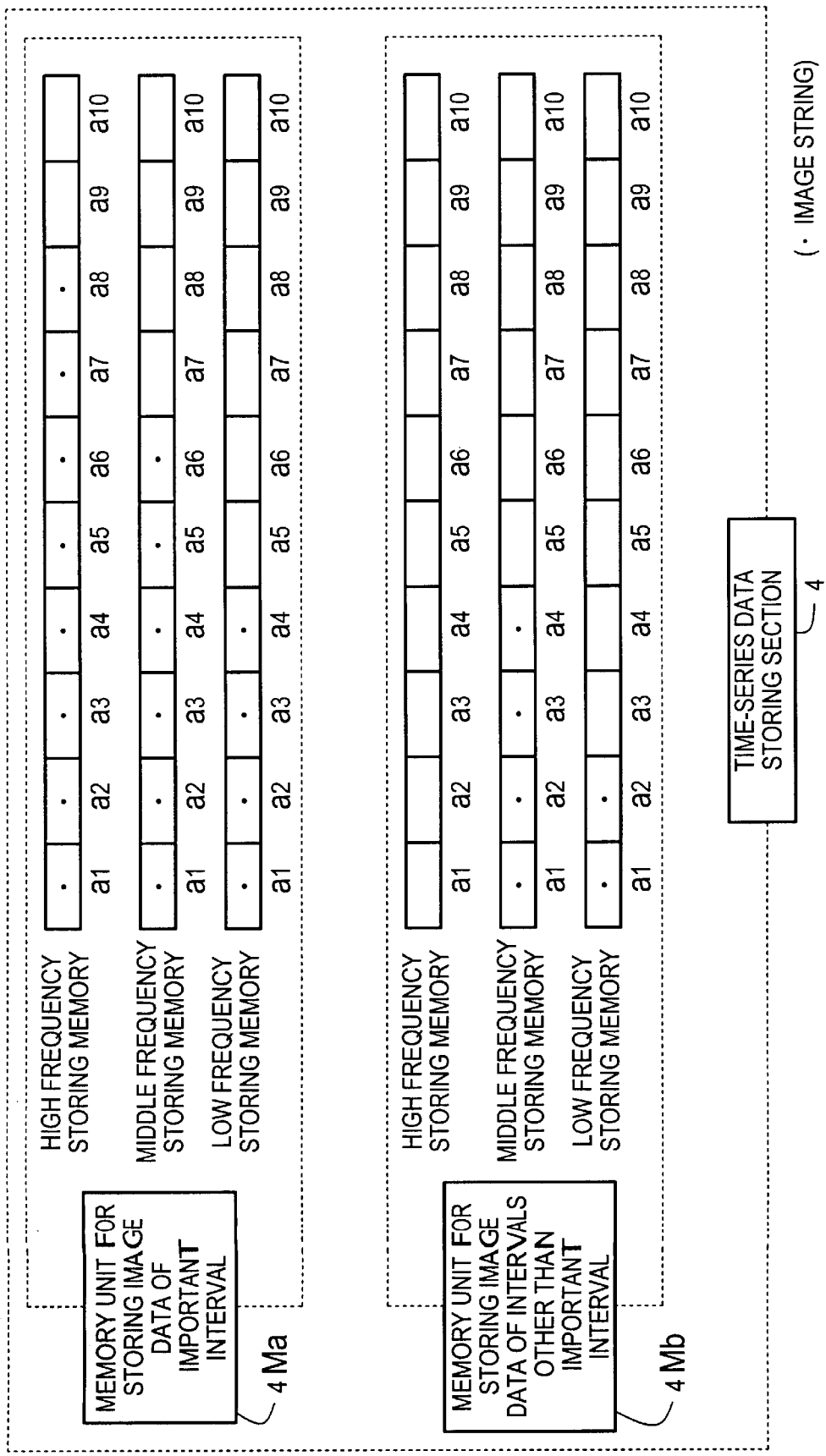
FIG. 28 is a diagram describing a memory storing status of the time-series data storing section after the elapse of one week in the third embodiment.
Figure 29:
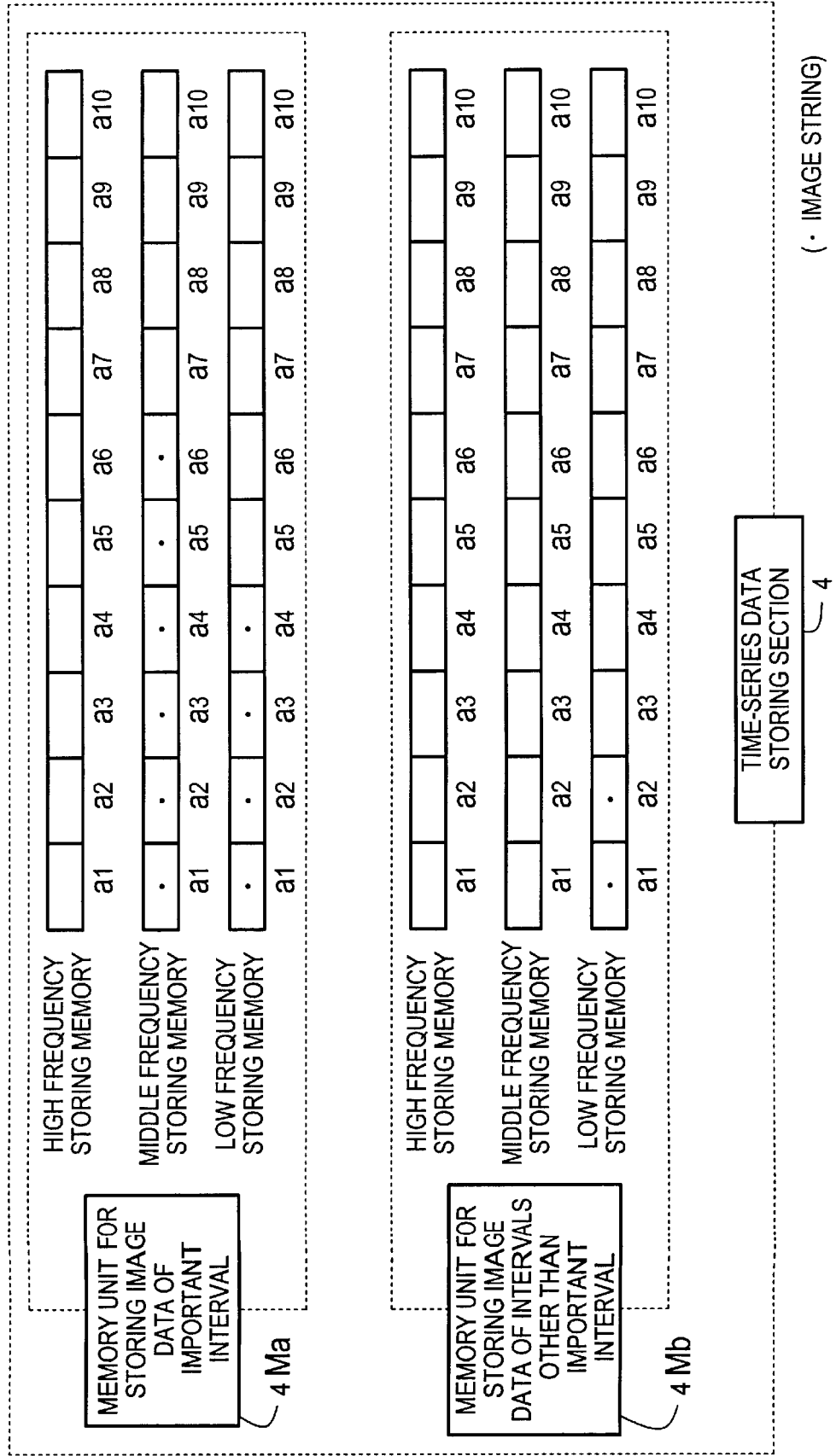
FIG. 29 is a diagram describing a memory storing status of the time-series data storing section after the elapse of one month in the third embodiment.
Figure 30:
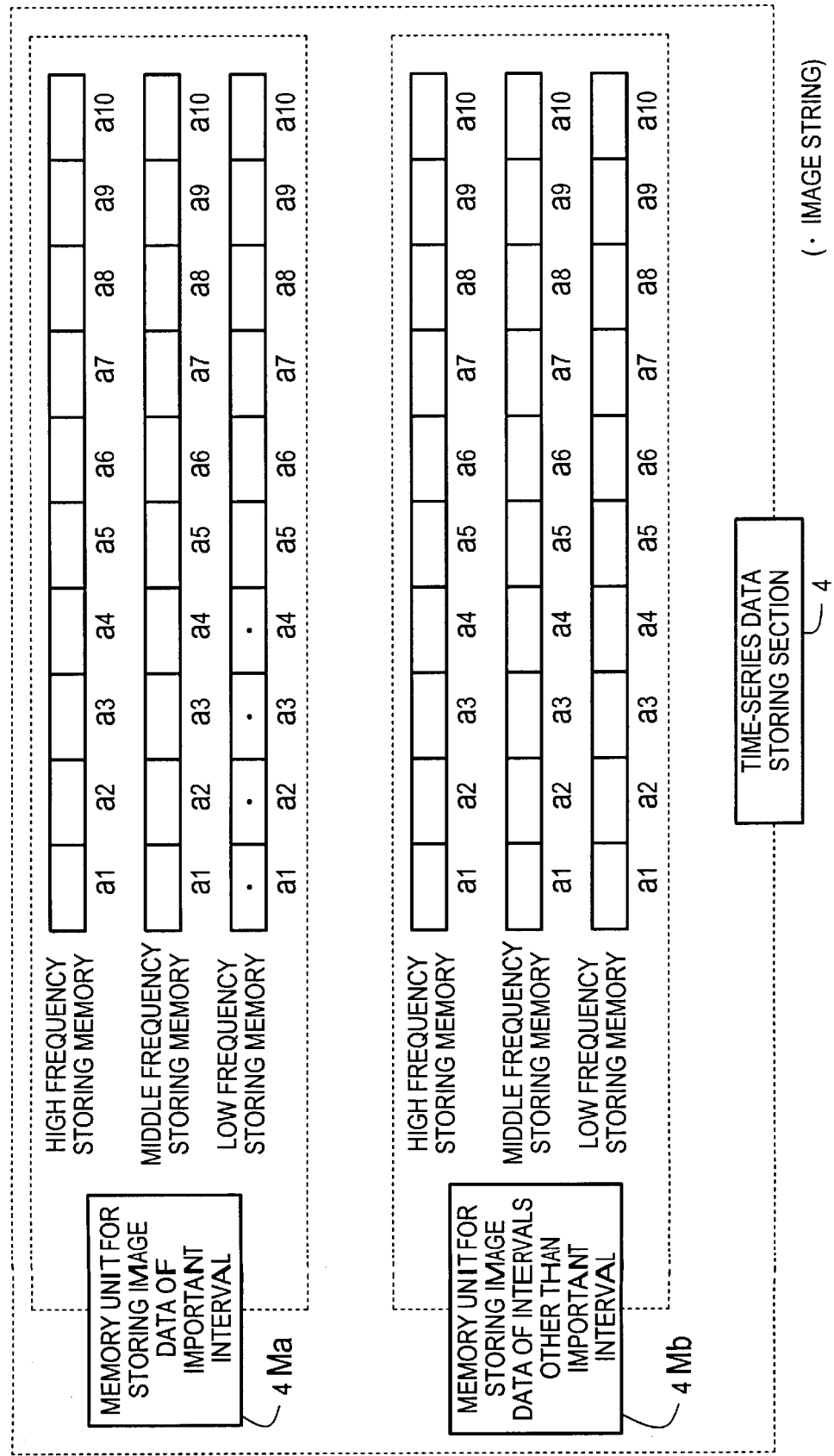
FIG. 30 is a diagram describing a memory storing status of the time-series data storing section after the elapse of six months in the third embodiment.

FIGS. 28–30 describe storage conditions of the time-series storing section 4 one week, one month and six months, respectively, after the image data was recorded. FIGS. 26, 28, 29 and 30, the presence of "." within each memory area a1, a2, . . . indicates that the data string is stored there and absence of "." indicates that the memory area is an empty memory area.

In other words, if the time elapsed is one week, in the time-series data storing section 4, contents of all the high frequency band section storage memory in the memory section 4Mb, which stores image data in the interval outside of important interval, are deleted as described in FIG. 28.

Moreover, if the time elapsed is one month, contents of all the high frequency band storage memory in the memory section 4Ma storing image data of the important interval and contents of all the middle frequency band storage memory in the memory section 4Mb storing image data of the interval outside of the important interval are deleted, as described in FIG. 29.

Furthermore, if the time elapsed is six months, contents of all the middle frequency band storage memory in the memory section 4Ma storing image data of the important interval and contents of all the low frequency band storage memory in the memory section 4Mb storing image data of the interval outside of the important interval are deleted, as described in FIG. 30.

As a result, only the content of low frequency band storage memory of the memory section 4Ma storing the image data of the important interval remains in the storage content of the time-series data storing section 4.

In this manner, image data is stored with less data with elapse of time in the time-series data storing section 4, as described in FIGS. 25–27.

In the example of the third embodiment configuration, a table is used to manage the compression time for the time data storing section 7. However, a list or stack structure may be used equally well in stead of the management table.

Moreover, the time data storing section 7 is made to compute the compression rate of the data at an arbitrary time through an algorithm with data maintenance time as a parameter rather than managing the compression time and compression objects using tables and lists. The time storing section 7 is also made to execute data compression by sending the data concerning the compression rate to the compression section 6.

For example, suppose y is a data amount maintenance rate (%) and x is time (days elapsed), the time data storing section 7 may obtain data amount maintenance rate at specific time using equation (1) below and may send the data amount maintenance rate to the compression section 6 as a data conceding compression rate.

$$y=90 \exp(-Ax)+10 \qquad (1),$$

where A is a positive constant. Here, the data amount maintenance rate refers to a ratio of the data amount at a specific time to the data amount which is recorded at the beginning.

The compression section 6 establishes a compression rate based on the data amount maintenance rate from the time data storing section 7. The compression section 6 then compresses the image data stored in the time-series data storing section 4 with the compression rate. In this case, the time data storing section 7 repeatedly sends the compression start instruction within a certain period so that re-compression process is executed in the same period.

Here, the third embodiment configuration is explained as a modification of the second embodiment configuration. However, it is obvious that the third embodiment configuration may be explained as a modification of the first embodiment configuration.

The fourth embodiment configuration relates to a case in which the detection condition of the condition-matching interval detection section 3 is an appearance of the previously registered keyword in input audio signals, or an appearance of the audio pattern in the previously registered input. First, the case in which the detection condition of the condition-matching interval detection section 3 is the appearance of the previously registered key word in the input audio signals will be described.

In this case, the condition-matching interval detection section 3 comprises an audio recognition section, a memory that stores the registered keyword and a keyword-matching detection section that compares and detects the matching of the memory which stores the registered keyword and the result of audio recognition. A keyword is previously stored in the memory by the user.

Moreover, during the data recording time, the condition-matching interval detection section 3 gradually transforms the input audio signals into character string data by the audio recognition section, and extracts a word from the character string data through format element analysis and the like. Furthermore, the condition-matching interval detection section 3 compares the word extracted with character string key word such as "homework", "action item", "topics", "conclusion", "decision", "importance", and "summary" which are stored previously in the memory.

If the word being extracted coincides with one of the character string keywords which are previously registered, the time of the detection of the character string keyword becomes the starting point of the condition-matching interval.

In the fourth embodiment configuration, an keyword effective period which determines the amount of time to be elapsed from the detection of the keyword during which the image signals are recorded as high quality image for each keyword string is established as a table described in FIG. 31 in order to determine the ending point of the condition-matching interval. The sum of the keyword effective period to the starting point of the condition-matching interval becomes the ending point of the condition-matching interval.

Moreover, in compressing the image data stored in the time-series data storing section 4 after elapsing of the predetermined time described above, the interval between the starting point of said condition-matching interval containing the user-input data input time which is detected by said user-input detection section 11 and the ending point is considered as the important interval. The image data in this interval is stored with high quality image, and the image data in the interval outside of the important interval are compressed with a high compression rate. As for the compression system, any one of the methods of the first, second or third embodiment configurations may be employed.

Moreover, if the degree of importance is established for each keyword string, the image signals may be compressed with various compression rates according to the degree of importance of each keyword string.

Next, the case in which the condition-matching interval detection section 3 detects a condition-matching interval using the appearance of a previously registered audio pattern in the audio signals input as a detection condition.

Even if detection of the keyword is difficult by the audio recognition, there may be a case in which a unique audio signal pattern, such as laughing voice pattern, applaud pattern or active conversation pattern, may be recognized. Hence, the condition-matching interval detection section 3 is made to be able to detect the pattern using the appearance of such a unique audio pattern as a detection condition.

In this case, a memory in which the unique audio signal patterns are previously registered is provided in the condition-matching interval detection section 3. Moreover, a pattern recognition section which executes pattern recognition using known pattern recognition technology, such as a technology which analyses the change of power of the audio signals or of the frequency component with time, is provided.

The unique pattern is to be recognized by comparing and determining matching or degree of similarity of the unique audio signal pattern previously registered and the audio signal patterns which are extracted from sequentially input audio signals. The voice pattern for each speaker may be registered to increase the recognition rate of the pattern recognition.

When the audio signals which are extracted from the input audio signals are determined to match with one of the unique audio signal patterns previously registered, the time of the detection of the audio signal pattern becomes the starting point of the condition-matching interval.

An audio signal pattern effective period which determines the amount of time to be elapsed from the detection of the pattern during which the image signals are recorded as high quality image for each audio signal pattern, is established as a table described in FIG. 32 in order to determine the ending point of the condition-matching interval. The sum of the keyword effective period to the starting point of the condition-matching interval becomes the ending point of the condition-matching interval.

Moreover, image data stored in said time-series data storing section 4 is compressed by changing the compression rate or compression system between the important interval (from the starting point of the condition-matching interval including the time of input of the user-input data to the ending point), which is determined by the user-input data input time detected by said user input detection section 11, said condition-matching interval detection section 3 and the interval outside of the important interval.

In this case also, in compressing the image data stored in the time-series data storing section 4 after a predetermined elapse of time as described before, the image data of said important interval is stored with high image quality. However, the image data outside of the important interval is compressed so that the data amount is reduced drastically. As for the compression system, any of the methods in the first, second or third embodiment configuration may be used.

In this embodiment configuration, the time at which the keyword or the audio signal pattern that is extracted from the input audio signal is determined to match the keyword or one of the audio signal patterns that are previously registered, is determined to be the starting point of the condition-matching interval. However, it is permissible to store the image data including the image data prior to the time of detection of the keyword of the audio signal pattern with high image quality. For example, in general, prior to appearance of a laughing voice pattern or applaud pattern, the cause for appearance of the pattern exists, hence the event causing the pattern may be stored with high image quality. In such case, the time preceding the time of appearance of a unique audio signal pattern by a predetermined amount of time, may be used as the starting point of the condition-matching interval, enabling storing of an event causing the appearance of the pattern with high image quality and compressing of other the intervals with a high compression rate.

The fifth embodiment configuration relates to a case in which the detection condition of the condition-matching interval detection section 3 is either an appearance of a character string which is previously registered in the image signal input or an appearance of a status change in the image signal input.

First, the case in which the appearance of a previously registered keyword in the image signal input is detected by the condition-matching detection section 3 will be described. In this case, the condition-matching interval detection section 3 comprises an image recognition section, a memory storing the keyword of character string being registered, and a keyword matching detection section comparing and detecting the result of image recognition and the keyword previously registered. The keyword is previously registered in the memory by the user.

Moreover, the condition-matching interval detection section 3 transforms characters written on a white board or the like, into character string data sequentially during the time of data recording and extracts a word from the character string data. Moreover, the word extracted is compared to the character string keywords such as "homework", "action item", "topic", "conclusion", "decision", "importance", and "summary" which are previously registered in the memory. Of course, in the case when the image signal being displayed is output from a computer, such as an electronic white board which displays output from a computer, data input from the computer (character code data or the like) may be used as input image signal.

If the word extracted from the image signal matches one of the character string keywords which are previously registered, the time of the character string keyword detection becomes the starting point of the condition-matching interval.

In the fourth embodiment configuration, a keyword effective period which determines the amount of time to be elapsed from the detection of the keyword during which the image signals are recorded as high quality image for each keyword string is established in the memory corresponding to the keyword, same as in FIG. 31.

Moreover, image data stored in said time-series data storing section 4 is made to be compressed by changing the compression rate or compression system between the important interval (from the starting point of the condition-matching interval including the time of input of the user-input data to the ending point) which is determined by the user-input data input time detected by said user input detection section 11, said condition-matching interval detection section 3 and the interval outside of the important interval.

In such case, the time preceding the time of appearance of a character string keyword by a predetermined amount of time may be used as the starting point of the condition-matching interval, enabling storing of an event causing the appearance of the character string keyword with high image quality and compressing of the other intervals with a high compression rate.

Next, the case in which the condition-matching interval detection section 3 determines the condition-matching interval using the appearance of a status change in the image signal input as a detection condition will be described.

Even when the detection of a character string keyword by image recognition becomes difficult, a status change such as a movement, brightness change, color distribution change, etc., may be detected from the image data input. Hence, in the fifth embodiment configuration, the condition-matching interval detection section 3 is also enabled to detect the status changes of the image as a detection condition.

In this case, a storage memory in which a status change pattern of the image signals is previously registered is provided in the condition-matching interval detection section 3. Moreover, a pattern recognition section which executes a status change pattern recognition using known pattern recognition technology is provided. For example, recognition of additional writings or changing of a page during recording of a white board or a graphic video may be possible by a known inter-frame difference detection technology which is disclosed in Japanese Laid-Open Patent Publication 4-286293.

Moreover, the pattern of the status change of the image signals which are previously registered as described above will be compared with the status change of the image signals being extracted from the sequentially input image signals. If the status change pattern of the image signal being extracted match the status change previously registered, the time of the detection of the status change becomes the starting point of the condition-matching interval.

Hereafter, the image data stored in said time-series data storing section 4 is compressed by changing the compression rate or compression system over the important interval and the condition-matching interval detected by said condition-matching interval detection section 3 and over the interval outside of the important interval using the same process as the ones used in the fourth embodiment configuration.

The sixth embodiment configuration relates to a case in which the condition-matching interval detection section 3 detects the status change previously determined by an external sensor. In other words, in this embodiment configuration, an external sensor is provided to detect the condition-matching interval using an event which is difficult to detect by the detection of a condition-matching interval from the audio signal as a detection condition, or to detect the condition-matching interval using detection of a status change in the data which is not contained in the input audio signals as a detection condition.

In the embodiment configuration which is described hereafter, a case in which an external sensor detects the location will be explained. In other words, in the following example, the conference rooms such as officer conference room, guest conference room and general conference room will be prioritized according to the level of importance and the conference record of the important conference room is made to be recorded with high image quality.

The data indicating which conference room is the source of the input audio signal or image signal is obtained by analyzing the location data output from a position measuring apparatus such as a GPS (global positioning system). When GPS is used, the conference room in which the audio signal or the image signal is input is specifically determined by measuring the longitude/latitude of the location where the audio signal or image signal is input and by comparing the data with the longitude/latitude of each conference room which is previously recorded.

Moreover, systems other than GPS, such as an infrared ray transmitter/receiver disclosed in Japanese Laid-Open Patent Publication 7-141389 in which an infrared ray transmitter/receiver oscillating a bit pattern uniquely determined by the location of installation may be installed in an arbitrary location in the conference rooms or in the hall ways. In this case, the bit pattern oscillated by the infrared ray transmitter installed in the vicinity of the input of audio signal or image signal is received when the audio signal or image signal is input, from which pattern the conference room is determined.

In the following example, the case in which an infrared ray transmission and reception system is used will be described. In this case, the condition-matching interval detection section 3 comprises an infrared ray signal recognition section, a memory for storing the registered location name, and a location-matching detection section for comparing and detecting matching of the location name being determined by the recognition of the infrared ray signal and the location name previously registered in the memory. A location name is previously registered in the memory by the user.

Moreover, the condition-matching interval detection section 3 transforms the infrared ray signal input, into a location name by the infrared ray signal recognition section during the data recording time. Furthermore, the location name being transformed is compared to the location name previously registered. In detecting the location, the condition-matching interval detection section 3 detects the beginning of the time period over which the signal is recognized to be coming from the same location as the starting point of the condition-matching interval and the ending of the time period over which the signal is recognized to be coming from the same location as the ending point of the condition-matching interval.

The starting point and the ending point of said interval and location name are stored in the correspondence relationship storing section 5 as data specifically determining the condition-matching interval where the user-input data indicating the important interval is detected. Instead of the location name, an identifier corresponding to the location may also be stored. Moreover, the correspondence relationship storing section 5 stores each of the important interval and corresponding storage address of the audio signal and image signal to be stored in the time-series data storing section 4 in the interval.

In this example, the time data storing section 7 outputs the compression starting command to the correspondence relationship storing section 5 when the storage time exceeds a predetermined time. Upon receiving the compression starting command, the correspondence relationship storing section 5 sends the data and the location name or location identifier to the compression section 6 as data specifically determining the important interval.

Figures 33, 34:
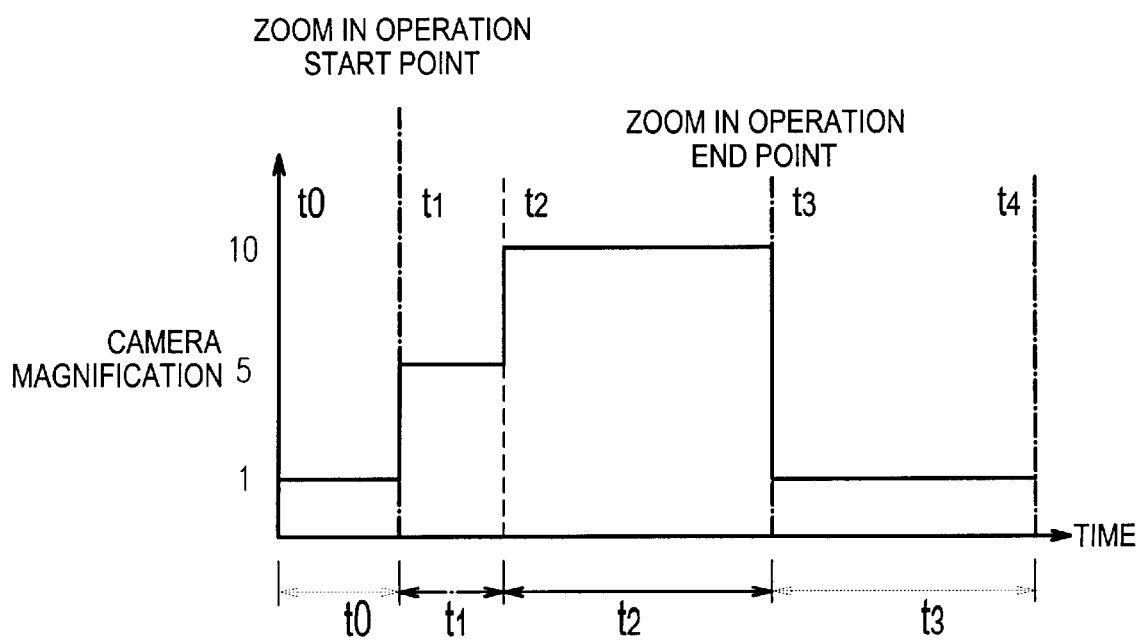
FIG. 33 is a diagram describing an example of a table which associates and controls the position and the degree of importance of the position when the condition-matching interval detection section detects the position in the sixth embodiment.
FIG. 34 is a diagram describing the compression rate setting process when the condition-matching interval detection section detects the camera work in the seventh embodiment.

The compression section 6 comprises a table which stores the names of conference rooms (location name) previously registered with a corresponding degree of importance. FIG. 33 is an example of the table. The compression section 6, using the location name or identifier from the correspondence relationship storing section 5, refers to the table to detect the conference room names in the condition-matching interval. Moreover, the compression section 6 identifies the degree of the importance assigned to the conference room name and compresses the image signal corresponding to the important interval with the compression rate based on the degree of importance. In short, the data which is recorded in the location with higher degree of importance is stored with higher image quality during compression. In this manner, the recording video of the important conference held in the office conference room may be stored with higher image quality than the conference video of the conference held in other conference rooms.

In the example above, the case in which an external sensor detects the location is explained. However, a sensor may be made to detect a person. In fact, a radio wave transmitter may be attached to a conference participant at the same time a radio receiver is installed in the conference room. Moreover, the time during which the conference attendant is in the conference room may be detected by the radio receiver and only the video of this time period may be stored with high image quality.

Furthermore, if an individual conference attendant in the conference room is identified by making the radio wave transmitter transmits different signals for each of the conference participants, only the video of the time period in which specific person is in the room may be stored with high image quality. Moreover, the said condition-matching interval may be specifically determined through events which are obtained by combining detection result of a plurality of sensors such as "those attending certain conference" or "attending conference with certain individuals" instead of a name of a single physical location or a person.

Moreover, in the case when the condition-matching interval detection section 3 detects a sensor input signal (trigger) from a single event such as "opening/closing of the door", the time preceding the detection of the trigger by predetermined amount may be detected as the starting point of the condition-matching interval and the time passing the detection of the trigger by a predetermined amount may be detected as the ending point of the condition-matching interval. Detection of opening/closing of the door may be accomplished by attaching the opening/closing detection sensor to the door.

The seventh embodiment configuration relates to a case in which the condition-matching interval detection section 3 detects the movement of a video camera (hereafter, camera work).

For example, in the case when a person is shot with a zoom up mode, most of the images are important and most of the audio signals or the image signals are desired to be stored with high quality audio and high quality image during a zoom-in mode of the camera 24. Hence, the audio or image signals during a zoom-in period of a camera may be desired to be stored with a high audio and image quality.

Hence, in the following example, the interval which is being shot with the same magnification is made to be the condition-matching interval and is made to be detected with the magnification. Moreover, a degree of importance is established by making the condition-matching interval with a higher magnification, a more important interval so that later data compression is executed in such a manner that the quality is better if the magnification is higher. By doing so, the image of the interval during which a camera is in zoom-up mode with a high magnification, is maintained at a high quality level.

Hereafter, an example of the seventh embodiment configuration will be described. The video camera in the example has three magnification modes of 100×, 500× and 1000× for camera magnification. According to the zoom ring operation, the data indicating magnification is output as camera operation data. The camera operation data is supplied to the condition-matching interval detection section 3. As described before, the condition-matching interval detection section 3 detects from the camera operation data the interval in which the camera magnification is the same as the condition-matching interval as well as the magnification.

In other words, the condition-matching interval detection section 3, in detecting the camera work, detects the time of the magnification change of the camera operation signal as the starting point of the condition-matching interval and detects the time of a next magnification change of the camera operation signal as the ending point of the condition-matching interval. Hence, the ending point of the condition-matching interval is the same time as the starting point of the next condition-matching interval. The data in the condition-matching interval and the magnification data are stored in the correspondence relationship storing section 5 with corresponding storage address in the time-series data storing section 4 of the image data and audio data in the condition-matching interval.

FIG. 34 describes the relationship between a camera magnification and condition-matching intervals. In FIG. 31, T0, T1, T2 and T3 respectively represent condition-matching intervals. The intervals T0 and T3, where magnification is 100×, are normal intervals during which the zoom ring is not operated. In the example of FIG. 31, the zoom ring is operated at time t1, starting zoom-in operation with the starting interval T1 having magnification of 500×, which is doubled to 1000× at time t2. At time t3, magnification returns to 100×, completing zoom in operation.

In this embodiment configuration, image thinning compression rates during each of the three magnification modes of 100×, 500× and 1000× of the camera magnification are set respectively at one frame per second, five frames per second and 10 frames per second.

Similar to the aforementioned configuration embodiment, when the elapse time after recording of image data in the time-series data storing section 4 exceeds a predetermined amount of time, the compression start command is given and executed from the time data storing section 7 to the correspondence relationship storing section 5. At this time, the correspondence relationship storing section 5 sends to the compression section 6, data of the condition-matching interval as respective important interval, magnification, and two sets of storage addresses in the time-series data storing section 4. The compression section 6 compresses with the compression rate of 5 frames per second if the interval T1 in FIG. 34 is an important interval, with compression rate of 10 frames per second if the interval T2 is an important interval, and with compression rate of one frame per second if the remaining intervals T0 and T3 are important intervals.

Moreover, by the same process as in the aforementioned embodiment configuration and by changing the compression rate or compression system for the important intervals and for the intervals outside of the important intervals, the image data stored in said time-series data storing section 4 is compressed.

Hence, in the present embodiment configuration, data may be stored by changing the compression rate for image signals of important scenes and image signals of not important scenes, depending on the camera work or change in camera work.

Here, the condition-matching interval detection section 3 may be made to detect image signals from the camera not only when the camera work or change in camera work is detected from the camera operation data. Types of camera work which may be detected from the image signals of camera are panning, tilting, zooming, booming, trimming, dollying, cut starting, cut ending and the like. The image signals input are detected by image recognition in detecting these camera works. Moreover, it is obvious that these camera works may be made to detect the operation signals, such as pressing of the button used for camera operation.

The eighth embodiment configuration relates to a case in which data is compressed by changing the compression rate or compression system depending on whether or not audio data or image data stored in the time series storing section 4 is frequently accessed by the user. In general, frequently accessed data is important data. Hence, image data in the frequently accessed interval are stored with high image quality and the image data which is not frequently accessed is compressed with a high compression rate and is stored with a small data amount.

Access status indicating how often the user accesses audio data or image data is stored in a memory medium based on the change in compression rate. Hence, an access status storing section is provided in the eighth embodiment configuration to store the access frequency of the user.

In the eighth embodiment configuration, said access status storing section stores an interval in which the image data stored in said time-series data storing section 4 is video-played back and the number of the video-play back of the interval as data access status.

Figure 35:
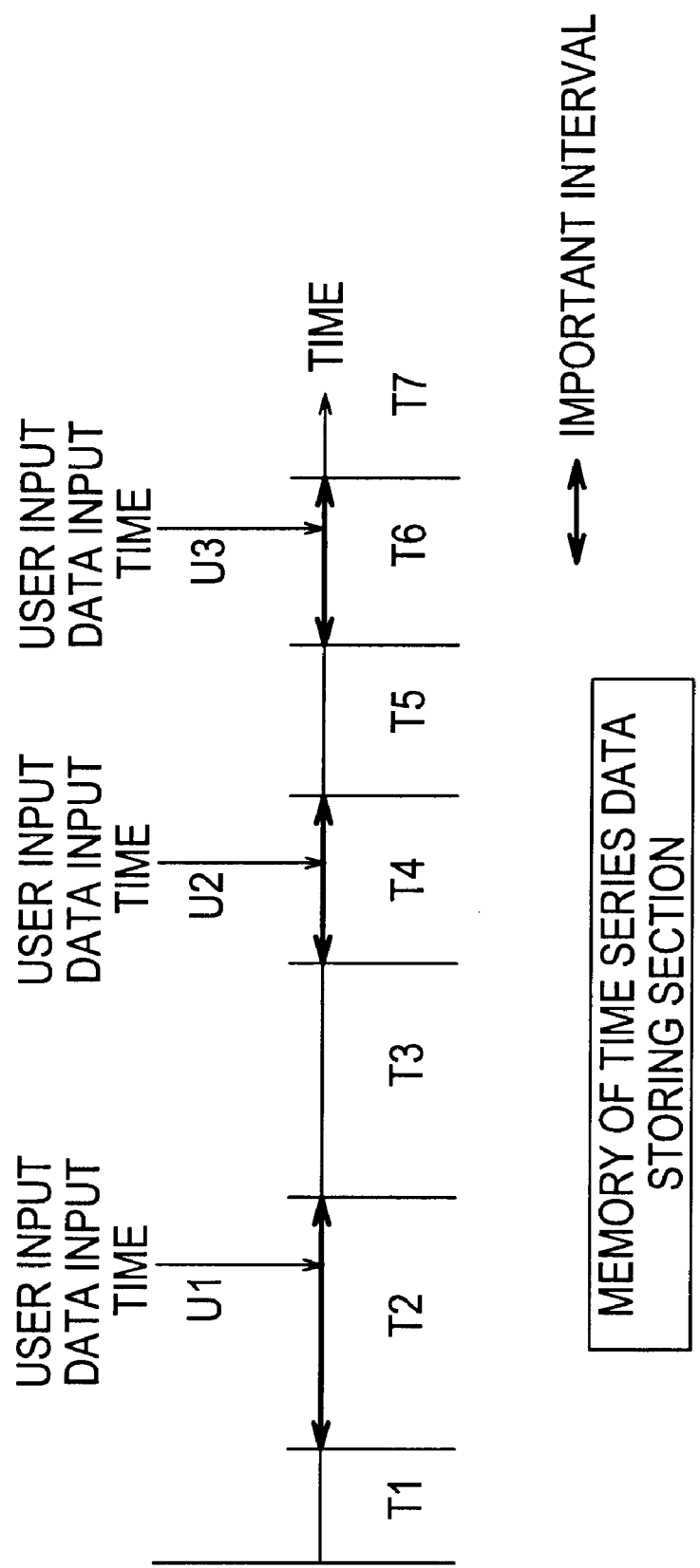
FIG. 35 is a diagram describing a storing status of the time-series data storing section in the eighth embodiment.

FIG. 35 describes the storing status of the time-series data storing section 4. In this figure, interval T2, T4 and T6 are important intervals which are determined by user-input data detected by said user input detection section 11 and the condition-matching interval detected by said condition-matching interval detection section 3. The other intervals T1, T3, T5 and T7 are intervals outside of the important intervals. The data concerning these intervals are stored in the correspondence relationship storing section 5.

FIG. 36 describes an example of a storing status of the access status storing section. The access status storing section stores the number of times the image data in the intervals T1 to T7 are accessed since recording of the image data in the time-series data storing section 4 to the current time, or in short, how many times the video in those intervals are played back.

Moreover, if the elapsed time from the recording of the image data in the time-series data storing section 4 (i.e. data storing time) exceeds a predetermined time, the access status storing section sends the data in the access frequency table in FIG. 36 to the compression section 6, upon receiving compression starting command from the time data storing section 7. The compression section 6 comprises a compression rate setting table which is described in FIG. 37. The compression rate setting table is a correspondence table of compression rates which are established for each condition-matching interval and each interval outside of the condition-matching interval based on the access frequency.

The compression section 6 accesses the compression rate setting table in FIG. 37 and determines the image compression rate for each interval and compresses the image data stored in the time-series data storing section 4 with this compression rate.

For example, the interval T1 in FIG. 35 is an interval outside of the important interval and, because the access frequency is 0 as indicated by the table in FIG. 36, the image compression rate is set at 90% based on the compression rate setting table in FIG. 37. In other words, because the interval T1 is an interval outside of an important interval and is the interval which is not accessed by the user, it is easily understood that the interval T1 is not very important. Hence, the interval T1 is compressed with a high compression rate of 90% during compression.

On the other hand, the interval T6 in FIG. 35 is an important interval and access frequency is 5 as indicated by the table in FIG. 36. Hence, the image compression rate is set at 10% based on the compression rate setting table in FIG. 37. In other words, because the interval T6 is an important interval and is accessed by the user five times, it is understood that the interval T6 is a very important interval. Hence, the image data is stored with high image quality and little compression.

In this embodiment configuration, the access status storing section stores the relationship between the interval and the access frequency in the form of a list, stack or the like. Moreover, the numerical values in the compression rate setting table may be set by the user.

Moreover, in this embodiment configuration, the access status storing section is made to store the data by associating each interval with the access frequency of the interval. However, because this data accumulation play back apparatus is structured in such a manner that the audio data or the image data stored in the time-series data storing section 4 is partially played back with designation by the user with a pen, of one of a plurality of the user-input data being displayed in the display section 10, said access status storing section may be made to store the data by associating each user-input data and the number of times the user-input data is designated for play back. In other words, because the user-input data frequently designated is an important data, the image data corresponding to the user-input data frequently accessed is stored with high image quality while the image data corresponding to the user-input data which is less frequently accessed is compressed with a high compression rate and stored with a smaller data amount.

The ninth embodiment configuration relates to a case in which the degree of importance of the user-input data is determined by the detection result of the user input detection section 11 and the compression rate is changed partially based on the degree of importance. The user-input data which is considered important includes red pen trace data, a character string being circled, a character string being underlined, and the like. Characteristics of such user-input data are previously registered to recognize which user-input data is input by comparing with characteristics of user-input data which is input with arbitrary timing. Moreover, the result of recognition is made to be stored in the correspondence relationship storing section 5.

Figure 38:
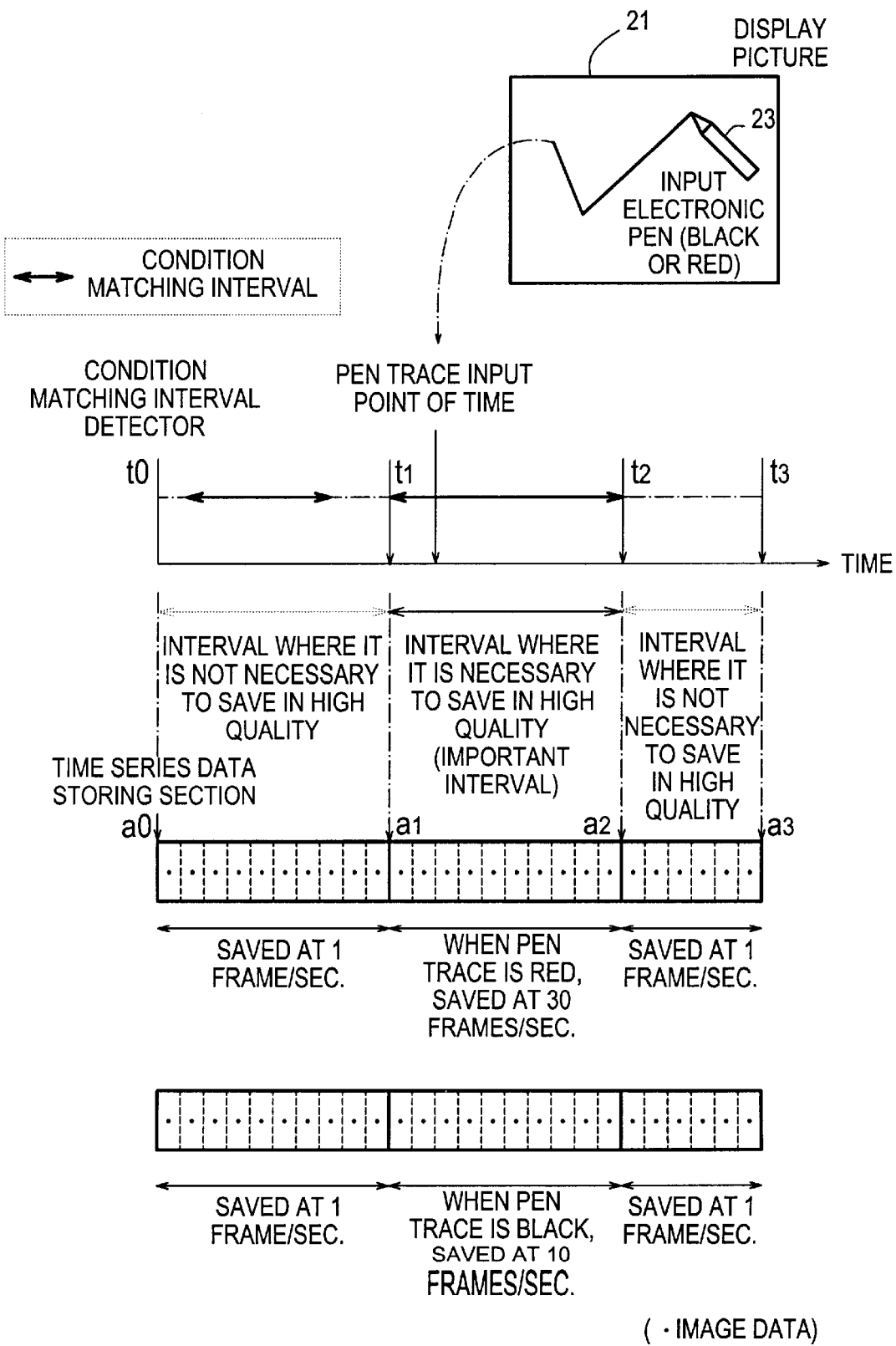
FIG. 38 is a diagram associating and describing the color of the pen trace input and the storing status of the time-series data storing section in the ninth embodiment.

In other words, in the ninth embodiment configuration, the correspondence relationship storing section 5 is structured to associate and store the user-input data which the user inputs, the degree of importance of the user-input data, data specifying the display position of the user-input data on the screen (for example, absolute coordinate and relative coordinate on X-Y coordinate plane), and the storage address within the time-series data storing section 4 of the audio data or the image data which is input during input of the user-input data The operation of the ninth embodiment configuration will be described using an example in which a red pen trace data is input as important user-input data in reference to FIG. 38. In this example, two types of pens, namely red input pen and black input pen may be used as an input pen. In this case, a memory (unrepresented) which associates and stores the color of the input pen and the degree of importance of the user input information is provided.

Upon detection of an input of the pen trace data by the user input detection section 11, the user-input data detection section 11 checks whether or not the pen trace data input is red. Moreover, if the pen trace data input is black, the image data is set to be stored with image signal in the interval from time t1 to time t2 in FIG. 38 is stored at 30 frames per second. If the pen trace data is red, the image data in said interval is set to be stored at 30 frames per second. In short, when the pen trace is red the image is stored with higher image quality than when the trace is black.

Here, in the example above, the interval from time t1 to time t2 may be set to be stored with 10 frames per second when the pen trace is black and the interval from time t0, which is the starting point of the remark, to time t2 may be set to be stored with 10 frames per second when the trace is red. In short, the length of interval to be stored with high image quality may be changed with the degree of importance of the user-input data in this case.

In the above description, the color of input pen and the degree of importance of the user-input data are previously associated and stored, but the ninth embodiment configuration is not limited to such structure but the degree of importance of the user-input data may be made to be determined automatically. Here, an example in which number of input, input frequency and input pattern of the user-input data that are input during recording period of the audio data or the image data are detected for each type of the user-input data, based on which result the degree of importance of the user-input data is automatically determined will be described.

For example, if the number of blue pen trace data is 3,000 and the number of black pen trace data is 120 during recording of the audio data or the image data, the number of blue pen trace data and the number of black pen trace data are compared and the pen trace data with fewer number is made to be the important input data.

Moreover, if the number of blue pen trace data is 300, the number of black pen trace data is 120, and the number of red pen trace data is 30, then the degree of importance in descending order is determined to be red, black and blue.

If the numbers of input of blue, black and red pen trace data are respectively 3,000, 100 and 30, then the compression process is executed by setting the compression rates of the image to be 3000:120:30 or 100:4:1.

Figure 39:
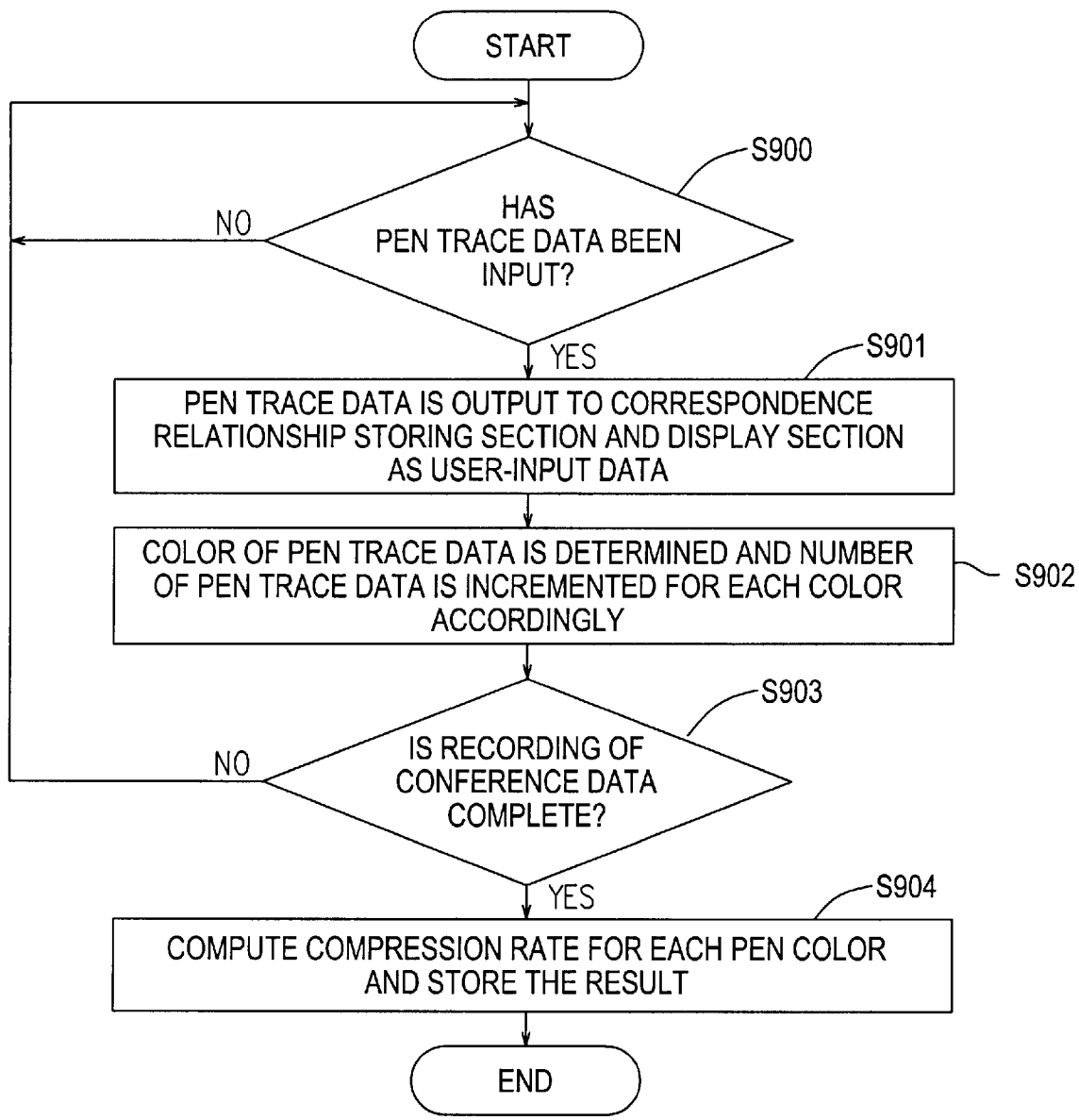
FIG. 39 is a diagram describing an example of a process routine of the user-input data detection section in the ninth embodiment.

Moreover, the degree of importance of input data which is determined during recording of the audio data or the image data is stored in the storing memory through the operation described in the flow chart of FIG. 39 and is accessed during compression of the audio data and the image data.

Next, the flow chart of FIG. 39 will be explained. First, at step S900 the program determines whether or not pen trace data is input If the pen trace data is determined to have been input, the program moves to step S901. At step S901, the pen trace data is output to the correspondence relationship storing section 5 and to the display section 10 as the user-input data. At the next step, step S902, the color of the pen trace data input is determined and the number of pen trace data is incremented according to the count value for each color. Next, at step S903, the program determines whether or not recording of all conference data is completed. If the recording is determined not to have been completed, the program returns to step S900. If the recording is determined to have been completed, the program moves to step S904. In step S904, the program computes the compression rate for each pen color and stores the result of computation in the storing memory.

In a case where the color of input pen and the degree of importance of the user-input data are previously associated and stored, a problem occurs when a writer mainly uses a pen which has a different color from the pen ordinarily used. The problem is that the audio data or the image data may be recorded with a different compression rate or different compression system of image quality/audio quality than what the writer expected. However, if the degree of importance of the user-input data is automatically determined based on the number of input, input frequency or input pattern of the user-input data as described above, the audio data or the image data is stored with the expected compression rate or compression system of the writer even if the pen with a different color is used.

Furthermore, in the case when the degree of importance of the user-input data is automatically determined based on the number of inputs, input frequency and the input pattern, the degree of importance may be determined based on the number of inputs and the input pattern of the user-input data, even if a user-input data whose degree of importance is not previously registered is input. In fact, even when a pen with a color whose degree of importance is not yet registered is used, the degree of importance of the user-input data of the pen with that color may be determined.

In the explanation above, a compression process is made to start when the elapse time (namely, data storage time) from recording of the audio data or the image data in the time-series data storing section 4 exceeds the predetermined time. However, in the tenth embodiment configuration, said compression process is made to start at the time when empty areas in the time-series data storing section 4 are recognized to be less than a certain amount or when the memory amount used in the time-series data storing section 4 is recognized to be more than a certain amount.

Hence, the process operation during storing is the same as the operation in the aforementioned embodiment configurations but the operation during the data compression is different.

Figure 40:
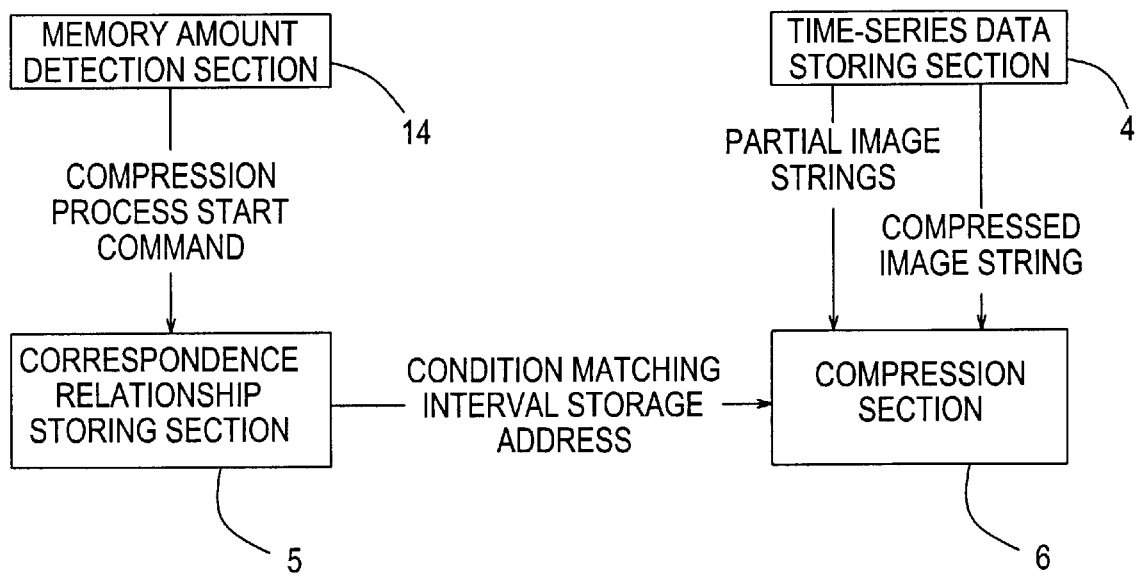
FIG. 40 is a diagram describing a flow of operation during data compression in the tenth embodiment.

FIG. 40 describes the operation during data compression in the tenth embodiment configuration with the flow of various data and the flow of output from each section. In the tenth embodiment configuration, the data accumulation apparatus comprises a memory amount detection section 14 which outputs a compression process start command to said correspondence relationship storing section 5 when the amount of image data recorded is detected to have exceeded a previously registered storing capacity. The operation to be executed after the compression process start command may be executed in the same manner as in each of the embodiment configurations described before.

Figure 41:
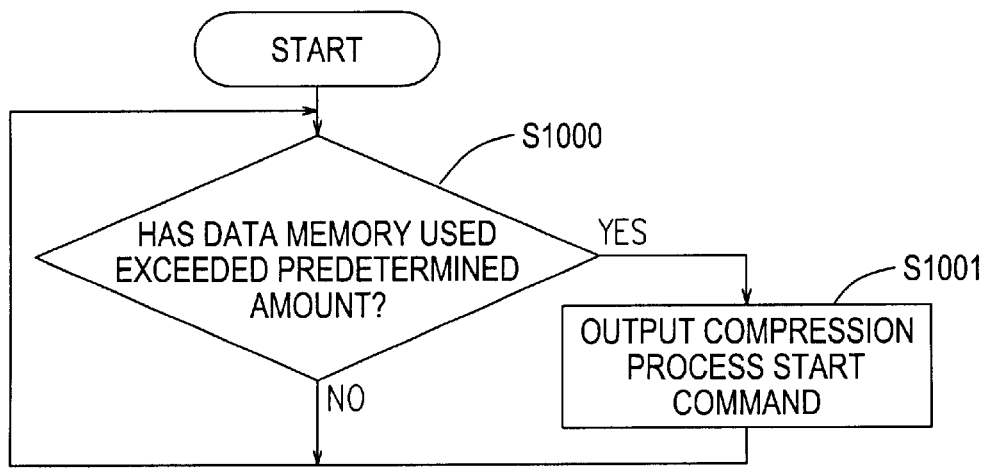
FIG. 41 is a flow chart describing operation of a memory amount detection section in the tenth embodiment.

FIG. 41 is a flow chart of the memory amount detection section 14 in the tenth embodiment configuration. If the data memory amount used is detected to have exceeded a predetermined amount at step S1000, the program moves to step S1001 and outputs a compression process start command to the correspondence relationship storing section 5. For example, suppose the memory amount detection section (unrepresented) is set to execute said compression process when the data is tried to be recorded more than 90% of the memory capacity of the memory medium. In this case, when the memory amount reaches 90% of the memory medium, said memory amount detection section outputs the compression process start command.

The correspondence relationship storing section 5, upon receiving the compression command from said memory amount detection section 14, outputs each of the important intervals determined by the user-input data time detected by said user input detection section 11 and by said condition-matching interval detection section 3. The correspondence relationship storing section 5 further outputs the memory address, in said time series storing section 4, of the image data stored in said time-series data storing section 4 to the compression section 6, and said compression section 6 executes data compression of the image data stored in said time-series data storing section 4. Of course, in this case, the compression process may be executed in the background while new image signals are being recorded.

Moreover, in the case of the present embodiment configuration, the compression rate or the compression system may be set in such a manner that the amount of image data is contained in a predetermined memory capacity. For example, when the data exceeds 90% of the memory capacity of the memory medium, the usage amount of the memory medium is set to reduce it to 30%. The compression rate of the important interval and the interval outside of the important interval is to be computed from the value set above.

For example, suppose 10,000 frames of non-compression images are stored in the time-series data storing section 3. Of the 10,000 frames, the important intervals comprise 2,000 frames and the intervals outside of important frames comprise 8,000 frames.

Next, a case in which frame thinning compression process is executed to reduce image data down to 3,000 frames will be explained. Suppose that the ratio of the compression rate of the important interval and the compression rate of the interval outside of the important interval is predetermined to be 1:10.

In this case, the compression rate of the interval outside of the important interval is $10a$ where a is the compression rate of the important interval.

The compression rate a satisfying, $$2000a + 8000 \times 10a = 3000$$

is 0.0366, hence the compression rate of the important interval and the compression rate of the interval outside of the important interval become 3.66% and 36.6% respectively.

By dividing 10,000 non-compression image frames stored in the time-series data storing section 4 into the important intervals and the interval outside of the important interval and by executing the frame thinning compression with respective compression rate, the image data may be reduced to a desired 3,000 frames.

An eleventh embodiment configuration relates to a case in which a compression system or compression rate is established based on the data which is obtained immediately after completion of recording of the audio data or the image data.

For example, a scene of a person speaking for a long time usually indicates that important messages are being expressed, such as announcements are being made, important opinions are expressed or discussion is being summarized during a conference. Hence, after shooting a conference, degree of importance is assigned in the descending order of the length of the scene. At this time a low compression rate is assigned to the scene with high degree of importance and a high compression rate is assigned to the scene with low degree of importance.

Moreover, the important intervals which are determined by the user-input data input time detected by the user input detection section 11 and said condition-matching interval detection section 3 are compressed with compression rate corresponding to the degree of importance. Furthermore, the image data which is stored in the time-series data storing section 4, is compressed by changing the compression rate and the compression system for the important interval and the interval outside of the important interval, like the process in the fourth embodiment configuration. By doing so, the scene in which a long remark is made is stored with high audio/image quality while the scene in which a short remark is made is compressed with high compression rate.

Moreover, data indicating how long the previously registered audio keyword is used during the conference is stored and the degree of importance is assigned in the following order of the length of the usage of the keyword. For example, in a conference scene, the discussion being carried over for long time usually is an important discussion. Hence an example may be structured in such a manner that keywords suggesting the content of the discussion are previously registered and the keywords are detected from the input audio data.

Moreover, by detecting that a certain keyword is used for a long time, the discussion corresponding to the keyword is recognized as a discussion made for a long time. Hence, the interval in which the keyword appears is considered as an important interval. The intervals for which high degree of importance is assigned is stored with high audio/image quality while other intervals with low degree of importance are compressed with high compression rate during data compression/

As described above, the first through the eleventh embodiment configurations assumed, for convenience, that the user-input data is input by one recorder. However, it is possible to structure an embodiment in such a manner that the user-input data input by a plurality of users may be collectively detected when computers with internal data storage playback apparatus are networked or when a plurality of input terminals are connected to a data storage playback apparatus.

For example, when a plurality of participants gather in a conference room, each participant taking memo during the conference, the user-input data input by each participant and the timing of input of the user-input data are not the same. A method is disclosed in Japanese Laid-Open Patent Publication 6-343146 in which sound is recorded and stored separately for each conference and each participant, but for each participant to maintain separate recording copy of the audio signal or the image signal is redundant when the proceeding of the conference is shot with one camera and one microphone.

Memory capacity may be conserved if an embodiment is structured in such a manner that the user-input data input by a plurality of users is collectively detected and that the audio signals or the image signals are stored in the same time-series data storing section 4, thus eliminating need for storing the audio data or the image data for each user.

Here, the detected user-input data input by separate recorders may be stored in separate correspondence relationship storing sections 5 or may be stored in the same correspondence relationship storing section 5.

Figure 42:
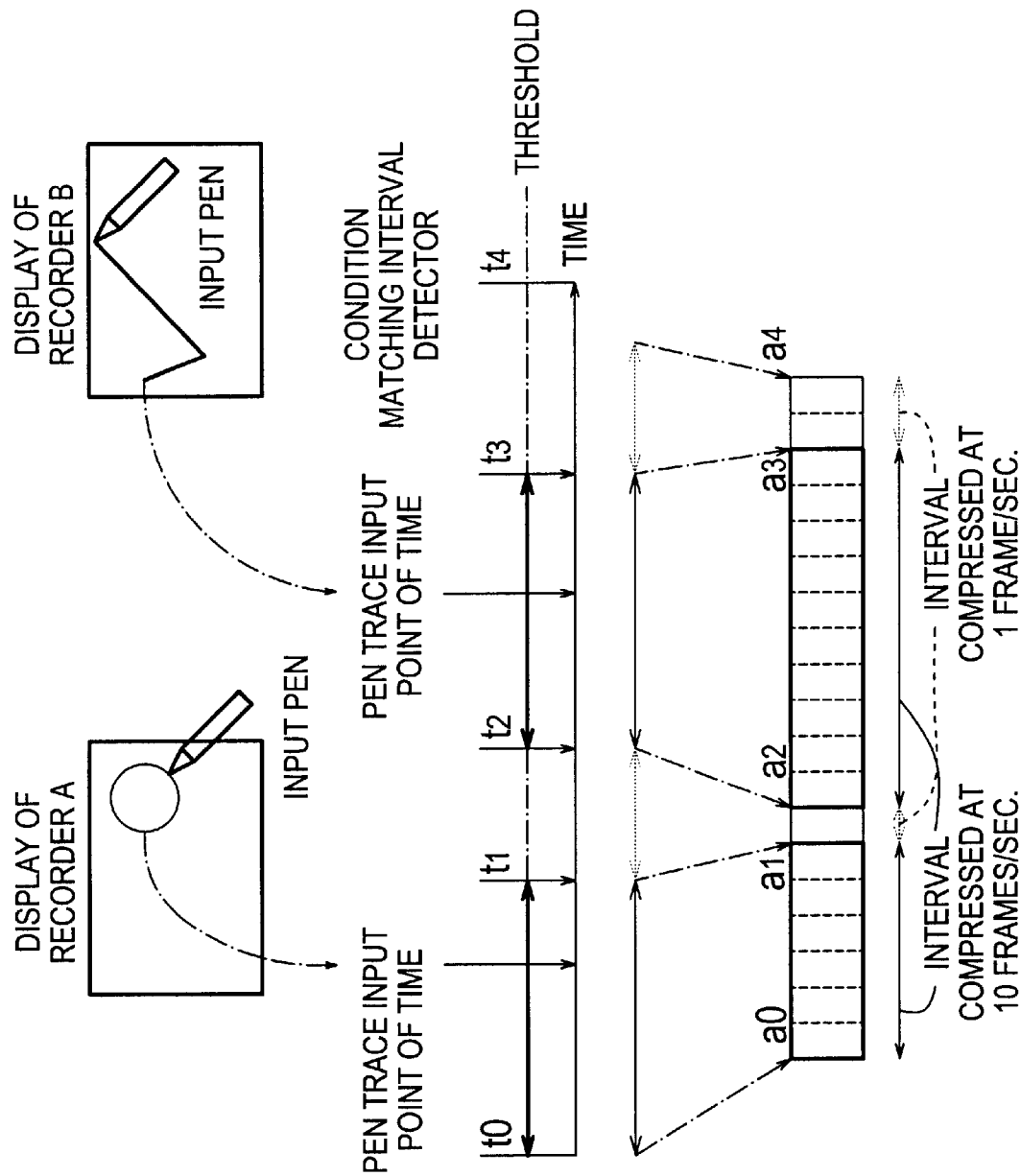
FIG. 42 is a diagram describing operation of combining and detecting the user-input data input by a plurality of users in the twelfth embodiment.

FIG. 42 describes an example in which there are two recorders, a recorder A and a recorder B who input pen trace data with different timing. In fact, the recorder A made pen input during the interval in which conversation is active (interval between time t0 to time t1), hence the image data between the time t0 to the time t1 is compressed with a rate of 10 frames per second. Moreover, the recorder B made pen input during active conversation interval (between time t2 to time t3), the image data between the time t2 to the time t3 is compressed at the rate of 10 frames per second. Moreover, the image data in the interval outside of these intervals, namely interval from the time t2 to the time t3 is compressed at the rate of one frame per second.

In this case, the image signals input by the recorder A and the recorder B are stored in the same time-series data storing section 4, as described in FIG. 42. In this manner, a need to store the audio signals and the image signals by individual user is eliminated. Moreover, compression rates may be changed sectionally based on the degree of importance, if the degree of importance of the user-input data is made to be identified and determined for each recorder or each input terminal.

Moreover, if the recorder or input terminal is made to be identified in the above manner, it becomes possible to playback the audio signals or the image signals with different thinning location for each recorder. For example, if the recorder A issues a playback request, the interval between the time t0 to the time t1 is played-back with normal speed, which is the speed of recording, while the other intervals are played-back with double speed. Likewise, if the recorder B issues a playback request, the interval between the time t2 to the time t3 is played-back with normal speed, which is the speed of recording, while the other intervals are played-back with double speed.

In all the embodiment configurations described above, a condition-matching interval is detected by the condition-matching detection section 3, from the result of which and from the user-input data being detected by the user-input data detection section 11 the important interval of the time-series data is determined, and based on the important interval, the compression section 6 is made to compress the time-series data stored in the time-series data storing section 4.

However, in the thirteenth embodiment configuration, the important interval of the time-series data is determined only from the user-input data detected by the user-input data detection section 11. Based on the important interval, the compression section 6 is made to compress the time-series data stored in the time-series data storing section 4. In short, the data storing playback apparatus in the present example does not contain the condition-matching interval detection section 3.

Figure 43:
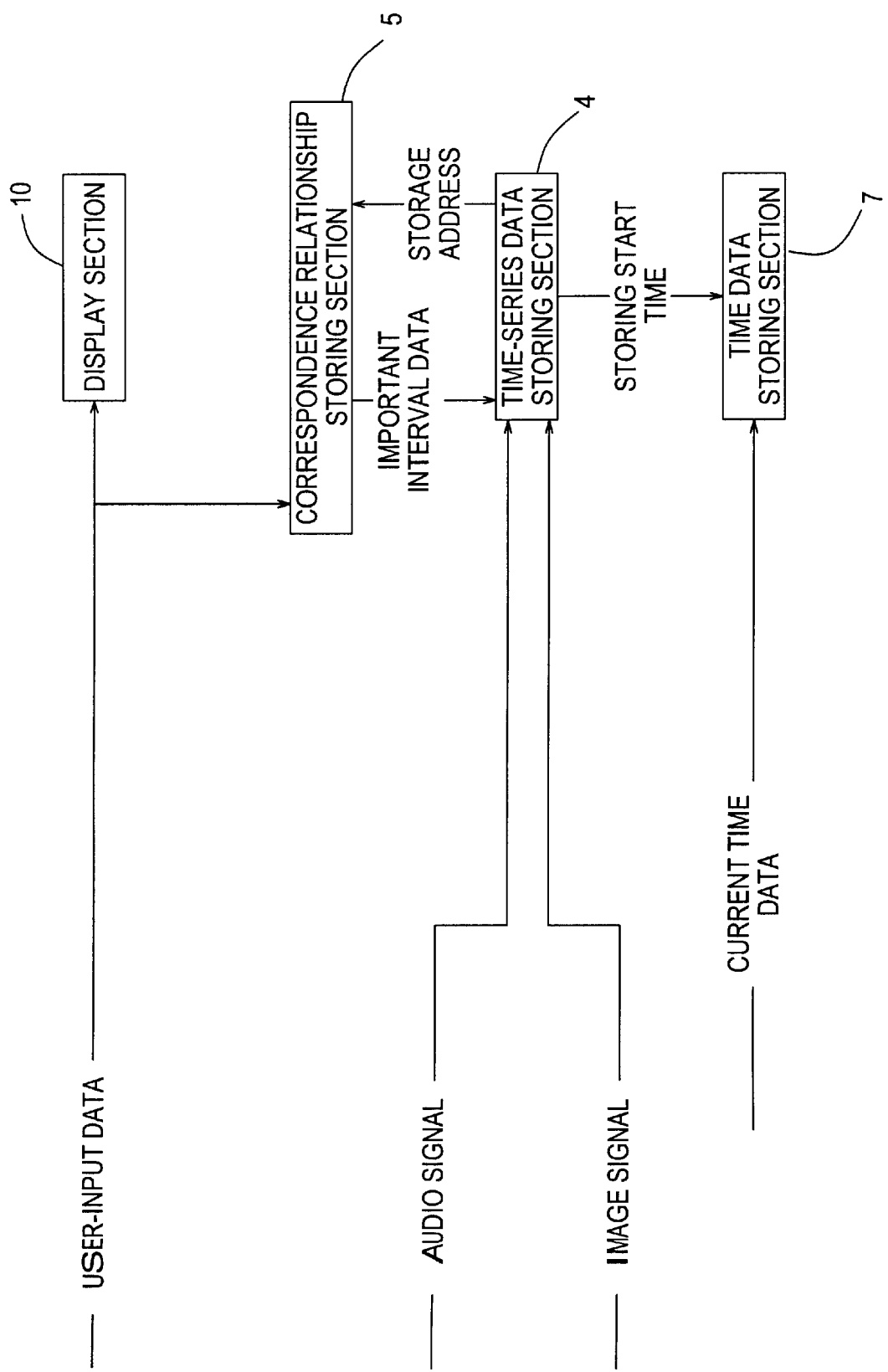
FIG. 43 is a diagram describing a flow of operation during data recording in the thirteenth embodiment.

FIG. 43 describes operation during recording in the thirteenth embodiment together with the flow of each data, and flow of output of each section.

In other words, when a conference begins in the thirteenth embodiment configuration, the audio signals and the image signals are sequentially stored in the time-series data storing section 4. Upon receiving storing start data from the time-series data storing section 4, the time data storing section 7 stores the storing start time. Moreover, when the user-input data is detected by the user-input data detection section 11, the user-input data, pen tracing data for example, is sent to the display section 10 and is displayed on the display screen 21.

Moreover, the user-input data is sent to the correspondence relationship storing section 5. The correspondence relationship storing section 5 stores the user-input data, determines the important interval, and sends the data in the important interval to the time-series data storing section 4.

Figure 44:
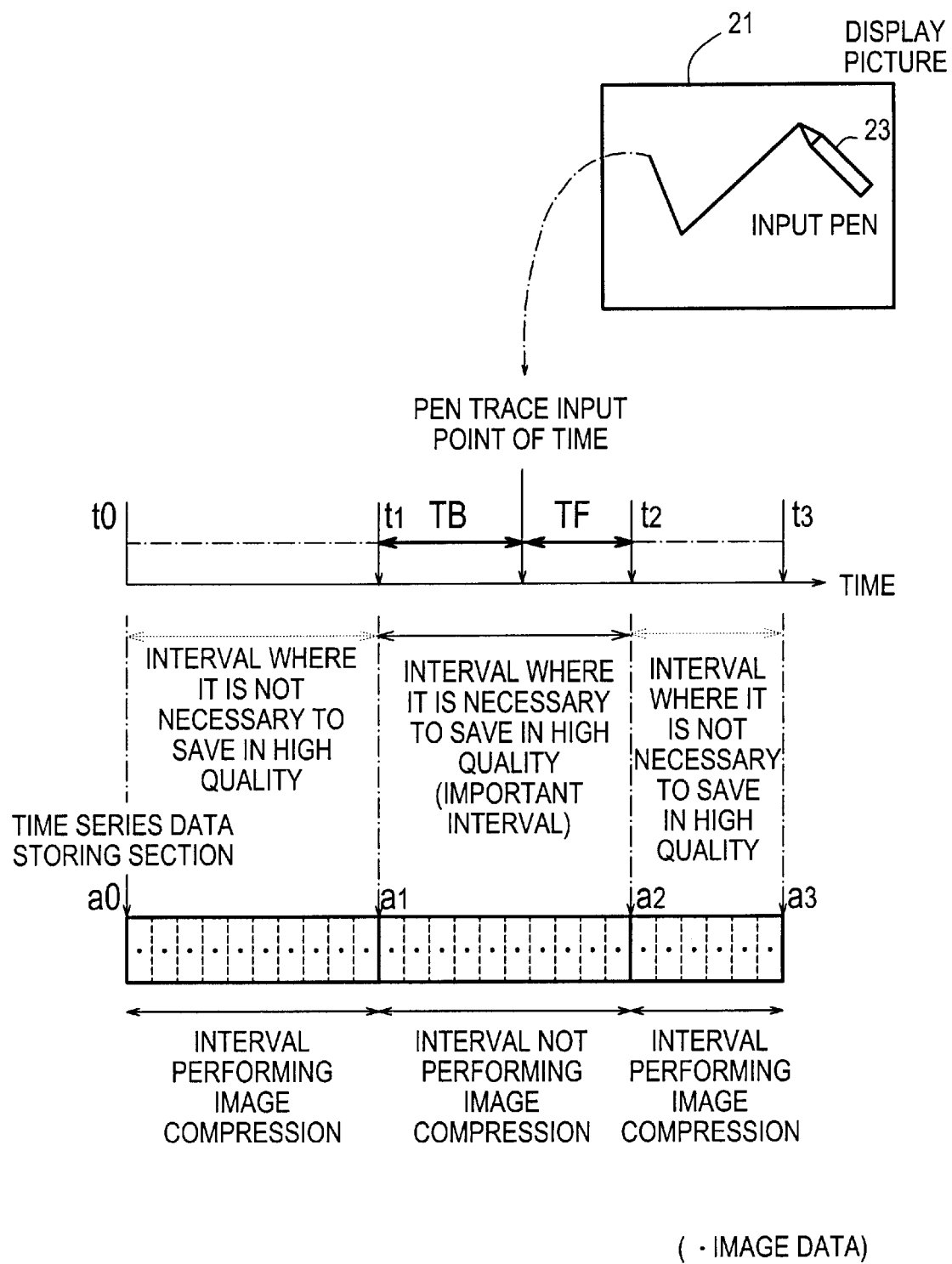
FIG. 44 is a diagram describing the operation of defining the intervals before and after the time of detecting the user-input data as important intervals in the thirteenth embodiment.

In the thirteenth embodiment configuration, time t1 which precedes the time when the user-input data is detected (the pen trace input time in the figure) by a predetermined amount of time tB is made to be the starting point of the important interval, as described in FIG. 44, and the time t2 which passes the time when said user input is detected by a predetermined time tF is made to be the ending point of the important interval. In short, the interval between t1 and t2 is specified as an important interval.

In this example, the time tB is made to be 3 minutes and the time tF is made to be 1 minute. Here, the time tB and the time tF, which are used in determining the starting point and the ending point of the important interval, may be made to change freely by the user.

The time-series data storing section 4 which obtains the important interval data from the correspondence relationship storing section 5 returns the memory address a1 and address a2 of the image data which are stored in the time-series data storing section 4 and which correspond to the time t1 and the time t2 to the correspondence relationship storing section 5. The correspondence relationship storing section 5 associates the storing addresses a1 and a2 to said user-input data and stores them.

Figure 45:
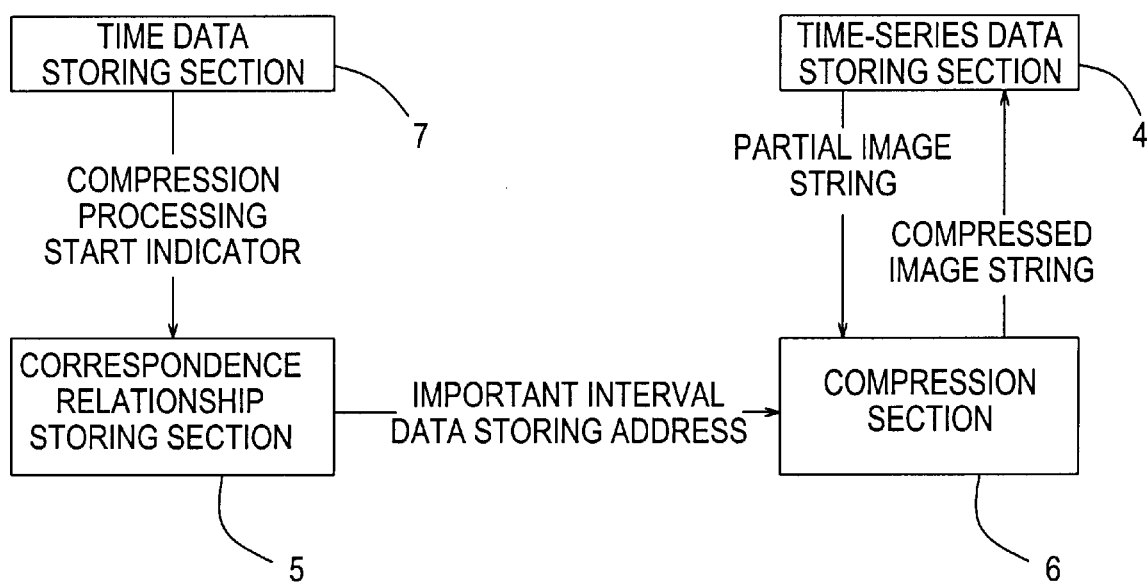
FIG. 45 is a diagram describing a flow of operation during data compression in the thirteenth embodiment.

FIG. 45 describes operation during compression in the thirteenth embodiment together with the flow of each data, and flow of output of each section.

When the time data storing section 7 detects elapsing of a predetermined time interval from recording of the conference data, the time data storing section 7 outputs the compression start command to the correspondence relationship storing section 5. Upon receiving the compression start command, the correspondence relationship storing section 5 sends the storing addresses a1 and a2 to the compression section 6 as important interval data. The compression section 6 compresses the image data in the important interval, namely, the image data stored in the time-series data storing section 4 from the time t1 to the time t2 (from the address t1 to the address t2) with a different compression rate or compression system from the other intervals.

In this example also, the image data of the important interval is made to be stored with high image quality. In other words, the compression section 6, in the same manner as the first embodiment configuration, treats image train of the 10 continuous frames, for example, as one unit section image train, and executes compression process in which only the one leading frame out of 10 frames in said interval outside of the important interval is kept while a thinning compression process of discarding the data in the remaining nine frames is executed. On the other hand, in said important interval said thinning compression process is not executed but all 10 frames are made to be stored.

The fourteenth embodiment configuration relates to a case in which the display section 10 displays compression status of the image data which is input when pen trace data is detected in the time-series data storing section 4 at the display position being specified by the display position of said pen trace data in the data storage playback apparatus.

Figure 46:
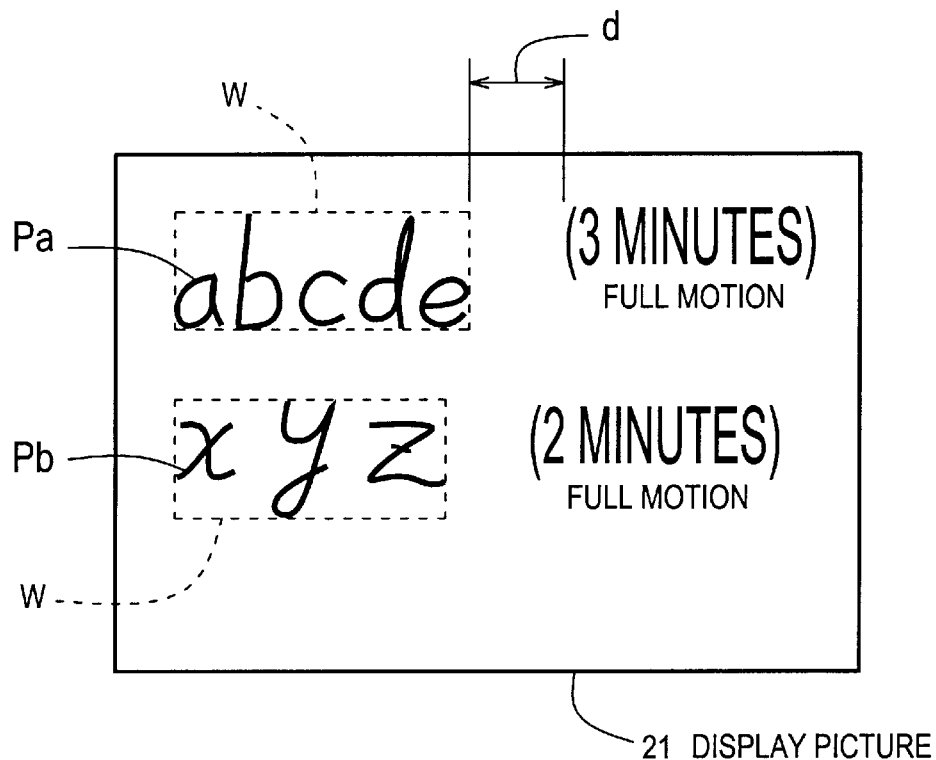
FIG. 46 is a diagram describing an example of displaying a compression status of the time-series data storing section in the fourteenth embodiment.

In other words, in the fourteenth embodiment configuration, the display section 10, as described in FIG. 46, is made to display the length of time of the part where the image data stored in the time-series data storing section 4 is stored in full-motion motion image (30 frames per second), and the word ("full-motion") indicating a compression rate of the recording image. Because the recording time of the full-motion motion image is displayed in the display screen 21 in this manner, and the screen is seen by the user at the time of playback, the user may easily learn how much time is needed from the start of recording. Moreover, because the word indicating a compression rate is displayed, the user may conveniently learn whether or not the data is the time-series data needed.

In the example of FIG. 46, both pen trace data Pa and Pb are present. The smallest rectangle W (a clipping frame described by dotted line in FIG. 46) needed to contain one pen trace data ("abcde" or "xyz" in FIG. 46) is computed, and compression status of the image data stored respectively corresponding to pen trace data Pa and Pb in the time-series data storing section 4 is displayed in such a manner that the compression status data is separated by distance d to the right from the right edge of the clipping frame W and the compression data lines up at half of the height of the clipping frame W. Other compression status such as storing time, compression rate or time interval of intermittent recording may be displayed.

In this embodiment configuration, as described in FIG. 46, the word indicating the compression rate is made to be contained in parenthesis and to be displayed at the right edge of the pen trace data Pa and Pb, but the display position is not limited to the right edge. In other words, it is sufficient to display the words in such a manner that the user may easily learn from the display that each pen trace data Pa and Pb corresponds to the compression status data. For example, the compression status data may be displayed at a position vertically adjacent or horizontally adjacent of the pen trace data Pa and Pb, or only access number may be displayed adjacent to the pen trace data Pa and Pb with the access number and the compression status data being displayed at the bottom or in an empty space.

Figure 47:
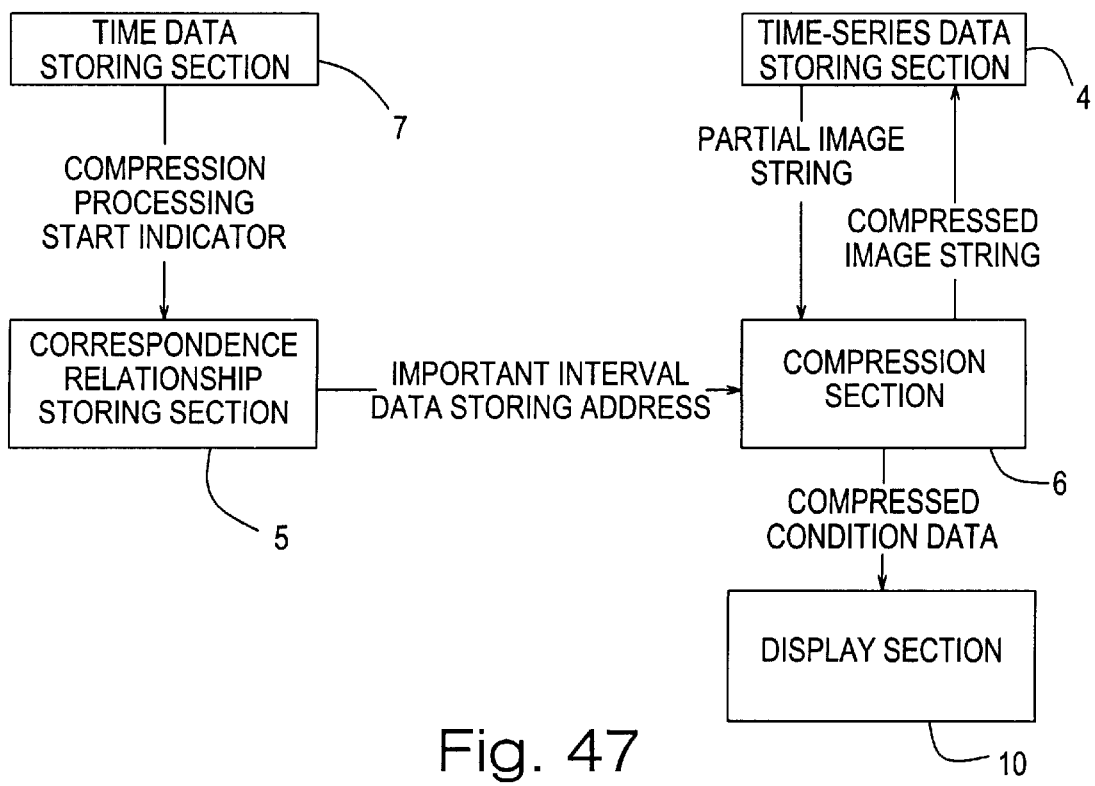
FIG. 47 is a diagram describing a flow of operation during data compression in the fourteenth embodiment.

FIG. 47 describes operation during compression in the fourteenth embodiment together with the flow of each data, and flow of output of each section. The user trace data and the compression status data of the image data corresponding to each user trace data in the time-series data storing section 4 are displayed to correspond to each other on the display screen, by outputting the compression status data being output from the compression section 6 during compression as described in FIG. 47.

Moreover, in the fourteenth embodiment, as described in the third embodiment configuration, display of the user-input data may be updated as needed if the image data or the audio data is gradually compressed based on elapsed time from the storing of the data in the time-series data storing section 4.

Figure 48:
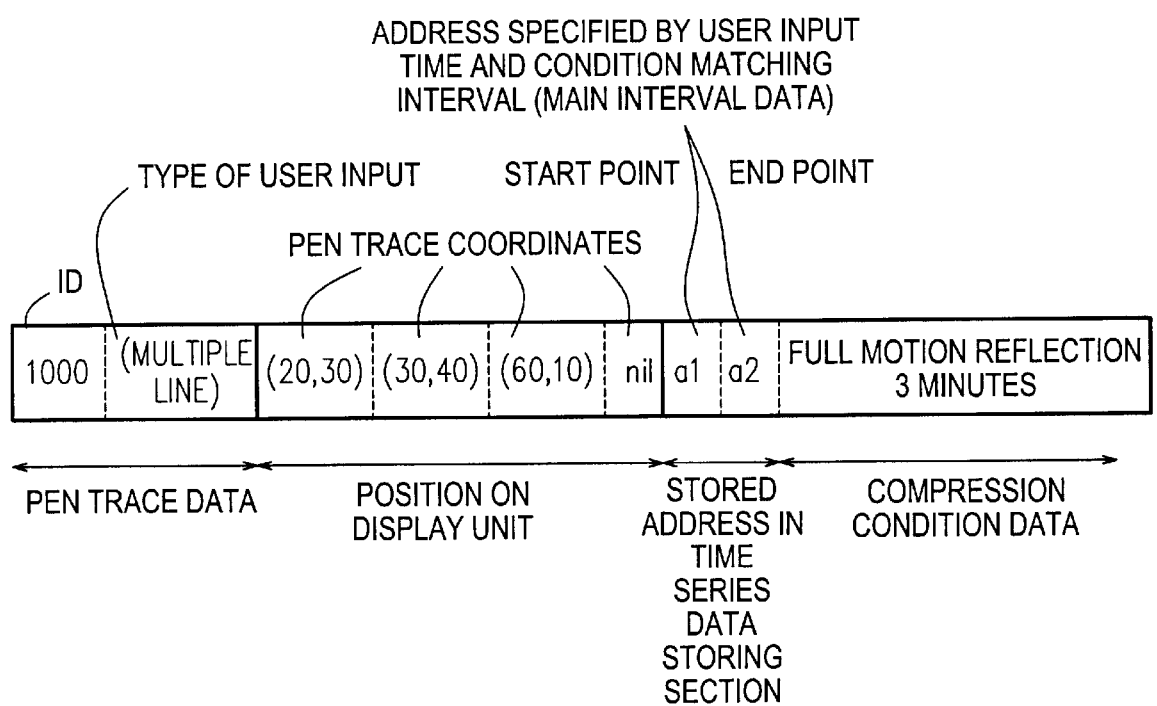
FIG. 48 is a diagram describing a storing status of the correspondence relationship data to be stored in the correspondence relationship storing section in the fourteenth embodiment equivalent to one pen trace.

Next, specific process involved in such a case will be described. FIG. 48 describes the compression status data stored in the correspondence relationship section 5 in such example, and the compression status data concerning pen trace as each user-input data, in addition to data described in FIG. 9, is stored in the correspondence relationship storing section 5. In the present example, data indicating "full-motion" (no thinning) and the length of the time of the important interval are stored.

Here, the storing time of the audio data or the image data, compression rate of in-frame compression, compression rate of inter-frame compression, time interval of intermittent recording, color data thinning rate, illumination data thinning rate, and the like may be used as compression status data.

Figure 49:
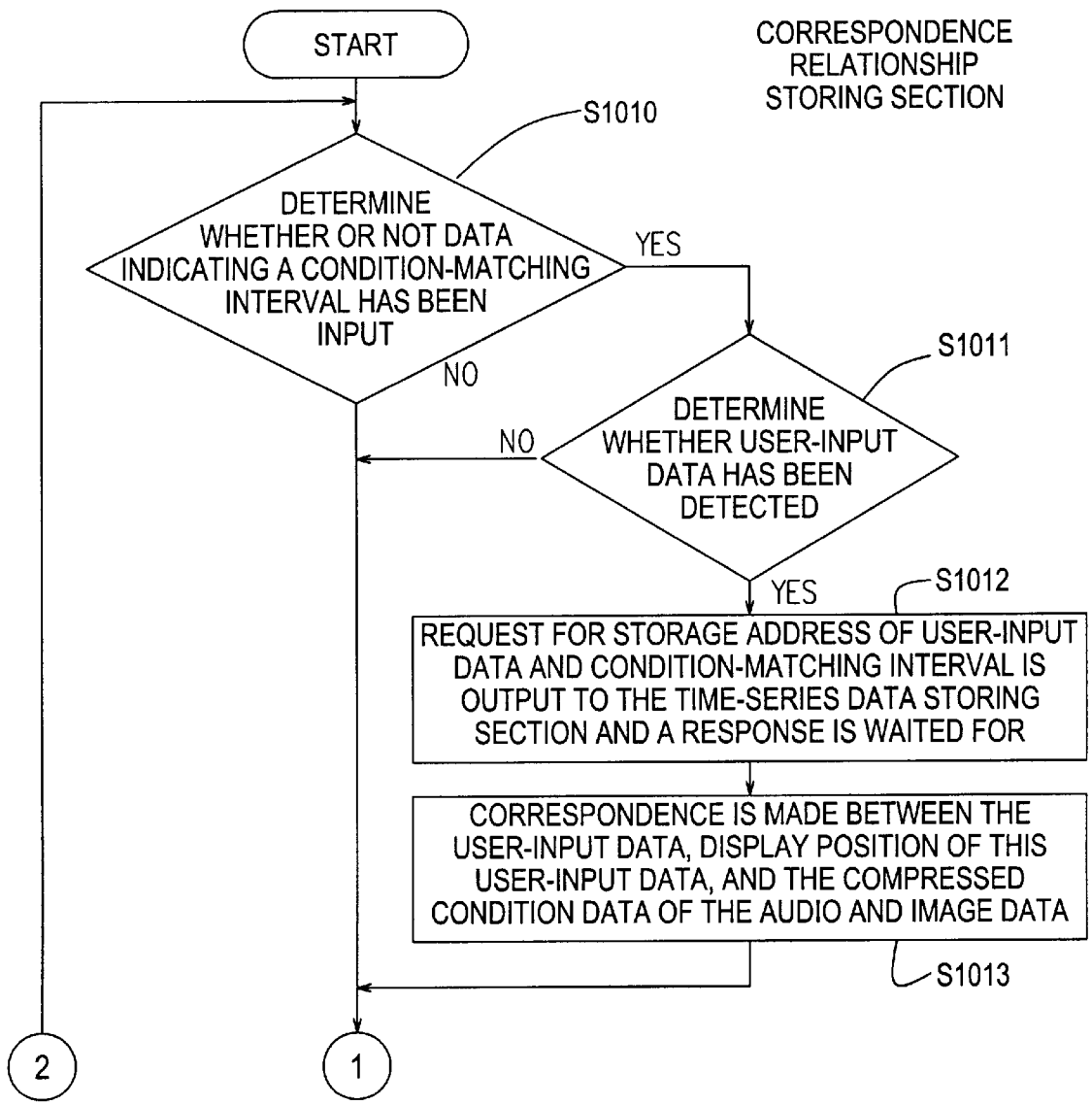
FIG. 49 is a flow chart describing a first portion of an example of a process routine of the correspondence relationship storing section in the fourteenth embodiment.
Figure 50:
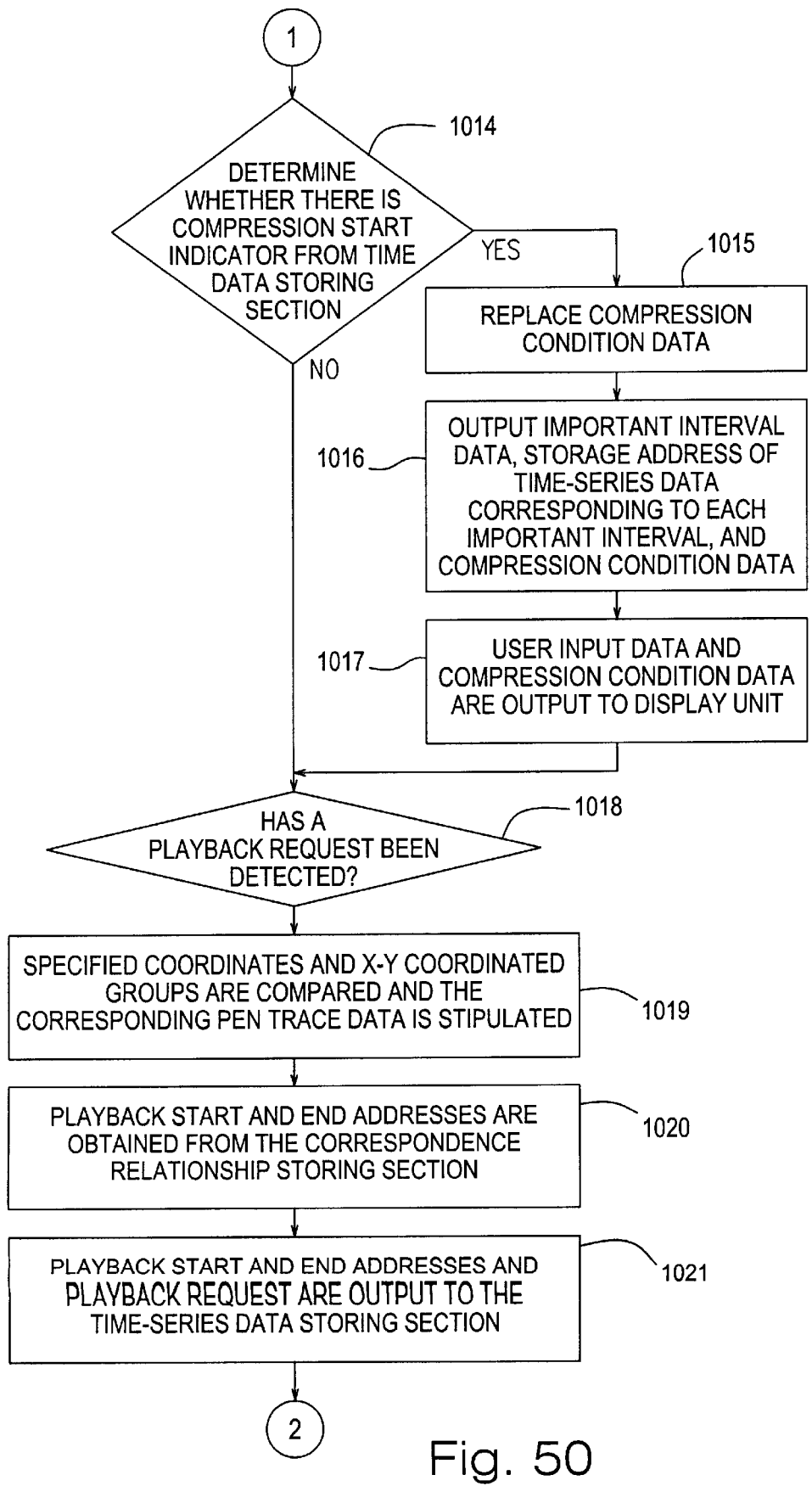
FIG. 50 is a flow chart describing a second portion of an example of a process routine of the correspondence relationship storing section in the fourteenth embodiment.

FIG. 49 and FIG. 50 are flow charts describing process routine of the correspondence relationship storing section 5 in the present example. Comparing the process routine with the process routine of the correspondence relationship storing section 5 of the first embodiment configuration described in FIG. 10 and FIG. 11, step S1010–step S1012 are exactly same as step S300–step S302. Moreover, step S1014 corresponds to step S304, and step S1011–step S1013 are exactly same as step S306 step S309.

In the present example, the association storing process section of step S1013 which corresponds to step S302 of FIG. 10 differs from the process when compression start command is made in step S1015–step S1017 which correspond to step S305. In other words, in step S1013, the user-input data, data concerning display position of the user-input data, the memory address of the important interval in the time-series data storing section 4 and the compression status data of the interval are associated and stored.

Moreover, when the compression start command is sent from the time data storing section 7, the compression status data is updated at step S1015. Then the program moves to step S1016 and outputs the important interval data, the memory address in the time-series data storing section 4 corresponding to each important interval and the compression status data. Then the program moves to step S1017 and displays by the display section 10 the user-input data and updated compression status data on the display screen as described in FIG. 46.

In the above example, the case in which the compression status data is displayed on a position corresponding to the display position of the user-input data, but display style of the corresponding user-input data may be changed and displayed according to the compression status.

Here, for simplicity of explanation, the user-input data is assumed to be only character data input from the keyboard. Hence, the explanation is given to the case in which the display section 10 displays the character string data input from the keyboard in the character style corresponding to the compression status of the image data, which is input when the character string data is input, in the time-series data storing section 4.

Figure 51:
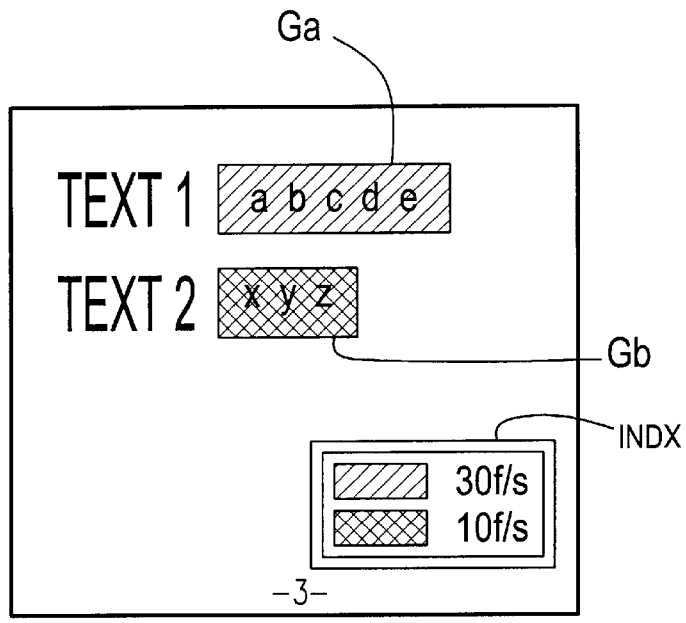
FIG. 51 is a diagram describing an example of changing the display style according to the compression status of the time-series data storing section in the fourteenth embodiment.

The example of FIG. 51 describes a case in which character area to be displayed according to the compression status is displayed by different display colors. For example, if the compression status of the image data input when said characters are input in the time-series data storing section 4 is stored at full-motion motion image (30f/s;30 frames per second), the rectangular area Ga containing the character is displayed in the first display color, blue, for example. Moreover, if the image data input when said characters are input is thinning-compressed (10f/s;10 frames per second, for example) and stored in the time-series data storing section 4, the rectangular area Gb is displayed in the second display color, green, for example.

In FIG. 51, INDX is an index which informs the user compression status corresponding to each display color. In this case, the color corresponding to compression status is set in a table (unrepresented) beforehand. The colors in the table may be changed by the user.

As for character display style, character fonts, character size, underline, halftone in addition to color may be established with each compression status. Moreover, attributes relating to layout such as line space, character space, indentation margin (tab margin) may be made changeable according to the compression status. For example, the character string input from the keyboard may be displayed with first line being automatically shifted by an indentation margin according to the compression status. Moreover, display style other than character display style may also be established, and line type or line thickness may be made changeable according to the compression status if the user-input data is the pen trace data.

Figure 52:
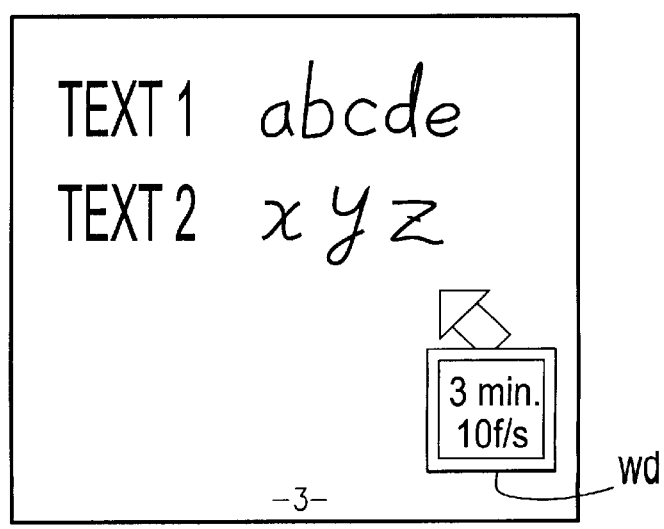
FIG. 52 is a diagram describing an example of displaying the compression status of the time-series data storing section upon receiving a request from the user.

Moreover, compression status data may be made to be displayed only with the request from the user instead of being displayed all the time. For example, as described in FIG. 52, by holding a mouse pointer stationary for certain amount of time on an arbitrary character string data display the character string data (the user-input data) may be designated and the compression status of the image data stored in the time-series data storing section 4 corresponding to the designated character string data may be displayed by spray display with the designated timing.

Moreover, a method in which designation of the user-input data is not required may be employed in displaying the compression status data which normally is not displayed. For example, a button may be provided to display all the compression status data contained in the page being displayed. Furthermore, a button may be provided to make all the compression status data contained in the page being displayed not displayed.

Moreover, the first embodiment configuration through the fourteenth embodiment configuration may be combined, if necessary, in addition to what is already clearly described in each embodiment configuration.

As described above, in the data storage device of the present invention, the user-input data, change in audio or image, and change in sensor detection signals are combined appropriately in storing conference data, for example, to detect important intervals on which characteristic events are occurring. For the important intervals the time-series data, such as audio data or image data, is stored with high quality, while for other intervals, the data is compressed and stored in the time-series data storing section with a high compression rate. Hence, even a memory with small storage capacity may be able to store time-series data for a long time.

In addition, the time-series data of an important interval is store with high quality. Hence, playback of such data enables proper and sure grasping of the data content. Hence, application of the present invention to recording and storing of conference data with large amount of data, enables storing of data necessary for proper grasping of conference content with high quality. Hence, the conference content is grasped accurately even though the total data amount may be reduced.

While this invention has been described with reference to specific embodiments, it is not confined to the specific details set forth, but is intended to cover such modifications or changes as may come within the scope of the following claims.

What is claimed is:

1. A data storage device comprising;
   time-series data input means for inputting time-series data containing at least one of audio data and image data, wherein the time-series data is input during both important intervals and other intervals;
   time-series data storing means for storing time-series data input from the time-series data input means;
   user input means for inputting user-input data,
   user-input data detection means for detecting user-input data input from the user input means, wherein the detected user-input data is used to designate an important interval;
   correspondence relationship storing means for storing a correspondence relationship between at least the user-input data and a position in the time-series data storing means where the time-series data corresponding to the important interval is stored;

a condition-matching interval detection means for detecting a condition-matching interval in which the time-series data matches a predetermined condition unique to an event;

compression means for compressing the time-series data which is stored in the time-series data storing means, wherein the time-series data corresponding to an important interval is compressed differently than the time-series data corresponding to the other intervals.

2. The data storage device of claim 1, wherein said correspondence relationship storing means stores the correspondence relationship between an important interval determined based on the user-input data, the condition-matching interval and a position in the time-series data storing means where the time-series data corresponding to the important interval is stored.

3. The data storage device of claim 1, further comprising a sensor data detection means for detecting data from a sensor, and a condition-matching interval detection means for detecting a condition-matching interval in which the sensor data matches a predetermined condition, wherein the correspondence relationship storing means stores the correspondence relationship between an important interval, which is determined based on the user-input data and the condition-matching interval and the position in the time-series data storing means where the time-series data corresponding to the important interval is stored.

4. The data storage device of claim 1, further comprising:

display means for displaying the user-input data, wherein the correspondence relationship storing means stores correspondence relationships between the important interval, a position in the time-series data storing means where the time-series data corresponding to the important interval is stored and a display position of the user-input data being displayed by the display means;

designation means for designating a displayed user-input data; and playback means for reading and playing-back the time-series data from the time-series data storing means in the important interval.

5. The data storage device of claim 2, wherein the condition-matching interval detection means compares an audio signal level of the time-series data with a pre-set threshold value and detects one of the starting point and the ending point of the condition-matching interval based on the comparison.

6. The data storage device of claim 2, wherein the condition-matching interval detection means detects one of a specific speaker of the audio signal and a switching of the originator of the audio signal and detects one of a starting point and an ending point of the condition-matching interval based on the detection.

7. The data storage device of claim 2, wherein the condition-matching interval detection means detects one of a specific predetermined keyword and a specific predetermined pattern in the time-series data and detects one of a starting point and an ending point of the condition-matching interval based on the detection.

8. The data storage device of claim 2, wherein the condition-matching interval detection means detects one of a specific predetermined character string and a status change in the time-series data and detects one of a starting point and an ending point of the condition-matching interval based on the detection.

9. The data storage device of claim 3, wherein the sensor data detection means detects one of sensor data concerning the position where the time-series data is input and sensor data concerning the position where the sensor data is detected, and the condition-matching interval detection means detects one of a starting point and an ending point of the condition-matching interval based on the sensor data.

10. The data storage device of claim 3, wherein the sensor data detection means detects a specific person and the condition-matching interval detection means detects one of a starting point and an ending point of the condition-matching interval based on the sensor data.

11. The data storage device of claim 3, wherein the sensor data detection means detects one of camera operation signals and a change in camera operation signals and the condition-matching interval detection means detects one of a starting point and an ending point of the condition-matching interval based on the sensor data.

12. The data storage device of claim 1, further comprising a time data storing means for storing a time of storing the time-series data in the time-series data storing means, wherein the compression means executes a compression process when the elapsed time from the time of storing exceeds a pre-set time.

13. The data storage device of claim 1, wherein the compression means executes a compression process when one of an empty area in the time-series data storing means is determined to be below a predetermined value and the amount of memory used in the time-series data storing means is determined to exceed a predetermined amount.

14. The data storage device of claim 1, wherein the time-series data storing means stores the time-series data by frequency band range, and the compression means deletes a high frequency band range of the time-series data stored in the time-series data storing means.

15. The data storage device of claim 2, wherein the time-series data storing means stores the time-series data input from the data input means and the important interval and the other intervals are stored with different frequency band divisions.

16. The data storage device of claim 1, wherein the time-series data storing means divides and stores the image data input from the image data input means into illumination data and color data, and the compression means deletes the color data of the image data stored in the time-series data storing means.

17. The data storage device of claim 1, further comprising an access status storing means for storing data which differentiates an interval being accessed by the user more than a predetermined number of times within a predetermined amount of time and intervals not being accessed by the user more than a predetermined number of times within a predetermined amount of time in the time-series data, wherein the compression means compresses the time-series data accessed by the user more than a predetermined number of times within a predetermined amount of time differently from the intervals which are not accessed by the user more than a predetermined number of times within a predetermined amount of times.

18. The data storage device of claim 2, wherein the compression means determines a degree of importance of the time-series data by combining the detection results of the condition-matching interval detection means and compresses the time-series data based on the degree of importance.

19. The data storage device of claim 1, wherein the compression means determines a degree of importance of the user-input data based on the detection results of the user-input data detection means and compresses the time-series data stored based on the degree of importance.

20. The data storage device of claim 4, wherein the user-input data detected by the user-input data detection means is displayed, and wherein the display means further displays a compression status of the time-series data.

21. The data storage device of claim 4, wherein the display means displays the user-input data and the compression status of the time-series data in the time-series data storing means when the user-input data is detected by the user-input data detection means on the display position specified by the display position of the detected user-input data.

22. The data storage device of claim 4, wherein the display means displays the compression status of the time-series data corresponding to the designated user-input data.

23. The data storage device of claim 4, further comprising a display means for displaying the user-input data by changing the display style according to the compression status in the time-series data storing means.

24. The data storage device of claim 1, wherein the compression means establishes one of a compression rate and a compression system for an interval determined by the user-input data and for other intervals and compresses the data of the time-series data which is stored in the time-series data storing means so that the amount of the time-series data does not exceed the predetermined memory capacity.

25. A method of storing data comprising the steps of:
receiving time-series data containing at least one of audio data and image data, wherein the time-series data is received during both important intervals and other intervals;
storing the time-series data in a storage;
receiving user-input data from a user;
determining an important interval based on at least the user-input data;
correlating at least the important interval and the time-series data corresponding to the important interval;
detecting a condition-matching interval in which the time-series data matches a predetermined condition unique to an event; and
compressing the time-series data, wherein the time series data corresponding to the important interval is compressed differently than the time-series data corresponding to other intervals.

26. The method of claim 25, wherein determining an important interval further includes:
determining the important interval based on the interval designated by the user-input data and the condition-matching interval.

27. The method of claim 26, wherein the step of detecting a condition-matching interval includes detecting one of a specific speaker in the time-series data and a switching of the speaker in the time-series data and detecting one of a starting point and an ending point of the condition-matching interval based on the detection.

28. The method of claim 26, wherein the step of detecting a condition-matching interval includes detecting one of a specific predetermined keyword and a predetermined pattern and detecting one of a starting point and an ending point of the condition-matching interval based on the detection.

29. The method of claim 26, wherein the step of detecting a condition-matching interval includes detecting one of a specific predetermined character string and a status change and detecting one of a starting point and an ending point of the condition-matching interval based on the detection.

30. The method of claim 26, wherein the step of detecting a condition-matching interval includes comparing an audio signal level of the time-series data with a predetermined threshold value and detecting one of a starting point and an ending point of the condition-matching interval based on the comparison.

31. The method of claim 27, wherein the step of receiving sensor data further includes receiving camera operation data and the step of detecting a condition-matching interval includes detecting one of a starting point and an ending point of the condition-matching interval based on the camera operation data.

32. The method of claim 25, further comprising the step of receiving sensor data from a sensor, wherein the step of determining an important interval further includes detecting a condition-matching interval in which the sensor data matches a predetermined condition and determining the important interval based on the interval designated by the user-input data and the condition-matching interval.

33. The method of claim 32, wherein the step of receiving sensor data further includes receiving positional data relating to one of the position where the time-series data is input and the position where the sensor data is input, wherein the step of detecting a condition-matching interval includes detecting the starting or ending point of the condition-matching interval based on the positional data.

34. The method of claim 32, wherein the step of receiving sensor data further includes receiving data designating a specific speaker, wherein the step of detecting a condition-matching interval includes detecting one of a starting point and an ending point of the condition-matching interval based on the data designating a specific speaker.

35. The method of claim 25, further comprising the step of displaying the user-input data at a display position, wherein the step of correlating further includes correlating the user-input data, the time-series data and the display position of the user-input data, designating the displayed user-input data, and playing back the time-series data corresponding to the designated user-input data.

36. The method of claim 35, wherein the step of displaying includes displaying a compression status of the time-series data.

37. The method of claim 25, further comprising the step of receiving time data indicating a receipt time when the time-series data is received, wherein the step of compressing is executed on the time-series data when an elapsed time from the receipt time has exceeded a predetermined threshold.

38. The method of claim 25, further including the step of determining an amount of empty space in the storage, wherein the step of compressing is executed when the amount of empty space in the storage is below a predetermined threshold.

39. The method of claim 25, wherein the step of storing the time-series data includes storing the time-series data based on a frequency band range of the time-series data and the step of compressing includes deleting time-series data corresponding to a high frequency band range from the storage.

40. The method of claim 25, wherein the step of storing the time-series data includes storing the time-series data as illumination data and color data separately, and wherein the step of compressing includes deleting the color data from the storage.

41. The method of claim 25, further comprising the step of receiving access status data that differentiates intervals being accessed by a user more than a predetermined number of times within a predetermined amount of time and intervals not being accessed by a user more than the predetermined number of times, wherein the step of compressing includes changing the compression process based on the access status data.

42. A data storage and playback apparatus comprising:
- a condition-matching interval detection means for detecting a condition-matching interval in which time-series data matches a predetermined condition unique to an event;
- at least one time-series data pickup device that detects time-series data containing at least one of audio data and image data during both important intervals and other intervals;
- a time-series data storage that stores the time-series data detected by the time-series data pickup device;
- at least one user-input detector that detects user-input data, wherein the user-input data designates important intervals of the time-series data; and
- a controller that controls storage and playback of the time-series, wherein the controller includes:
  - a correspondence-relationship storing section that stores a correspondence relationship between an important interval and a location of the time-series data in the time-series data storage corresponding to the important interval, and
  - a compression section that compresses the time-series data corresponding to the important interval differently from the time-series data corresponding to the other intervals.

43. The apparatus of claim 42, wherein the controller further includes a condition-matching detection section that detects a condition-matching interval in which the time-series data matches a predetermined condition, and wherein the important interval is determined based on the user-input data and the condition-matching interval.

44. The apparatus of claim 43, wherein the sensor receives positional data relating to one of the position where the time-series data is input and the position where the sensor data is input, and wherein the condition-matching interval detection section detects one of a starting point and an ending point of the condition-matching interval based on the positional data.

45. The apparatus of claim 43, wherein the sensor receives data designating a specific speaker, and wherein the condition-matching interval detection section detects one of a starting point and an ending point of the condition-matching interval based on the data designating a specific speaker.

46. The apparatus of claim 43, wherein the sensor receives camera operation data, and wherein the condition-matching interval detection section detects one of a starting point and an ending point of the condition-matching interval based on the camera operation data.

47. The apparatus of claim 42, further comprising at least one sensor that outputs sensor data, wherein the controller further includes a condition-matching detection section that detects a condition-matching interval in which the sensor data matches a predetermined condition, and wherein the important interval is determined based on the user-input data and the condition-matching interval.

48. The apparatus of claim 42, further comprising a display that displays the user-input data at a display position, wherein the correspondence relationship storing section stores correspondence relationships between the important interval, the address of the time-series data in the time-series data storage corresponding to the important interval and the display position of the user-input data being displayed, and wherein the controller further includes a designation section that designates a portion of the user-input data and a playback section that plays back the time-series data in the interval corresponding to the designated portion of the user-input data.

49. The apparatus of claim 48, wherein the display further displays a compression status of the time-series data.

50. The apparatus of claim 42, wherein the condition-matching interval detection section compares an audio signal level of the time-series data with a predetermined threshold value and detects one of a starting or ending point of the condition-matching interval based on the comparison.

51. The apparatus of claim 42, wherein the condition-matching interval detection section detects one of a specific speaker in the time-series data and a switching of the speaker in the time-series data and detects one of a starting point and an ending point of the condition-matching interval based on the detection.

52. The apparatus of claim 42, wherein the condition-matching interval detection section detects one of a specific predetermined keyword and a predetermined pattern and detects one of a starting point and an ending point of the condition-matching interval based on the detection.

53. The apparatus of claim 42, wherein the condition-matching interval detection section detects one of a specific predetermined character string and a status change and detects one of a starting point and an ending point of the condition-matching interval based on the detection.

54. The apparatus of claim 42, further comprising a time data storage that stores time data designating a detection time of the time-series data, wherein the compression section executes compression of the time-series data when an elapsed time from the detection time has exceeded a predetermined threshold.

55. The apparatus of claim 42, wherein the controller detects the amount of empty space in the time-series data storage and the compression section executes compression on the time-series data when the amount of empty space in the time-series data storage is below a predetermined threshold.

56. The apparatus of claim 42, wherein the time-series data is stored in the time-series data storage based on a frequency band range of the time-series data and the compression section deletes the time-series data corresponding to the high frequency band range.

57. The apparatus of claim 42, wherein the time-series data is stored based on the time-series data being either illumination data or color data and the compression section deletes the color data from the time-series data storage.

58. The apparatus of claim 42, further comprising an access status data storage that stores access status data designating the number of times a particular interval is accessed, wherein the controller differentiates intervals having been accessed more than a predetermined number of times and intervals that have not been accessed more than a predetermined number of times, and wherein the compression section changes the compression process based on the access status data.

59. A data storage device comprising:
- time-series data input means for inputting time-series data containing at least one of audio data and image data, wherein the time-series data is input during both condition-matching intervals and other intervals;
- time-series data storing means for storing time-series data input from the time-series data input means;

condition-matching interval detection means for detecting a condition-matching interval in which the time-series data matches a predetermined condition unique to an event;

correspondence relationship storing means for storing the correspondence relationship between a condition-matching interval and a position in the time-series data storing means where the time-series data corresponding to the condition-matching interval is stored; and compression means for compressing the time-series data stored in the time-series data storing means, wherein the time-series data corresponding to a condition-matching interval is compressed differently than the time-series data corresponding to the other intervals.

60. The data storage device of claim 59, wherein the condition-matching interval detection means compares an audio signal level of the time-series data with a pre-set threshold value and detects one of the starting point and the ending point of the condition-matching interval based on the comparison.

61. The data storage device of claim 59, wherein the condition-matching interval detection means detects one of a specified speaker of the audio data and a switching of the originator of the audio data and detects one of a starting point and an ending point of the condition-matching interval based on the detection.

62. The data storage device of claim 59, wherein the condition-matching interval detection means detects one of a specific predetermined keyword and a specific predetermined pattern in the time-series data and detects one of a starting point and an ending point of the condition-matching interval based on the detection.

63. The data storage device of claim 59, wherein the condition-matching interval detection means detects one of a specific predetermined character string and a status change in the time-series data and detects one of a starting point and an ending point of the condition-matching interval based on the detection.

64. The data storage device of claim 59, further comprising time data storing means for storing a time of storing the time-series data in the time-series data storing means, wherein the compression means executes a compression process when the elapsed time from the time of storing exceeds a pre-set time.

65. The data storage device of claim 59, wherein the compression means executes a compression process when one of an empty area in the time-series data storing means is determined to be below a predetermined value and the amount of memory used in the time-series data storing means is determined to exceed a predetermined amount.

66. The data storage device of claim 59, further comprising access status storing means for storing data which differentiates an interval being accessed by a user more than a predetermined number of times within a predetermined amount of time and intervals not being accessed by a user more than a predetermined number of times within a predetermined amount of time in the time-series data, wherein the compression means compresses the time-series data accessed by the user more than a predetermined number of times within a predetermined amount of time differently from the intervals which are not accessed by the user more than a predetermined number of times within a predetermined amount of times.

67. The data storage device of claim 59, further comprising sensor data detection means for detecting data from at least one sensor, wherein the condition-matching interval detection means detects a condition-matching interval in which the sensor data matches a predetermined condition.

68. The data storage device of claim 60, wherein the sensor data detection means detects one of sensor data concerning the position where the time-series data is input and sensor data concerning the position where the sensor data is detected, and the condition-matching interval detection means detects one of a starting point and an ending point of the condition-matching interval based on the sensor data.

69. The data storage device of claim 60, wherein the sensor data detection means detects a specific person and the condition-matching interval detection means detects one of a starting point and an ending point of the condition-matching interval based on the detection.

70. The data storage device of claim 60, wherein the sensor data detection means detects one of camera operation signals and a change in camera operation signals and the condition-matching interval detection means detects one of a starting point and an ending point of the condition-matching interval based on the detection.

* * * * *